US012748029B2

(12) United States Patent
Hajipouran Benam et al.

(10) Patent No.: US 12,748,029 B2
(45) Date of Patent: Sep. 29, 2026

(54) SYSTEMS AND METHODS FOR REAL-TIME ANALYSIS OF INHALED PARTICLES

(71) Applicant: PNEUMAX, LLC, Denver, CO (US)

(72) Inventors: Kambez Hajipouran Benam, Mars, PA (US); Alexander Kaiser, Erie, CO (US); Bob Alvarenga, Denver, CO (US); Cassie Salem, Glendale, CO (US)

(73) Assignee: PNEUMAX, LLC, Denver, CO (US)

( * ) Notice: Subject to any disclaimer, the term of this patent is extended or adjusted under 35 U.S.C. 154(b) by 271 days.

(21) Appl. No.: 18/683,399

(22) PCT Filed: Aug. 22, 2022

(86) PCT No.: PCT/US2022/041067
§ 371 (c)(1),
(2) Date: Feb. 13, 2024

(87) PCT Pub. No.: WO2023/028000
PCT Pub. Date: Mar. 2, 2023

(65) Prior Publication Data

US 2024/0369464 A1 Nov. 7, 2024

Related U.S. Application Data

(60) Provisional application No. 63/235,798, filed on Aug. 22, 2021.

(51) Int. Cl.

| | |
|---|---|
| ***G01N 15/0205*** | (2024.01) |
| ***G01N 1/22*** | (2006.01) |
| *G01N 15/00* | (2006.01) |

(52) U.S. Cl.
CPC ........... *G01N 15/0211* (2013.01); *G01N 1/22* (2013.01); *G01N 2001/2223* (2013.01); *G01N 2015/0046* (2013.01)

(58) Field of Classification Search
CPC ................ G01N 15/0211; G01N 1/22; G01N 2001/2223; G01N 2015/0046
See application file for complete search history.

(56) References Cited

U.S. PATENT DOCUMENTS 6,582,376 B2 * 6/2003 Baghdassarian ....... A61B 5/097 73/23.3
7,282,032 B2 10/2007 Miller
(Continued)

OTHER PUBLICATIONS

20768:2018, I., "Vapour Products—Routine Analytical Vaping Machine—Definitions and Standard Conditions" [Online]. Available: https://www.iso.org/standard/69019.html [Accessed]. (2018).
(Continued)

*Primary Examiner* — Rebecca C Bryant
(74) *Attorney, Agent, or Firm* — Greenberg Traurig, LLP; David J. Dykeman; Peigan Jiang

(57) ABSTRACT

A system for analyzing fluid-borne particles includes a reservoir for storing a fluid with fluid-borne particles, a fluid intake module coupled to the reservoir by a fluidical conduit, the fluid intake module having a container with a changeable volume, wherein when the volume increases, the fluid intake module receives fluid, and when the volume decreases, the fluid intake module expels fluid, and a particulate matter (PM) sensor disposed in the fluidical conduit between the reservoir and the fluid intake module for detecting fluid-borne particles in the fluidical conduit.

21 Claims, 38 Drawing Sheets

(56) References Cited

U.S. PATENT DOCUMENTS

| | | | | |
|---|---|---|---|---|
| 9,585,605 | B2 | 3/2017 | Say | |
| 10,080,857 | B2 | 9/2018 | Sislian et al. | |
| 10,226,201 | B2 * | 3/2019 | Ahmad | A61B 5/087 |
| 10,736,548 | B2 * | 8/2020 | Ahmad | G16H 20/60 |
| 10,859,473 | B2 | 12/2020 | Wu et al. | |
| 11,957,450 | B2 * | 4/2024 | Purves | A61B 5/0235 |
| 2022/0036766 | A1 * | 2/2022 | Kulkarni | G09B 23/32 |

OTHER PUBLICATIONS

Adamson et al., "Quantification of cigarette smoke particle deposition in vitro using a triplicate quartz crystal microbalance exposure chamber". Biomed Res Int, 2013, 685074. (2013).
Benam and Ingber, "Commendation for Exposing Key Advantage of Organ Chip Approach." Cell Syst, 3, 411. (2016).
Benam et al., "Biomimetic smoking robot for in vitro inhalation exposure compatible with microfluidic organ chips." Nat Protoc, 15, 183-206. (2020).
Benam et al., "Human Lung Small Airway-on-a-Chip Protocol." Methods Mol Biol, 1612, 345-365. (2017).
Benam et al., "Matched-Comparative Modeling of Normal and Diseased Human Airway Responses Using a Microengineered Breathing Lung Chip." Cell Syst, 3, 456-466 e4.(2016a).
Benam et al., "Small airway-on-a-chip enables analysis of human lung inflammation and drug responses in vitro." Nat Methods, 13, 151-7. (2016b).
Bhat et al., "An Animal Model of Inhaled Vitamin E Acetate and EVALI-like Lung Injury." N Engl J Med, 382, 1175-1177. (2020).
Blount et al., "Vitamin E Acetate in Bronchoalveolar-Lavage Fluid Associated with EVALI." N Engl J Med, 382, 697-705.(2020).
Bowler et al., "Electronic Cigarette Use in US Adults at Risk for or with COPD: Analysis from Two Observational Cohorts." J Gen Intern Med, 32, 1315-1322. (20170.
Cambustion, "Scs Smoking / Vaping Machine" [Online]. Available: https://www.cambustion.com/products/scs [Accessed]. (2020).
Czekala et al., "Toxicological comparison of cigarette smoke and e-cigarette aerosol using a 3D in vitro human respiratory model." Regul Toxicol Pharmacol, 103, 314-324. (2019).
Darquenne, Chantal, "Aerosol deposition in health and disease." J Aerosol Med Pulm Drug Deliv, 25, 140-7. (2012).
Dipasquale et al., "A Mechanical Mechanism for Vitamin E Acetate in E-cigarette/Vaping-Associated Lung Injury." Chem Res Toxicol, 33, 2432-2440. (2020).
Duffy et al., "Analysis of Cannabinoid-Containing Fluids in Illicit Vaping Cartridges Recovered from Pulmonary Injury Patients: Identification of Vitamin E Acetate as a Major Diluent." Toxics, 8. (2020).
FDA, "FDA's Predictive Toxicology Roadmap" [Online]. Available: https://www.fda.gov/science-research/about-science-research-fda/fdas-predictive-toxicology-roadmap [Accessed]. (2020).
FDA, "Premarket Tobacco Product Applications for Electronic Nicotine Delivery Systems—Guidance for Industry" [Online]. Available: https://www.fda.gov/media/127853/download [Accessed]. (2019).
Kaisar et al., "Offsetting the impact of smoking and e-cigarette vaping on the cerebrovascular system and stroke injury: Is Metformin a viable countermeasure?" Redox Biol, 13, 353-362. (2017).
Kozlovich et al., "Vitamin E Acetate is not Soluble in Nicotine E-liquids." Tobacco Regulatory Science, 7, 130-134 (5). (2021).
Krishnasamy et al., "Update: Characteristics of a Nationwide Outbreak of E-cigarette, or Vaping, Product Use-Associated Lung Injury—United States, Aug. 2019-Jan. 2020." MMWR Morb Mortal Wkly Rep, 69, 90-94.(2020).
Li et al., "Effects of propylene glycol, vegetable glycerin, and nicotine on emissions and dynamics of electronic cigarette aerosols." Aerosol Science and Technology, 1-12.(2020).
Merecz-Sadowska et al., "A Summary of In Vitro and In Vivo Studies Evaluating the Impact of E-Cigarette Exposure on Living Organisms and the Environment." Int J Mol Sci, 21. (2020).
Mikheev et al., "Aerosol size distribution measurement of electronic cigarette emissions using combined differential mobility and inertial impaction methods: Smoking machine and puff topography influence." Aerosol Sci Technol, 52, 1233-1248. (2018).
Muthumalage et al., "Pulmonary Toxicity and Inflammatory Response of E-Cigarette Vape Cartridges Containing Medium-Chain Triglycerides Oil and Vitamin E Acetate: Implications in the Pathogenesis of EVALI." Toxics, 8. (2020).
Oldham et al., "Particle size distribution of selected electronic nicotine delivery system products." Food Chem Toxicol, 113, 236-240. (2018).
Overbeek et al., "A review of toxic effects of electronic cigarettes/vaping in adolescents and young adults." Crit Rev Toxicol, 1-8. (2020).
Pepper et al., "Adolescents' interest in trying flavoured e-cigarettes." Tob Control, 25, ii62-ii66. (2016).
Reagan-Steiner et al., "Pathological findings in suspected cases of e-cigarette, or vaping, product use-associated lung injury (EVALI): a case series." Lancet Respir Med. (2020).
Rouadi et al., "A technique to measure the ability of the human nose to warm and humidify air." J Appl Physiol (1985), 87, 400-6. (1999).
Sosnowski et al., "Physicochemical studies of direct interactions between lung surfactant and components of electronic cigarettes liquid mixtures." Inhal Toxicol, 30, 159-168. (2018).
Wu And O'Shea, "Potential for release of pulmonary toxic ketene from vaping pyrolysis of vitamin E acetate." Proc Natl Acad Sci USA, 117, 6349-6355. (2020).
International Search Report and Written Opinion in PCT International Application No. PCT/US2022/041067 mailed Dec. 12, 2022.

* cited by examiner

| State | PV1 | PV2 | PV3 | PV4 | Vacuum Pump | Breathing-Emulator Sync |
|---|---|---|---|---|---|---|
| Purge | ON | ON | ON | N/A | ON | OFF |
| Vapor | OFF | ON | ON | N/A | ON | OFF |
| Sample | ON | OFF | OFF | N/A | OFF | Inhale |
| Inhale | N/A | N/A | ON | OFF | OFF | Inhale |
| Exhale | N/A | N/A | ON | ON | OFF | Exhale |
FIG. 11A
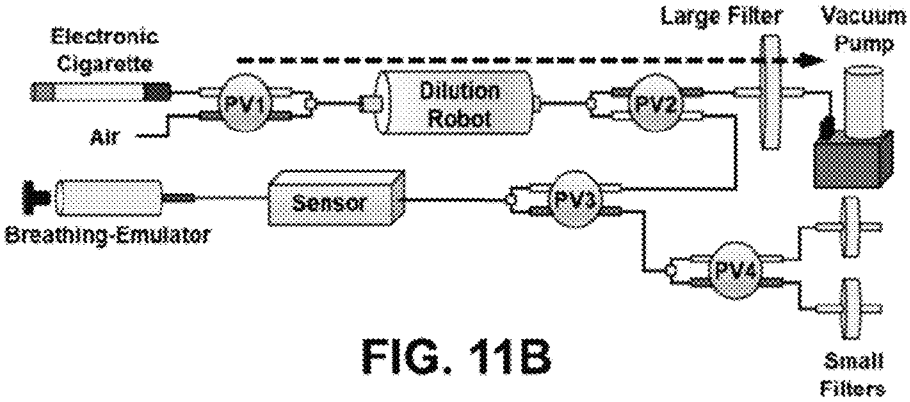
FIG. 11B
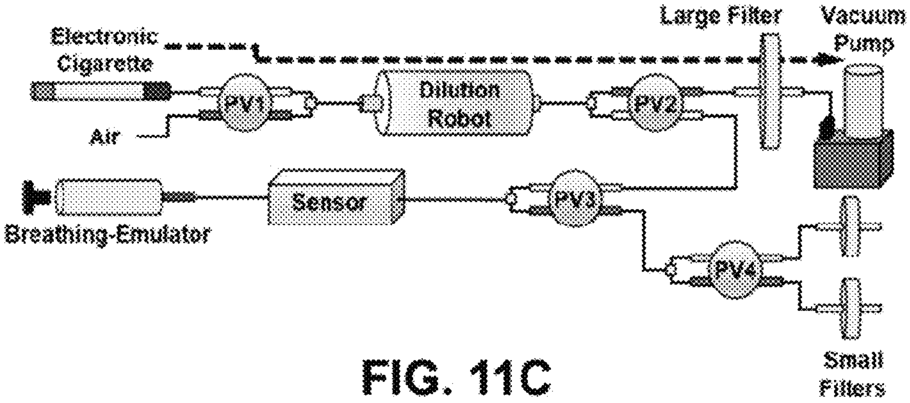
FIG. 11C

| State | PV1 | PV2 | PV3 | PV4 | PV5 | PV6 | PV7 | Vacuum Pump | Sample Syringe |
|---|---|---|---|---|---|---|---|---|---|
| VR Connect | OFF | N/A | OFF | ON | OFF | N/A | ON | OFF | Fill |
| Mix | ON | OFF | ON | N/A | ON | ON | OFF | OFF | Drain |
| Sample | ON | OFF | ON | N/A | ON | ON | OFF | OFF | Partial Fill |
| Evacuat e | ON | ON | OFF | ON | ON | OFF | ON | ON | Fill |
| Empty | ON | ON | OFF | OFF | ON | ON | OFF | OFF | Drain |

SYSTEMS AND METHODS FOR REAL-TIME ANALYSIS OF INHALED PARTICLES

CROSS-REFERENCE TO RELATED APPLICATIONS

This application is a U.S. National Phase patent application under 35 U.S.C. 371 of International Application No. PCT/US2022/041067, filed 22 Aug. 2022 which claims priority to and the benefit of U.S. Provisional Application No. 63/235,798 filed on 22 Aug. 2021 and entitled "SYSTEMS AND METHODS FOR REAL-TIME ANALYSIS OF INHALED PARTICLES," and each of which is hereby incorporated herein by reference in its entirety.

GOVERNMENT SUPPORT

This invention was made with government support under HHSF223201810127C awarded by the U.S. Food and Drug Administration, U01EB029085 and R41ES031639 awarded by the U.S. National Institutes of Health, and W81XWH2010035 awarded by the U.S. Department of Defense Congressionally Directed Medical Research Programs Discovery Award. The government has certain rights in the invention.

BACKGROUND OF TECHNOLOGY

Over the past decade the use of electronic nicotine delivery systems (ENDS) such as electronic cigarettes (ECs), has surged. In addition to health concerns for healthy adults, the use of ENDS among the youth population and those with underlying lung conditions is particularly of concern (Overbeek et al., 2020, Bowler et al., 2017). Since 2018, serious pulmonary adverse effects from use of ENDS have been noted to be the rise. In 2019, the United States Centers for Disease Control and Prevention (CDC) and the Food and Drug Administration (FDA) begun investigating a national outbreak of EC or vaping product use-associated lung injury (EVALI) (Reagan-Steiner et al., 2020). EVALI led to hospitalizations, as a result of serious acute to subacute lung injury, and fatalities. Alpha-tocopheryl acetate (also known as vitamin E acetate [hereafter referred to as VEA]), a dietary compound discovered to be used a diluent in some cannabis-containing ECs and vaping products, has been strongly linked with the EVALI outbreak (Blount et al., 2020, Krishnasamy et al., 2020, Duffy et al., 2020). Thus far, the specific cause(s) of EVALI is unknown; however, the analyses of products and patient samples has implicated a role for VEA. Despite this, studies on how VEA can lead to EVALI have been sparse and limited to inhalation exposure of laboratory murine models to EC aerosols (Bhat et al., 2020), challenging human bronchial and monocytic leukemia-derived cell lines with EC liquid (e-liquid) (Muthumalage et al., 2020), or focused on solubility and thermal decomposition of VEA (Wu and O'Shea, 2020, Kozlovich et al., 2021).

Here, we sought to identify a VEA-associated physical signature in the aerosol of what a human would inhale from use of an EC. More specifically, we asked whether the presence of VEA can impact the profile and quantity of particles generated from ECs when exactly recreating clinically relevant breathing profiles and vaping topography that are observed in human subjects. Such information will quantitatively improve the understanding of the interactions of particles emitted from ENDS aerosols upon the airway and lung tissue as a result of ENDS use. This information may be able to be used to help characterize the potential toxicity of aerosolized compounds on pulmonary tissues to support constituent and product assessments. Thus, this study describes the design and development of a first-in-kind biologically inspired robotic system that generates fresh aerosols for any desired EC in a very controlled and user-definable manner and subsequently utilizes an optical sensing system to quantitate and analyze sub-micron and microparticles (300 nm-10 μm in 4 segmented ranges) from every puff over the course of vaping session in real-time. The addition of as little as 1.25% VEA was observed to be sufficient to significantly enhance total particles inhaled from an EC. Interestingly, nicotine levels inversely yet non-significantly correlated with particles generated from ECs. However, addition of VEA led to significant increase in sub-micron and microparticles in aerosols of ECs containing 0.6% nicotine. Lastly, by emulating representative breathing profiles from obstructive and restrictive lung disorders, we identified a similar trend in ability of VEA to enhance particles quantities in inhaled aerosols, which reveals potential inhaled toxicity due to VEA in conditions such as chronic obstructive pulmonary disease (COPD) and idiopathic pulmonary fibrosis (IPF). To our knowledge, no such system with this level of sophistication, programmability and real-time sensing for inhaled aerosols physical characterization has been developed, and our platform offers the unique ability to study the effects of any desired chemical constituent of ECs on inhaled sub-micron and microparticles for clinical correlation. In fact, real-time detection system may have considerable applications for scientific and regulatory science purposes.

SUMMARY

Vitamin E acetate (VEA) has been strongly linked to outbreak of electronic cigarette or vaping product use-associated lung injury (EVALI). How VEA leads to such an unexpected morbidity and mortality is currently unknown. Here, to understand whether VEA impacts the disposition profile of inhaled particles, we created a biologically inspired robotic system that quantitatively monitors and analyzes sub-micron and microparticles generated from electronic cigarettes (ECs) in real-time while mimicking clinically relevant breathing and vaping topography exactly as happens in human subjects. We observed addition of even small quantities of VEA was sufficient to alter size distribution and significantly enhance total particles inhaled from ECs. Moreover, we demonstrated utility of our biomimetic robot for studying influence of nicotine and breathing profiles from obstructive and restrictive lung disorders on particle profiles generated from ECs. We anticipate our system will serve as a novel preclinical scientific research decision-support tool when insight into toxicological impact of modifications in electronic nicotine delivery systems is desired.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 11A, FIG. 11B, FIG. 11C, FIG. 11D, FIG. 11E and FIG. 11F illustrate a vaping robot control system and a fluidic flow diagram according to embodiments of the present disclosure according embodiments of the present disclosure.

DETAILED DESCRIPTION

Figure 1A:
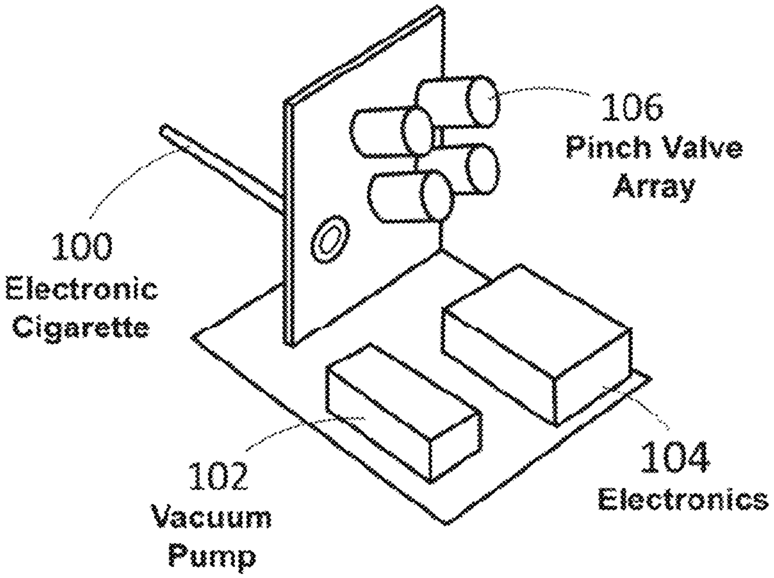
FIG. 1A, FIG. 1B, FIG. 1C, FIG. 1D, and FIG. 1E are perspective views of an microparticle analyzer according to embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIG. 1 through FIG. 26 illustrate systems and methods for real-time analysis of inhaled particles. The following embodiments provide technical solutions and technical improvements that overcome technical problems, drawbacks and/or deficiencies in the technical fields involving electric power distribution system. As explained in more detail, below, technical solutions and technical improvements herein include aspects of improved load modelling and analysis. Based on such technical features, further technical benefits become available to users and operators of these systems and methods. Moreover, various practical applications of the disclosed technology are also described, which provide further practical benefits to users and operators that are also new and useful improvements in the art.

Design and Development of a Human Vaping Mimetic Real-Time Sub-Micron and Microparticle Analyzer FIG. 1A, FIG. 1B, FIG. 1C, FIG. 1D, and FIG. 1E are perspective views of a human vaping mimetic real-time sub-micron and microparticle analyzer according embodiments of the present disclosure. The analyzer is developed to enable studies on impact of chemical constituents of EC (such as VEA and nicotine) and breathing profile (healthy and diseased) on inhaled particle quantities and distribution. This platform consists of multiple inter-linked subsystems responsible for controlling the experimental environment, emulating physiologically relevant airflow dynamics and clinical vaping topography, and analyzing particles in segmented distributions over relevant particle sizes. The analyzer includes a vacuum pump 102, a pinch valve array 106 and associated electronics 104 to receive electronic cigarette 100 under test.

Figure 6:
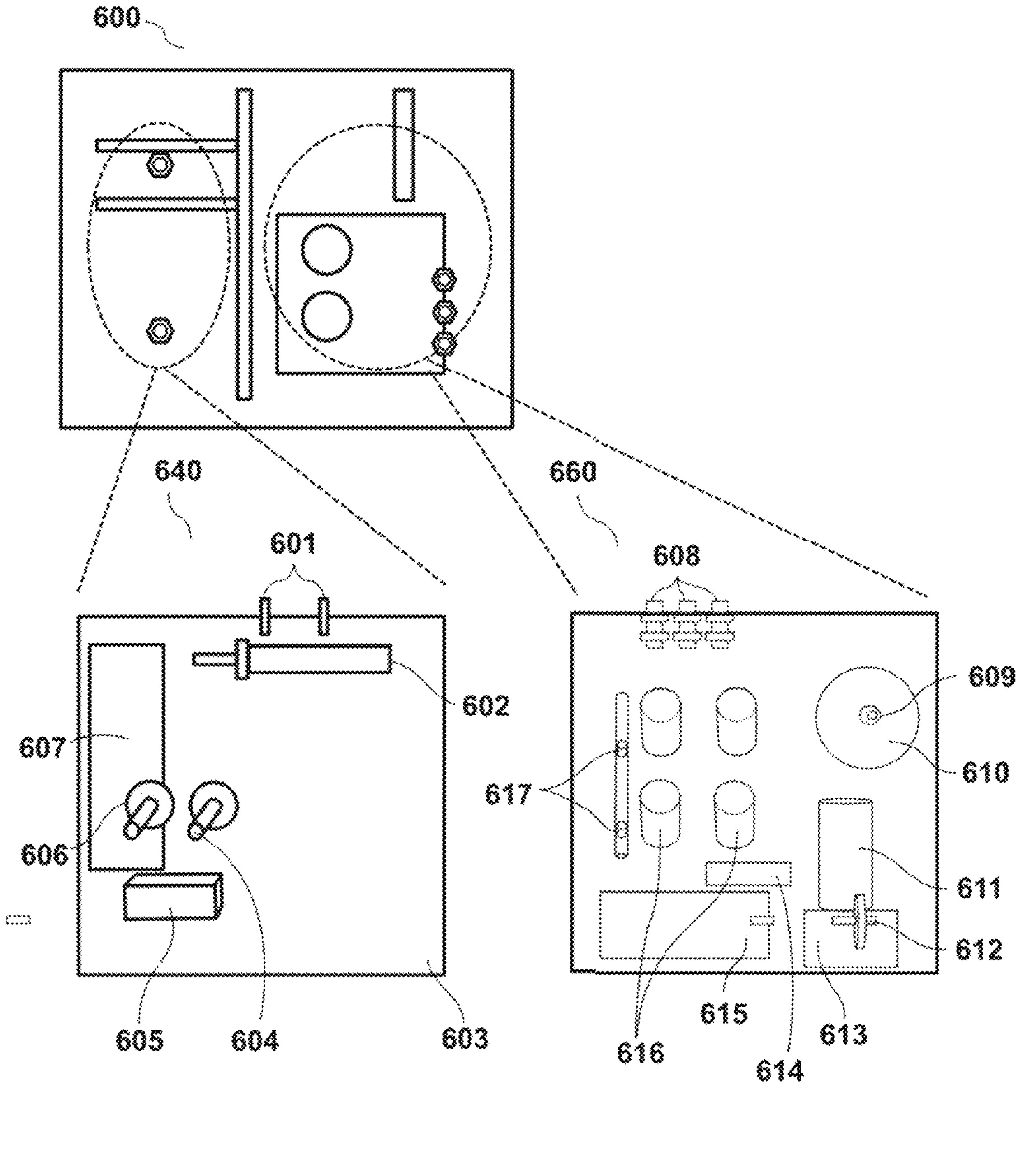
FIG. 6 is a series of perspective views of a vaping robot design according embodiments of the present disclosure.
Figure 7:
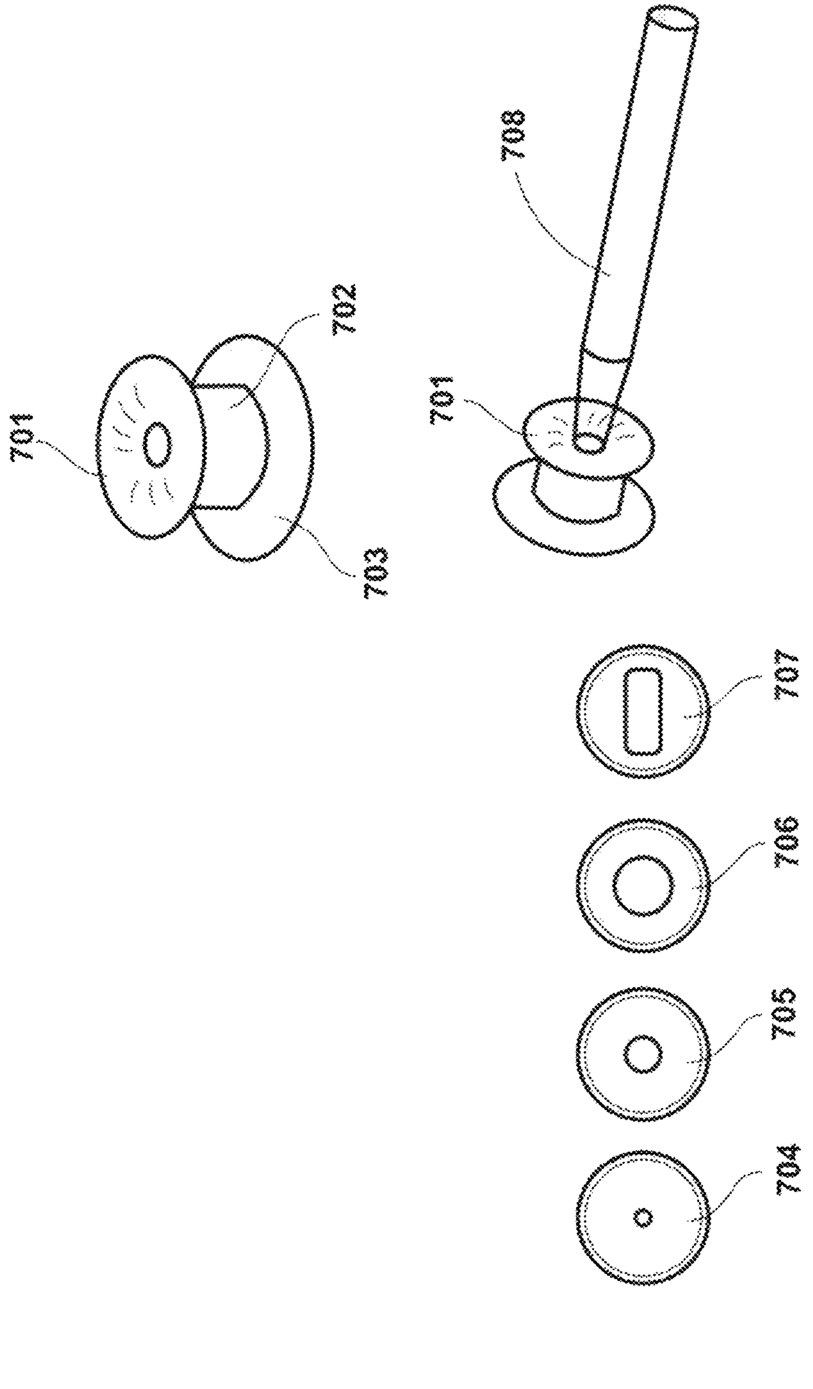
FIG. 7 illustrates an electronic cigarette sealing gasket design.
Figure 9A:
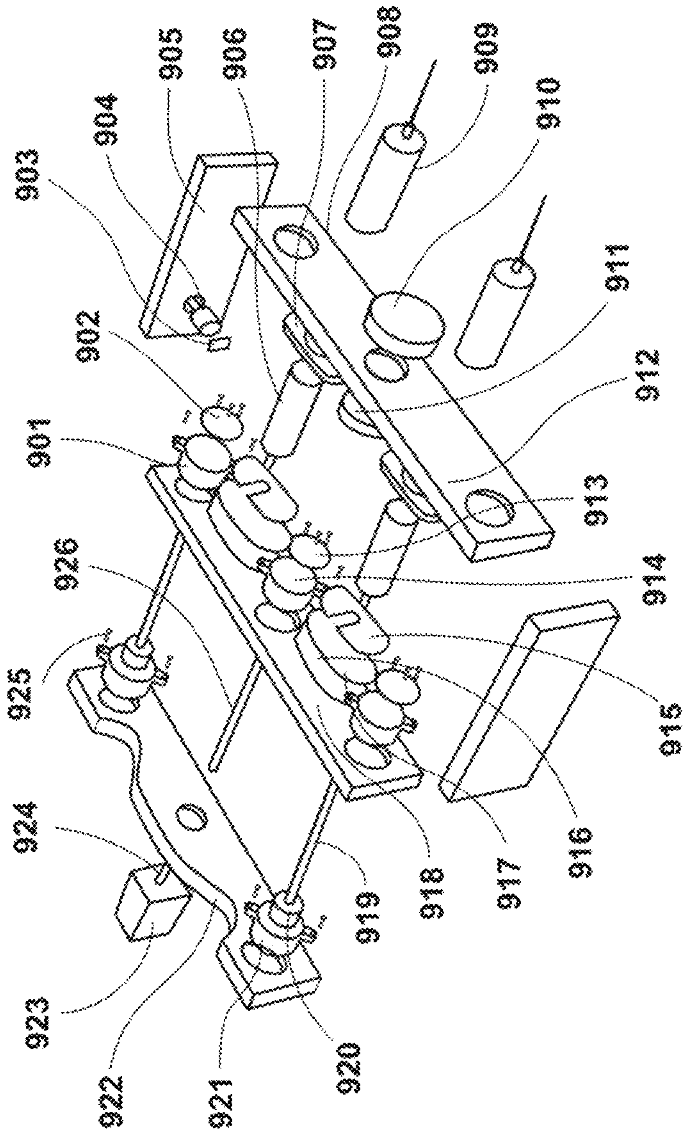
FIG. 9A and FIG. 9B are perspective view of breathing-emulator components and associated functionalities.
Figure 10:
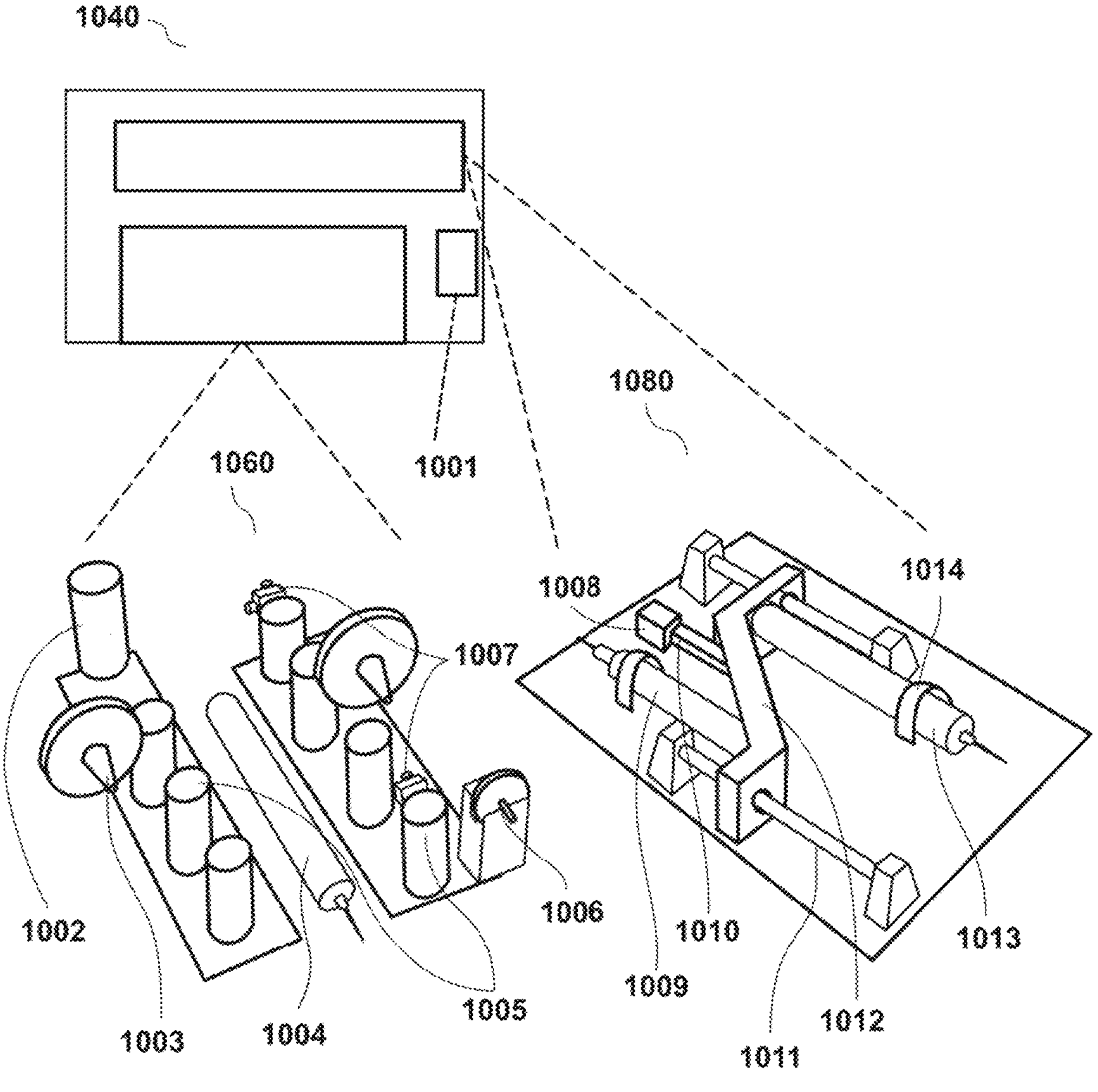
FIG. 10 illustrates a mechanical design of a dilution robot according embodiments of the present disclosure.

We initially designed and assembled a vaping robot, shown in FIG. 1A, FIG. 6 and FIG. 7 that is responsible for 'vaping' ECs in a clinically relevant manner. This system is an enhanced and EC-focused iteration of a cigarette smoking machine that we had developed earlier (Benam et al., 2020, Benam et al., 2016a), and functions by activating placed-in ECs through negative pressure for a programmed (user-defined) duration of time—i.e., puff time, to fill in a user-selected reservoir—i.e., puff volume, with freshly produced EC aerosols. In our studies we set the puff time and volume to 3 seconds and 55 mL, respectively. These values were selected based on the 2018 International Organization for Standardization (ISO) definitions and standard conditions for vapor productions ISO 20768:2018 (20768:2018, 2018). The vaping robot is concurrently connected to an inline particulate matter (PM) sensor 112 located within a purposely built air-tight enclosure (FIG. 1B, FIG. 8A and FIG. 8B), which in turn is linked to a custom-designed and engineered breathing-emulator (FIG. 1C and FIG. 9A). The PM sensor 112 is laser-based and allows for detection of particles ranging from 300 nm to 10 μm (the choice of Sensor in our platform was made after thorough comparison against existing commercially available detection systems; see Discussion below). The breathing-emulator rhythmically 'inhales' and 'exhales' air or aerosols by following breathing patterns and volumes dictated by input profiles. For our studies, we utilized healthy normal breathing. The vaping robot is highly versatile and allows generation of fresh whole aerosols from any desired buttonless EC (by allowing use of mouth-piece gaskets, that based on dimensions of an EC, conform tightly and create an air-tight seal) while synchronizing operation with the breathing-emulator. (For ECs that are not automatically activated by the negative pressure and require simultaneous activation by user through pressing a button on the device, we would need to design, build and integrate an additional module to mechanically press the device button at the time of negative pressure). Between the time that an EC is activated to produce fresh aerosols and when the puff of aerosols is to be sampled and analyzed by the PM sensor 112 under inhalation fraction of rhythmic breathing, the aerosols get diluted with the dilution robot (FIG. 1D and FIG. 10). This is to recapitulate the dilution that occurs after an EC-smoker smoothly inhales a puff of vapor/aerosol (e.g., 55 mL) at a flat flow rate—i.e., using square-shape puffing profile. Experimentally, this is executed through constant vacuum pressure of the vaping robot for the duration of puff and mixed with tidal volume-equivalent air (e.g., 500 mL which represents the volume that an average adult human breathes at resting state) for dynamic delivery to the lungs. The dilution robot is linked to the vaping robot's internal reservoir. Following fresh puff generation, the dilution robot takes in the aerosol from the reservoir and runs it through a seamless and quick series of filtered air addition, mixing, sampling and re-diluting steps (if required) (FIGS. 11B-11F and FIGS. 12B-12G). The platform was designed so that the user, based on the question of study, can create dilution of interest. Here, to reproduce clinically relevant exposure, we programmed the dilution robot to generate 10-fold dilution of each inhaled EC puff. Additionally, we recapitulate physiologically relevant body temperature and added humidity. Lastly, we developed an inhalation exposure chamber (FIG. 1E, FIG. 13A, FIG. 13B, FIG. 13C, FIG. 13D, FIG. 14A and FIG. 14B) that houses all the above subsystems and automatically senses and regulates the environmental conditions via values set forth by user and, through a set of pressure-controlling pneumatics, can safely exhaust unneeded aerosols out of the system. In our studies, we set the relative humidity (RH) at 70% (the maximum that our Chamber allowed without negatively impacting electronics and mechanical parts) and the temperature at 37° C. (FIG. 15, FIG. 16, FIG. 17, FIG. 18, FIG. 19 and FIG. 20).

Evaluating Impact of Supplemental Vitamin E Acetate on Inhaled Particle Profiles from Electronic Cigarette Next, to evaluate the effects of VEA on aerosol particle size distributions during vaping, we prepared increasing concentrations of VEA (0%, 1.25%, 2.5%, and 5% (v/v)) in 50/50 solution of propylene glycol/vegetable glycerin (PG/VG). Each condition (e-liquid) was then loaded into an EC cartridge, which was connected to a battery and plugged into the vaping robot within the inhalation exposure chamber (FIG. 1A, FIG. 1B, FIG. 1C, FIG. 1D and FIG. 1E). Following EC loading, the system was initiated with a representative vaping session of 9 total puffs at 41.3-second inter-puff intervals and 3-second puff times. During the 41.3 seconds a total of seven inhalation-exhalation cycles occurred; one over the course of the puff followed by six during the post-puff period, all at a rate of 5.9 seconds per puff or breath.

Figure 2A:
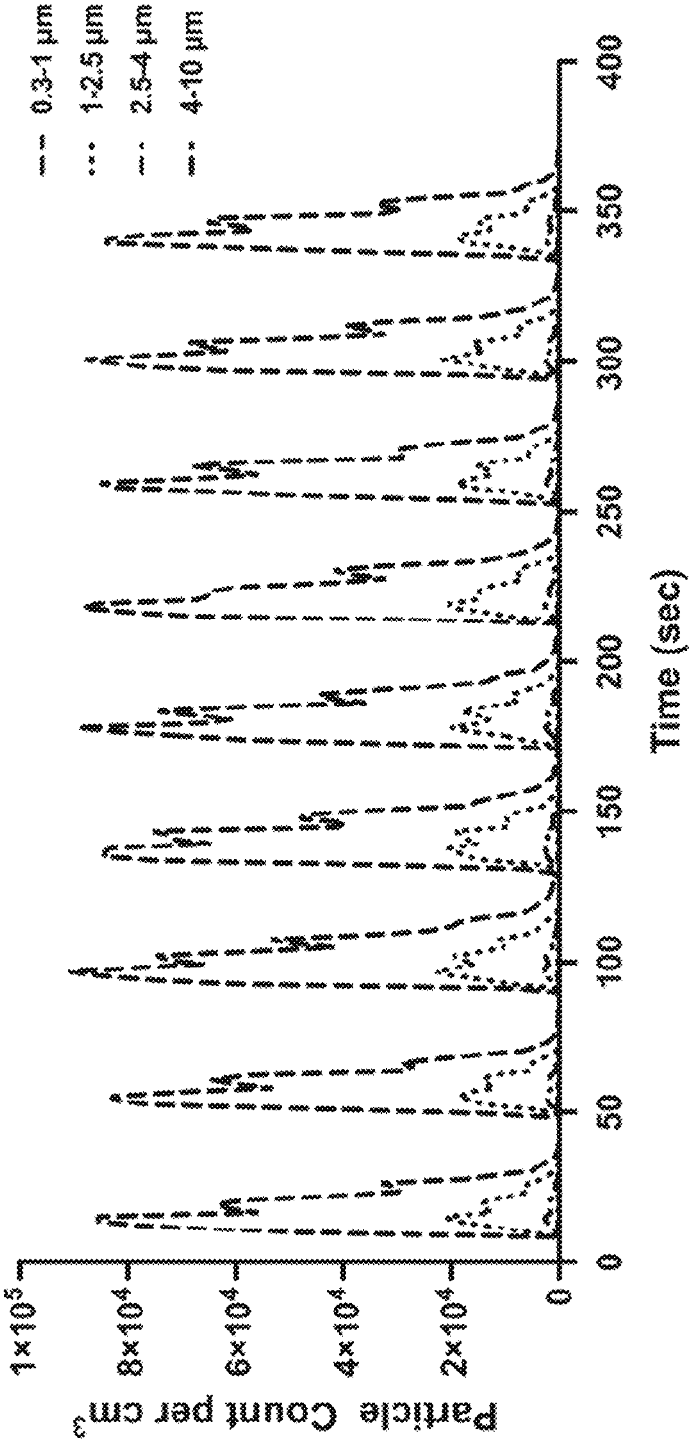
FIG. 2A and FIG. 2B illustrate impact of vitamin E acetate (VEA) on inhaled particle count.
Figure 2B:
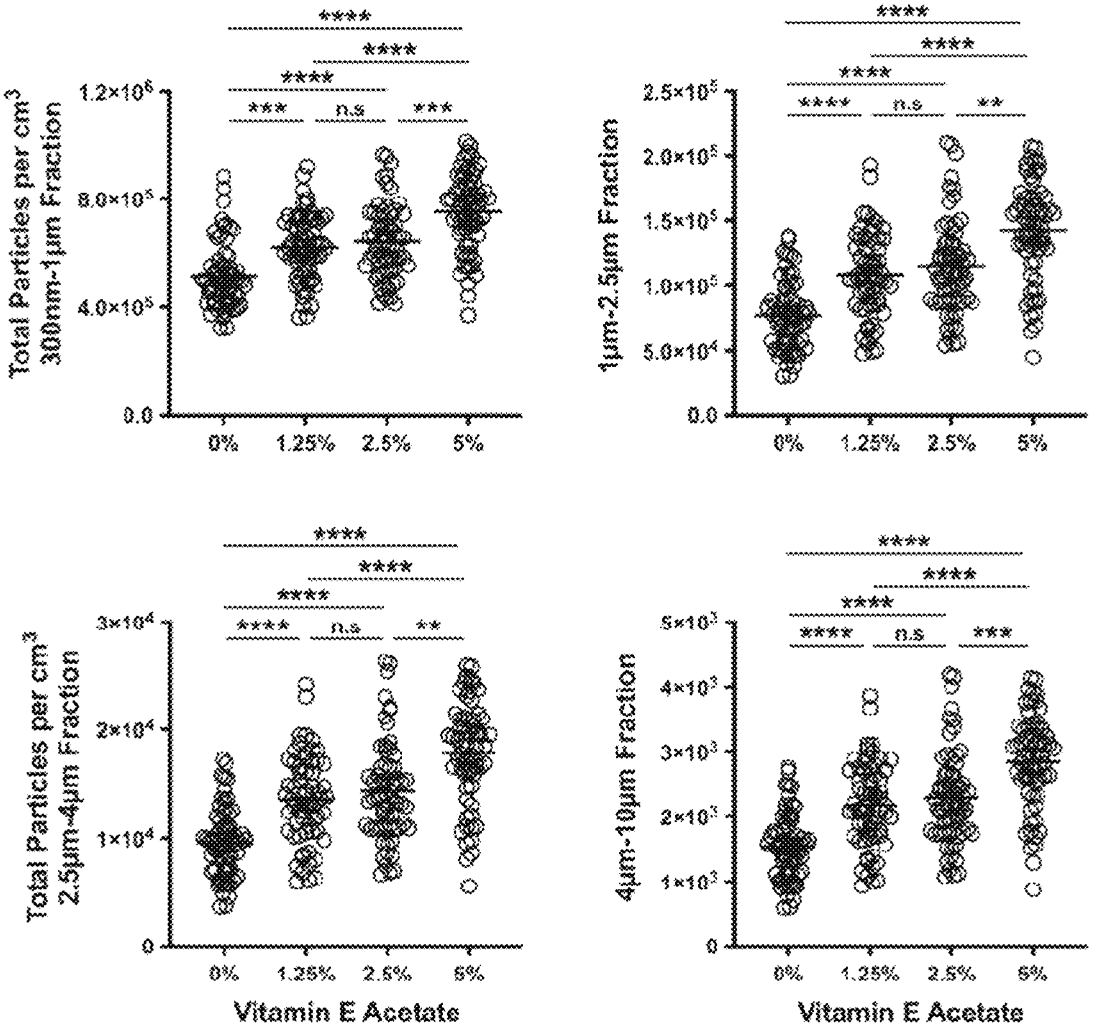
Figure 21:
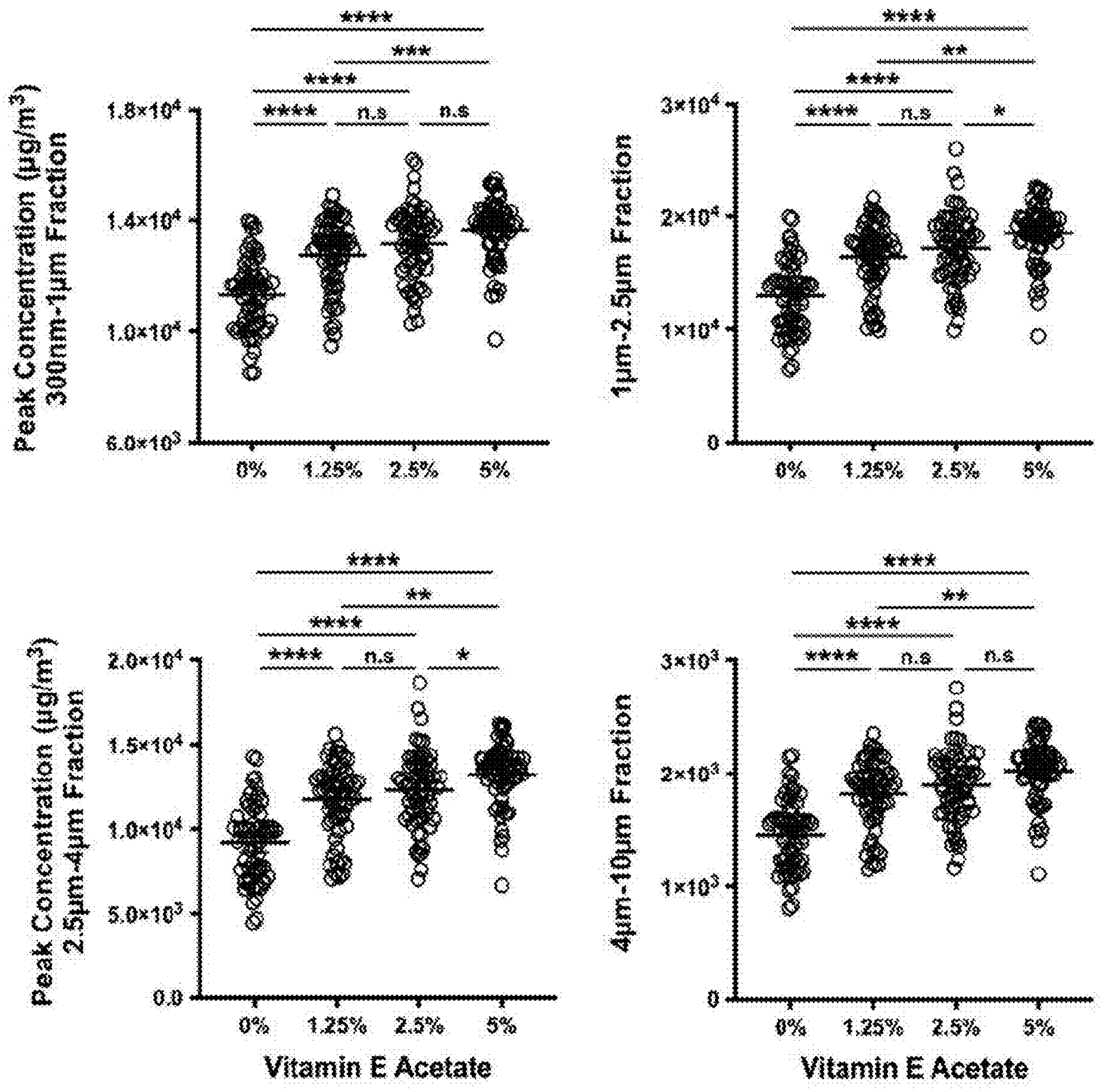
FIG. 21 shows an impact of vitamin E acetate on inhaled particle peak concentrations.
Figure 22:
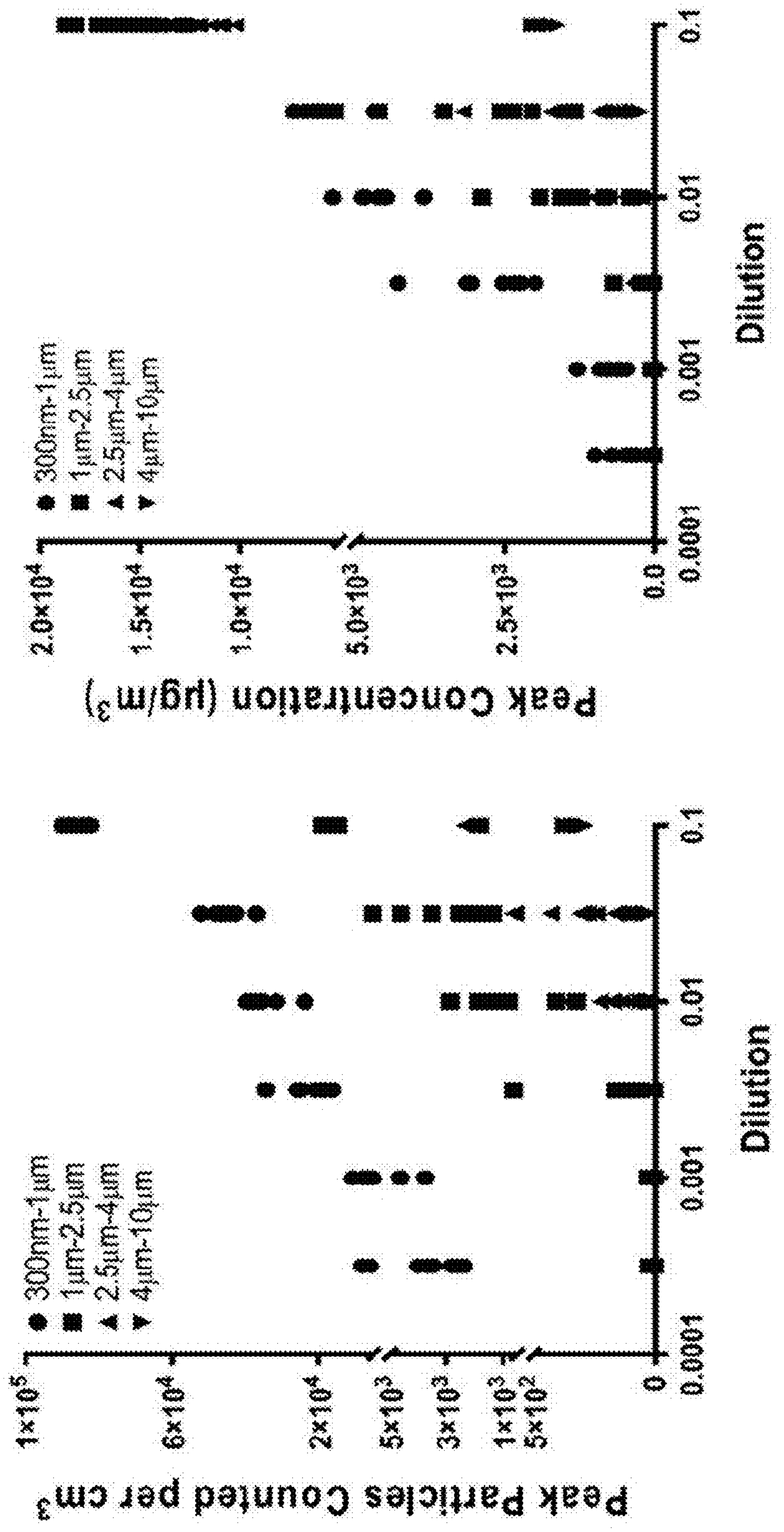
FIG. 22 shows a particle distribution of varying dilution ratios.

During the vaping session, the PM sensor 112 monitored and analyzed the distribution of particles in real-time, categorizing them into four segmented ranges of 300 nm-1 μm, 1 μm-2.5 μm, 2.5 μm-4 μm, and 4 μm-10 μm (FIG. 2A). The analysis was performed through a custom-developed companion software that calculates the peak total particles counted per $cm^3$ over the course of each individual (diluted) puff. We collected data for seven independent vaping sessions, that is a total of 63 puffs, and analyzed them to get insight into the impact of VEA and its dose on the four particle distribution profiles (FIG. 2B). The results demonstrate statistically significant differences in all the VEA concentrations for all particle size distributions other than 1.25% vs. 2.5%. A relatively similar trend was also evident when analyzing peak concentration for sub-micron and microparticles (FIG. 21). In addition, we summed together the total particles counted per $cm^3$ over the seven vaping sessions for each VEA concentration (FIG. 3), and observed that the total collective particles went up as VEA concentration increased, with the highest quantity seen at 5% dose. Interestingly, the percentage of sub-micron particles (300 nm-1 μm fraction) out of the total of all fractions within each condition slightly decreased with increase in VEA, whereas the percentage of particles within the 1 μm-2.5 μm and 2.5 μm-4 μm fractions enhanced with increase in the VEA dose. We found no change in fraction of 4 μm-10 μm particles with increased concentration of VEA. To ensure the PM sensor is not saturated for signal detection, we performed serial dilutions of 5% VEA and observed a relatively linear change in particle count and concentration as the solution got more diluted (FIG. 22). This graph also validates our optical-based aerosol sensing approach as changes made (by dilution) in input sample are reflected by anticipated total particle counts.

Effects of Nicotine on Inhaled Particle Profiles from Electronic Cigarette, Alone or in Combinatorial Mixture with Vitamin E Acetate We next aimed to determine the effects on the particle size distribution in the presence of varying concentrations of nicotine—an additive in many EC and vaping products, alone and in combination with VEA. The 50/50 PG/VG was used as base to dissolve VEA at 0% or 5% (v/v) doses. Each of these solutions were then independently mixed with purified (−)-nicotine to yield 0%, 0.6%, 1.2% and 2.4% (wt/v) concentrations. We studied these e-liquids using the same breathing profile, vaping topography and other parameters applied in our studies above (9 puffs per vaping session totaling to 63 puffs over seven vaping sessions, 55 mL puff volume, 3-second puff time, 41.3-second inter-puff interval, 10× puff dilution, 37° C., and healthy adult breathing inhale/exhale cycle of 5.9 seconds).

Figure 4:
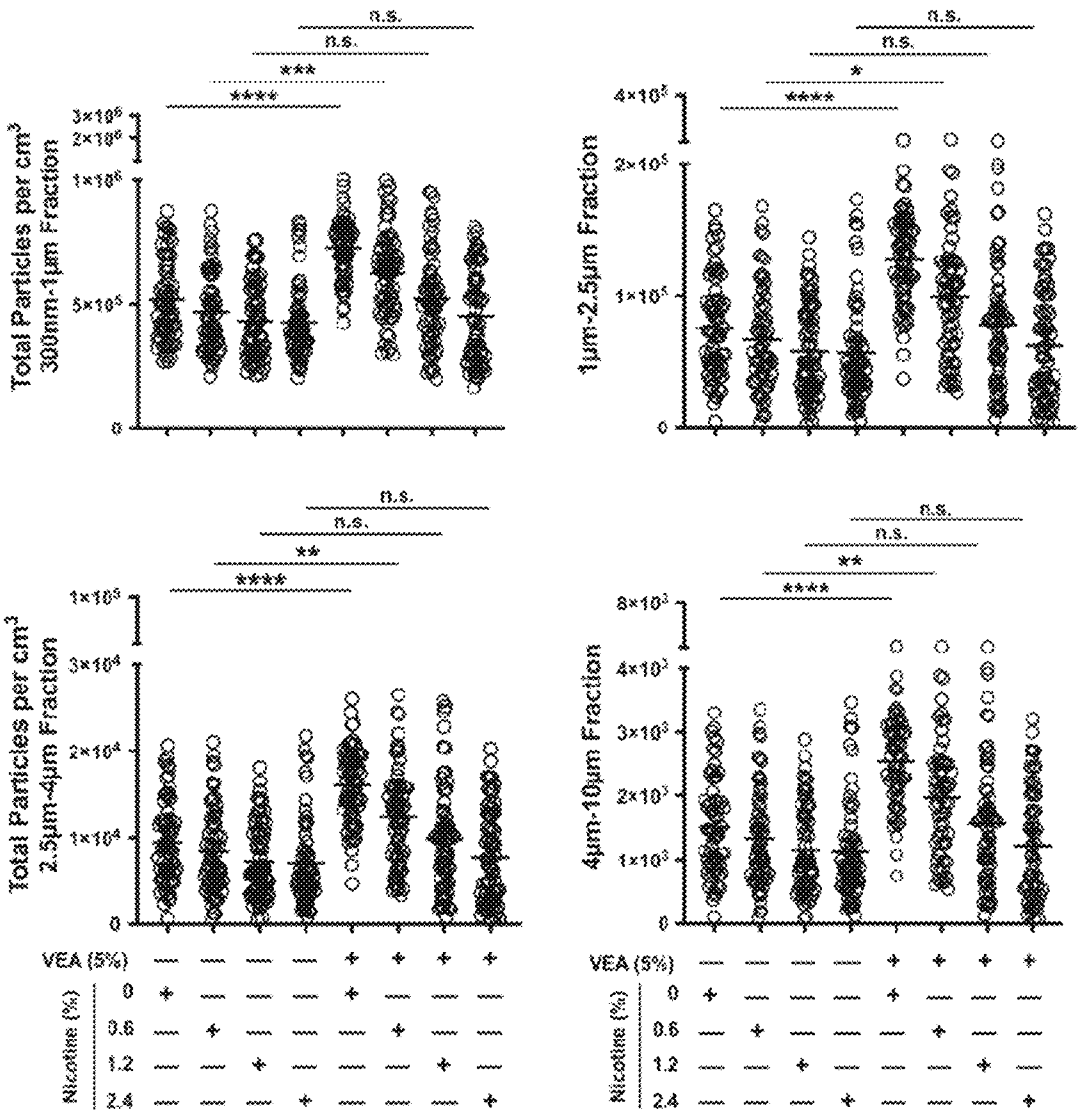
FIG. 4 illustrates influence of nicotine alone or in combination with vitamin E acetate on sub-micron and microparticles generated from electronic cigarette.
Figure 23:
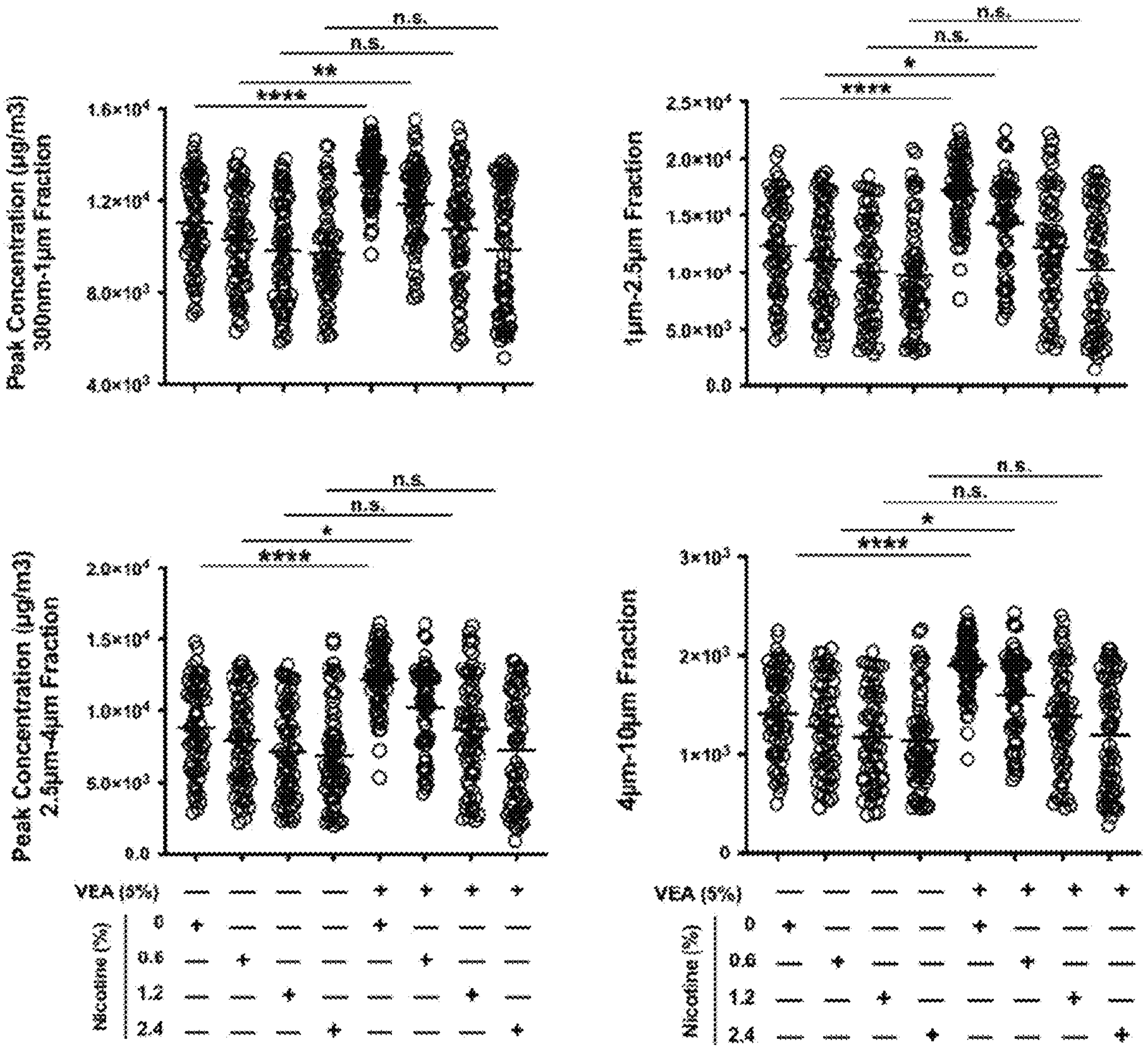
FIG. 23 shows an impact of nicotine alone or in combination with vitamin E acetate on particle peak concentrations generated from an electronic cigarette.
Figure 24:
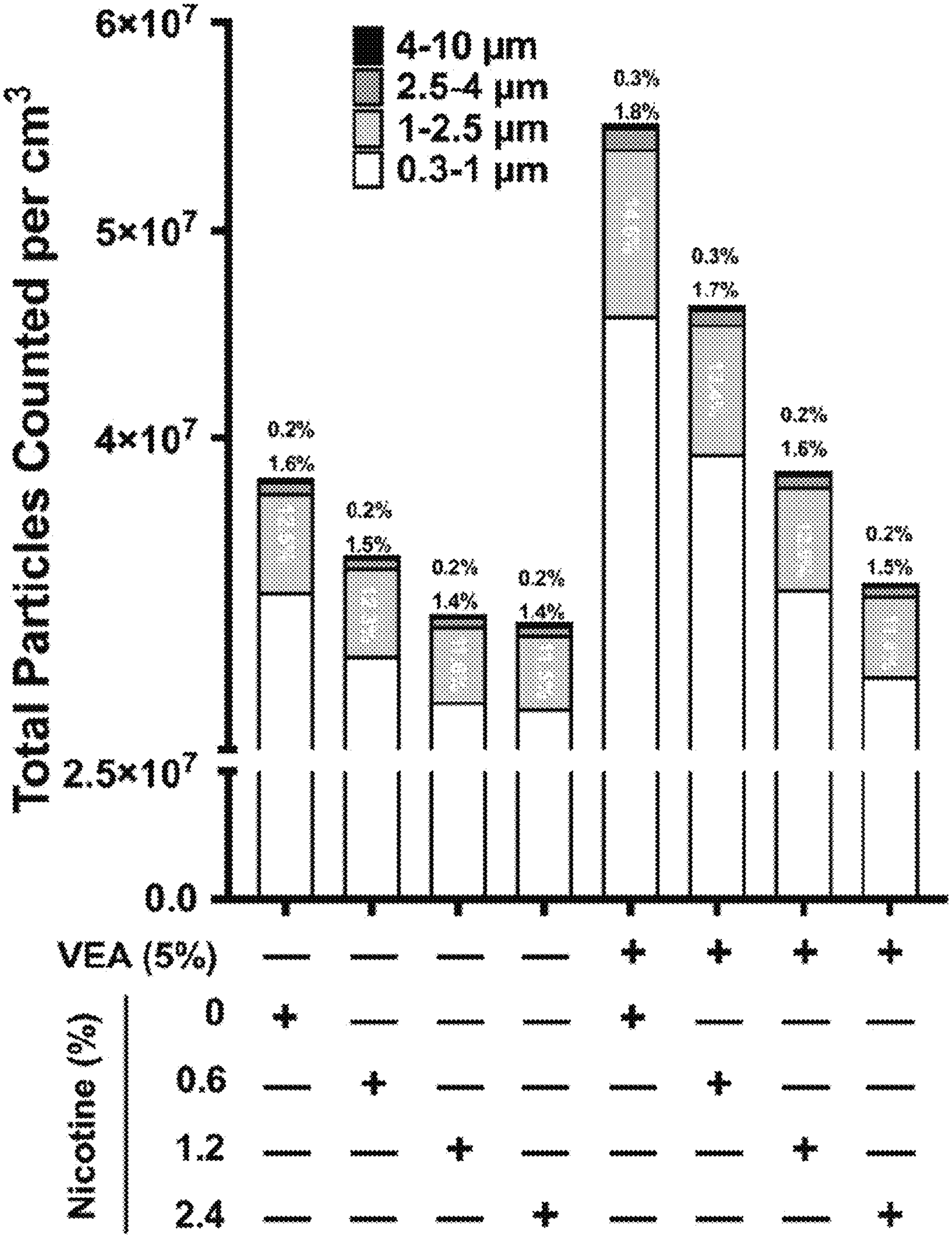
FIG. 24 shows an impact of nicotine alone or in combination with vitamin E acetate content on cumulative total sub-micron and microparticles generated from an electronic cigarette over a representative vaping regiment.

The total particles counted per $cm^3$ were calculated from the raw data produced from the vaping sessions (FIG. 4). The data showed a statistically significant difference between the 0% and 5% VEA at both 0% (consistent with findings in FIG. 2B) and 0.6% nicotine; however, statistical significance was not detected between the 0% and 5% VEA at higher (1.2% and 2.4%) nicotine concentrations. In fact, as the nicotine concentration increased, in both VEA-containing and VEA-free groups we identified a decrease (although not significant) in total particles counted per puff. A similar pattern was also evident when analyzing peak concentration for sub-micron and microparticles (FIG. 23). We also summed the total particles counted per $cm^3$ over the seven vaping sessions for each VEA/nicotine combination (FIG. 24). The cumulative total particle count was highest with 5% VEA at 0% and 0.6% nicotine concentrations. Interestingly, unlike the impact of VEA alone, as the nicotine dose increased (with or without presence of VEA) the percentage of particles in 300 nm-1 μm fraction for each condition slightly went up, while the percentage of particles within the 1 μM-2.5 μm and 2.5 μm-4 μm fractions moved in the opposite direction. We did not observe changes to optical opacity of aerosols at VEA doses we tested.

Emulating Clinically Relevant Diseased Breathing Profiles to Evaluate Impact of Vitamin E Acetate on Sub-Micron and Microparticles in Inhaled Electronic Cigarette Aerosols In order to better understand the impact that diseased breathing may have on particle distribution dynamics in EC aerosols, we wrote scripts and created software that can actuate the breathing-emulator by converting clinical flow-volume loops into breathing profiles. In our studies above, we applied a scaled-down breathing profile of an average healthy human adult. Here we chose obstructive and restrictive pulmonary disorders (FIG. 5A), that encompass COPD, asthma and IPF, as representative lung diseases for breathing profile recapitulation. Unlike our studies in FIG. 2, FIG. 3 and FIG. 4, the experiments here varied the breathing profile, which means that the volumes and inhale/exhale times, and thus volumetric flow rates were different. In order to normalize for volume and time, the total particles counted per $cm^3$ were multiplied by the mean flow rate of each breathing profile, and we then plotted the mean total particle flow rate (FIG. 5B). We observed that similar to healthy normal breathing, addition of 5% VEA resulted in statistically significant increase in mean total particle flow rate (FIG. 5B) and peak concentration (FIG. 25) for all four particle fractions in both the obstructive and restrictive breathing profiles. Interestingly, the profile of particle distributions in response to VEA supplementation exhibited a wider range and higher variability with restrictive breathing compared with healthy and obstructive breathings. Moreover, when comparing the differences in mean total particle flow rate for the three breathing profiles at 5% VEA, there was a statistically significant difference from the healthy breathing profile compared with both of the diseased breathing profiles. Lastly, we summed the total particles counted per $cm^3$ over the seven vaping sessions for each breathing profile in the absence or presence of VEA (FIG. 26). The cumulative total particle counts were highest with 5% VEA for both normal and obstructive breathing, followed by VEA-containing e-liquid under restrictive breathing. Notably, the magnitude of increase in total particle count due to presence of VEA was highest with the restrictive breathing profile, following sequentially with obstructive and normal breathing.

Discussion

The outbreak of EVALI has caused concern about the respiratory illnesses and deaths associated with the use of ENDS. Consequently, the FDA and CDC worked closely together and with state and local public health officials to investigate the outbreak. However, very little is known on how inhalation of VEA, which has been suggested as a primary cause of EVALI, leads to lung injury. Historically, the majority of nonclinical studies on vaping have focused on in vitro challenge of lung or immune cells with e-liquid, or exposing animals (most commonly laboratory rodents) to EC aerosols (reviewed by (Merecz-Sadowska et al., 2020)). Yet, lack of physiological relevance (e.g., utilizing cell lines or cancerous cell lines instead of primary well-differentiated cells or tissues), absence of clinically relevant exposure (e.g., submerging cells directly with e-liquid rather than exposing lung cells to EC aerosols under rhythmic breathing and maintaining natural airway liquid interface seen in conducting airways) and inter-species differences hinder extrapolation of findings from many of these studies of nonclinical models to human. To our knowledge no peer-reviewed report on impact of VEA-containing EC liquid or aerosols on mucociliated human airway epithelia under air-liquid interface has been published. Importantly, we still do not have a clear picture of how different ingredients and aerosol constituents of ECs such as VEA or nicotine affect the profile and quantity of particles that a human user of ECs actually inhales. This is important information as the higher number of particles generated from an EC can correlate with enhanced deposition in the respiratory tree which can challenge both normal or diseased pulmonary physiology and potentially lead to increased pathological changes and cellular toxicity. In inhalation toxicology, dosimetry of smoke particles has been typically performed using a gravimetric tool (e.g., via quartz crystal microbalances) or an impactor (Adamson et al., 2013, Oldham et al., 2018). However, these are endpoints, rather than real-time analysis tools. Additionally, variability between and within experiments often affect the interpretation of the data.

Given this critical gap on physical (number and size distribution) characterization of inhaled particles in real-time while emulating breathing and vaping topography and its change in response to modification in EC constituents, we developed the novel system presented here. In addition, to more closely mimic physiological parameters and clinically relevant settings and to provide versatility in utility of the system, we integrated temperature and humidity control along with sensors for precision and correction into our engineered platform. When generating EC aerosols, we recreated physiological breathing as well as pathological breathing profiles, reproduced vaping topography, included a dilution robot to ensure each freshly generated EC puff mixed well and diluted into the inspirational tidal volume, and created a software interface to allow users to define each parameter while performing real-time monitoring and collection of the particle size data.

Several industrial smoking/vaping machines that can replicate puff profile have been developed (e.g., by CH Technologies (Kaisar et al., 2017), VitroCell® Systems (Czekala et al., 2019) and Combustion (Cambustion, 2020)); however, a fundamental drawback of these systems, as well as animal models, is that none of them can emulate and integrate rhythmic human breathing with vaping topography. In addition, some of these platforms lack on-line real-time sensors to characterize particle size distribution and those with sensors do not analyze the highest size values we covered here (that is, 10 μm). Importantly, in our system, we integrated humidifiers and brought the temperature to 37° C. to better control for thermodynamic properties and hygroscopic growth of aerosols. It is noteworthy to state that our objective in this study was not to apply our robotic system to predict or mimic EC aerosol behavior within specific branches of lower respiratory tree, such as smaller airways or bronchioles. Rather, we aimed to characterize the profile of EC particles at the site of inspiration (the mouth) just when entering trachea.

We generated RH of 70% inside the exposure Chamber to prevent negative impact on housed electronics and mechanical parts. The relative humidity in oral cavity depend on temperature and RH of input air/gas, and as such varies from individual to individual and in different environments; but in nasopharynx reaches 100% (Rouadi et al., 1999). We understand that RH is an important factor in aerosol measurement since EC droplets may change their size due to mass/heat exchange processes as they flow through airways. However, at this point we have developed a unique and proof-of-principle platform that is highly amenable for improvement and user perturbation. In addition, our new approach methodology (NAM) enhances the use of nonclinical testing models for ENDS to characterize the influence and fate of ingredients in complex mixtures of aerosols. Another notable advantage of the platform is that it is an efficient and reasonable alternative to the ethics, financial cost and time-consuming reality of animal testing. The FDA encourages use of NAMs using technologies that support the animal 3Rs principals (Replace, Reduce, Refine) to help understand the health risks of all regulated products, including tobacco products (FDA, 2020, FDA, 2019). As a future direction, improvements will be made to the insulation sealing around various sensitive components of robotic system so that humidity condensation does not result is shorting circuits, damaging electronics and rusting mechanical parts. This would enable increasing the RH to 100% (e.g., by increasing the surface area of air-water interface in our embedded humidifiers) allowing us to more accurately take into account the effect of such high RH (which is observed in conducting airways) on particle sizes, and predict aerosol deposition within the lungs. Further work can involve simulation to study the effects of flavoring compounds which are known to be appealing to youth (Pepper et al., 2016). Additionally, our system can easily integrate with living tissue models such as Lung Small Airway-on-a-Chip that we previously developed (Benam and Ingber, 2016, Benam et al., 2017, Benam et al., 2020, Benam et al., 2016a, Benam et al., 2016b). As such we plan to evaluate toxicity of different inhaled particle profiles (size and numbers) on mucociliated bronchiolar epithelia in future.

Three major mechanisms influence transport and deposition of aerosols (including EC particles) in human lungs: inertial impaction, gravitational sedimentation, and Brownian diffusion (Darquenne, 2012). When air flow is fast, impaction primarily affects particles larger than 5 μm in size; e.g., as occurs in the upper respiratory tree and at airway bifurcations. Sedimentation on the other hand mostly affects particles in the 1-8 μm range and happens predominantly in small airways and alveoli where the air/aerosol residence time is long and the distance to the lower wall (to be covered by the particles) is short. In contrast, Brownian diffusion is the leading mechanism of deposition for particles≤0.5 μm, and is most relevant in respiratory bronchioles, alveolar ducts and alveolar cavities—that is acinar region of the lung, where air velocities are very low. Therefore, by specifically evaluating the EC particles in the 300 nm-10 μm range in our studies, we covered the three primary processes that affect their distribution throughout the lungs. Nevertheless, for better insight into ability of generated EC aerosols for Brownian diffusion, an increased capability to quantify and profile nanoparticles (<100 nm in diameter) is required. Our findings notably reveal clues on size-dependent EC particle deposition in the lungs. Approximately 98% of total particles generated from ECs in our studies (FIG. 3 and FIG. 5), whether VEA and/or nicotine were present in the e-liquid or not, were in the 300 nm-2.5 μm size range. This implies that gravitational sedimentation and Brownian diffusion are the leading drivers for deposition of these particles. In other words, we can deduce that: (1) the majority of EC-derived fresh particles accumulate in the small airways, respiratory bronchioles, alveolar ducts and alveolar cavities, and thus can impact pulmonary surfactant function; and (2) addition of VEA leads to considerably higher quantities of particle accumulation in these regions of the lung. We need to clarify that these speculations are based on simple PG/VG-containing EC formulations with or without VEA. The addition of reactive aldehydes, phenolic compounds, polycyclic aromatic hydrocarbons, flavorings, and volatile organic compounds to e-liquids may lead to their fast evaporation within oral cavity and hence a different deposition profile.

Recently, Mikheev and colleagues attempted to characterize aerosol size distribution from ECs (Mikheev et al., 2018). However, the sensor used in their studies (a differential mobility spectrometer) (i) lacked high resolution up to 10 μm, (ii) required 'sheath flow' in addition to sample flow for measurements, (iii) was not temperature- and humidity-controlled, and (iv) did not couple with a breathing emulator to mimic breathing profile in conjunction with vaping topography. To our knowledge, to date there is no other published study on profiling particle size distribution of ECs containing VEA with or without nicotine in real-time under rhythmic breathing. In addition, our data highlight the importance of focus on injury in alveoli and small airways. For instance, Sosnowski et al., examined physiochemical interactions between EC constituents and lung surfactant (Sosnowski et al., 2018), but the authors used e-liquid in their studies rather than aerosolized submicron and microparticles, and there was no rhythmic breathing (physiological or pathological). Moreover, our findings complement and extend findings from a recent report where authors demonstrated direct negative impact of VEA on mechanical properties of lung surfactant mimics (DiPasquale et al., 2020).

Here, we used a simple PG/VG to study distribution and size profile of inhaled particles in response to increasing representative doses of VEA, nicotine alone or mixed with VEA, and physiological as well as pathological breathing profiles. Our rationale was that at this stage of technical development, excluding flavoring and a range of proprietary and non-proprietary additive chemicals that various commercial sources include in their e-liquids, can mitigate their impact on our findings. However, in future studies, we can add known EC additives (in a controlled fashion) and investigate their contribution to change in inhaled particle profiles and quantities. Such an approach can be used as a tool to strategically prioritize ingredients and additives in ENDS products for follow-up evaluation of toxicological risks. Likewise, this platform can be useful to identify which ingredients and additives in ENDS products may have a lower impact on inhaled particle profiles and quantities, and thus, lower toxicological concern, which may potentially help reduce the risk from the emissions of ENDS tobacco products. Such information would be informative for protection of public health and from a regulatory science standpoint.

We were intrigued to observe that addition of as little as 1.25% VEA was sufficient to significantly enhance inhaled sub-micron and microparticles from EC, and that the response in particular for the 300 nm-1 μm fraction was augmented as the VEA dose increased to 5%. This may in part explain lung pathology in EVALI as our data show that EC-smokers take in much higher contents of sub-micron and microparticles in the 300 nm-10 μm range when vaping VEA-supplemented e-liquids. Surprisingly and in contrast, addition of nicotine alone to PG/VG led to reduced, yet non-significant, sub-micron and microparticle quantities coming from EC. This is consistent with other studies which showed emission of submicron 2.5 μm particulate matter ($PM_{2.5}$) decreases with nicotine (Li et al., 2020). We speculate that this may be attributed to hygroscopic nature of nicotine, which similar to PG/VG, has a low Log Kow (where Kow is n-octanol/water partition coefficient). This is unlike fat-soluble VEA that has a high Log Kow value. A thorough chemical and physical explanation of our observation is beyond the scope of this manuscript. In future, it would be of interest to evaluate impact of tetrahydrocannabinol (THC)—another additive which has been strongly linked to the EVALI outbreak, on particle profile and quantities emitted from ECs and vaping products.

Interestingly, addition of 5% VEA was able to counteract the lowering effect of 0.6% nicotine on sub-micron and microparticles from EC. Nevertheless, the additive combinatorial impact of VEA did not reach statistical significance in higher doses of nicotine we tested (1.2% and 2.4%). It is important to note that this does not imply it is safe to combine VEA and nicotine at these concentrations. This indicates that additional studies characterizing the ultra-fine particles and gaseous content would provide more information on these interactions; however, these studies are beyond the scope of the current manuscript. Our observation that VEA has a statistically significant effect increasing generated particle quantities and flow rates in all tested fractions and on breathing patterns that emulate both healthy and diseased states is of particular importance. Such enhancing effect is clinically important for obstructive (e.g., COPD or asthma) or restrictive (e.g., IPF) pulmonary disorders. In this study the disease states were recreated through emulation of breathing flow-volume loops characteristic for the respective disorders. However, pathological changes that would occur due to disease progression disorders; e.g., hypersecretory phenotype, mucus rheology and thickness, goblet cell hyperplasia, reduced lung capacity, could also impact deposition of particles in the respiratory tree.

Prior to selection of PM sensor (Sensirion SPS30) for our studies, we conducted an extensive and exhaustive search on commercially available particle detection systems. We evaluated and compared the Sensirion SPS30 against other light scattering-based optical particle sizers (OPS) like TSI 3330, personal DataRAM™ pDR-1000AN Monitor, Setra Remote Airborne Particle Counter SPC5000 & SPC7000 Series, Aeroqual AQM 65 Ambient Air Monitoring Station, Atmotube Pro, Palas Promo® LED 2300, and Malvern Panalytical Mastersizer 3000, aerodynamic particle sizers (APS, which use the principle of inertia to size particles) like TSI 3321, scanning mobility particle sizer (SMPS) spectrometers (which are based on the physical principle that the ability of a particle to pass through an electric field—i.e., its electrical mobility, is fundamentally related to its size; these detectors use condensation particle counters [CPC] for sensing) like TSI 3938, and fast mobility particle sizer (FMPS) spectrometers (which use an electrical mobility measurement technique similar SMPS systems, but instead of CPC they utilize multiple, low-noise electrometers for particle detection) like TSI 3091. We found that these sensors, unlike the Sensirion SPS30, have one or more of these drawbacks rendering them incompatible for our platform: (1) requiring a pump that is controlled by sensor, whereas we needed to retain the ability to control the flow rate as it is dynamic and low; (2) requiring high flow rates (often in multiples of L/min) to allow particle detection, while we needed lower flow rates (~360 mL/min for 30 mL stroke volumes); (3) incompatibility for real-time sensing and analysis; (4) having large dead volumes; (5) requiring a slow sampling rate; (6) needing to heat up the input gas to high temperatures before analyzing; (7) incompatibility with environmental humidity and temperature setpoints that we needed for our studies; (8) being too large and designed as standalone benchtop systems that could not fit within a compact and user-controllable system like our inhalation exposure chamber; (9) inability to integrate with (micro)fluidic connections—e.g., some sensors have been developed for ambient air/gas conditions and do not offer ability to control flow; (10) requiring a sheath gas to be passed along with the sampled air/gas; and (11) inability to detect the wide particle size ranges we investigated here. As such, despite the fact that few of these sensors had the ability to quantify particles<300 nm, we were unable to integrate them with our platform for real-time nanoparticle detection while mimicking breathing profile and vaping topography at desired temperature, humidity and flow rate. Such limitations hindered us from studying ultra-fine particles in this study. However, in follow-up studies we will explore modifications to existing nanoparticle sensors and/or development of a new nano-sensor (most likely SMPS- or FMPS-based) for incorporation into our system.

In summary, here we report development and application of a robust, and physiologically and clinically relevant engineered system to evaluate sub-micron and microparticles generated from any desired EC (filled with constituents of interest) in real-time. Utilizing this platform, we observed that addition of VEA to e-liquid leads to significantly higher quantities of particles from EC, which may in part explain some of the lung pathologies observed in EVALI. Importantly, this impact of VEA was evident even when emulating the breathing profiles of obstructive and restrictive lung disorders. As a research proof-of-principle tool, this platform is powerful because it provides exposure information on ingredients and additives emitted from ENDS products to facilitate the health risk evaluation of ENDS products. As the next step, we believe it is key to enhance the capabilities of our platform to allow studying ultra-fine particle smaller than 300 nm in parallel with 300 nm-10 μm range that we examined here, investigate the influence of THC, and mechanistically dissect chemical and physical properties of e-liquid additives in PG/VG mixture that lead to such differential particle profiles and quantities.

Method Description

Vaping Robot

The aerosols exposure system was designed to be physiologically analogous to a human using ENDS products. The production of aerosols is accomplished by a small, enclosed robot, referred to as the vaping robot, that can emulate any human 'vaping profile'. The robot generates a negative pressure with a small internal pump that is strong enough to trigger the aerosolization of the liquid in the electronic vaping cartridge. The aerosols are then directed through a series of small pneumatic pinch-valves, where the aerosols can be sampled into the inline particulate matter (PM) sensor 112 at the specified time and the specified intervals.

The EC is sealed with a polydimethylsiloxane (PDMS) gasket, which was molded to fit into a hollow nut and bolt custom designed and 3D printed with VeroClear™. This allows for quick and cheap production of disposable interchangeable mouthpieces for testing different styles of electronic aerosolization devices if desired. The mouth is imitated with a 55 mL polypropylene pneumatic syringe reservoir that is just upstream of the vacuum pump 102. The pump itself simulates the vacuum generated in the mouth which triggers the aerosol production from the electronic smoking device. The breathing-emulator 130 will constantly be taking breaths through the PM sensor 112 and filters within the vaping robot 134 but can also sample the aerosols with the same breathing profile at the puff intervals specified.

The robot itself has an acrylic housing with two sliding doors for maintenance and loading access. There are two internal chambers to isolate and protect the electronic equipment from copious amounts of ambient aerosols or smoke. Shelving and 3D printed parts help organize the pneumatic components and allow the aerosols to flow in a downhill direction to avoid goosenecks in the tubing and to prevent re-condensation on the surface and potential clogs. The system consists of four pinch valves and a vacuum where the pinch valves allow for fluidic connections of the dilution robot and PM sensor 112, which is also connected to the breathing-emulator 130. Specifically, the reservoir within the dilution robot is connected to either the ambient air or the EC, as well as fluidic connections on the other side of the reservoir to the vacuum pump 102 or the breathing-emulator. Additionally, there are fluidic connections for the breathing-emulator to the reservoir or to the inhale or exhale filters.

An Arduino Uno microcontroller and an 8-channel relay shield, which is controlled by the microcontroller through an I2C communication protocol, were used to control the timing of the pneumatic pinch-valve configuration and vacuum pump activation. This is accomplished by opening and closing the appropriate fluidic paths so that the aerosols or air can travel into the intended components. The vacuum pump 102 was controlled by a higher amperage relay that was in turn controlled by a channel on the shield; the pinch valves were controlled directly by a channel on the shield.

The vaping robot has multiple states that when combined have two main sequences, one for vaping and one for filtered air breathing. For the vaping sequence, the pinch valves start fluidically disconnecting the breathing-emulator from the reservoir and are instead connected to the inhale and exhale filters. A direct path for aerosols is opened from the pump to the reservoir and from the reservoir to the EC. The pump is then activated in accordance with the vaping profile of choice, and the aerosol generated from the EC is collected in the reservoir. Once the aerosol is collected and after the specified dilution has occurred from the dilution robot, the pinch valves fluidically connect the breathing-emulator to the reservoir, allowing for a breath that samples the aerosols to occur. After the breathing-emulator has sampled the aerosols into the PM sensor, the reservoir is cleared with the vacuum pump 102, similar to how the EC is activated except the reservoir is connected to the external air. For the filtered air breathing sequence, the pinch valves are configured similarly to the beginning of the vaping sequence where the breathing-emulator is fluidically connected to the inhale and exhale filters. Specifically, the breathing-emulator's fluidic connection with the inhale and exhale filters are toggled in synchrony with the breathing-emulators inhale/exhale state. Since the breathing-emulator generates both positive and negative pressure within the tubing, the sampling sequence was designed to account for this fluctuation and open pinch valves that would relieve negative pressure buildup without allowing for the aerosols sample to be expelled from the system in addition to preventing the aerosols sampled from re-entering the reservoir.

Dilution Robot

The dilution robot was designed to dilute aerosols within the reservoir before analyzing the aerosols with the PM detection system. This is accomplished by mixing a calculated volume of filtered air with the reservoir and potentially removing a fraction of the mixed aerosols and re-diluting before the aerosols is sampled into the PM sensor 112. The system was designed to allow for the user to control the level of particle delivered to the PM sensor 112 or other systems such as lung-on-a-chip devices in order to mimic physiologically relevant parameters by including dilutions that would be seen in the lungs through the mixing of the tidal volume and the dead space. Dilution can also be used if there are saturation limits within one of the systems. The dilution robot theoretically has no lower dilution limit, but the dilution time is dependent on the dilution ratio.

The dilution robot operates through pumping fresh air into the reservoir with a 30 mL syringe, referred to as the sample syringe. The excess volume is captured in another 30 mL syringe referred to as the mixing syringe. The system then, if required to dilute further, will sample a calculated amount of diluted aerosols in the reservoir. The reservoir will then be cleared with the vacuum pump 102 and the aerosols in the sample syringe are injected into the reservoir for further dilution. If further dilution is needed, this process can be repeated. The process is initiated by a signal from the vaping robot indicating that the reservoir is filled with aerosol. After the dilution robot has finished the dilution, it will enter a standby phase, referred to as VR connect, waiting for the vaping robot to sample the aerosols, where it will enter the PM sensor. Once the sampling is complete, a signal is sent from the vaping robot to the dilution robot indicating that the system can start preparing for the next aerosols puff. After this signal is sent either the vaping robot or the dilution robot will clear the reservoir, depending on the configuration, the dilution robot will then enter VR connect waiting for the next aerosols puff.

The dilution robot has an acrylic frame that supports all of the components and mounts on top of the vaping robot. There are access holes on the bottom of the dilution robot so that the connections on the vaping robot can be connected to the reservoir within the dilution robot. There are two main chambers within the dilution robot, the top chamber contains the linear servo motor which drives the syringe actuation adapter. This adapter actuates two plungers that are each connected to syringes pointed in opposite directions. The design allows for conservation of volume while being able to move aerosols/air into sections that can then be fluidically disconnected through the pinch valve array. The pinch valve array is contained in the bottom chamber along with the vacuum pump 102, filters, and electronics. The pinch valve arrays are connected so that air can be taken in or expelled through different filters from the sample syringe. The mixing syringe can intake from the reservoir and expel through another filter. The reservoir can be connected to the two syringes, sample and mixing, to the vaping robot, or to a larger filter and the vacuum pump 102.

The dilution robot is controlled with an Arduino Uno connected to the same type of 8 channel relay shield used in the vaping robot. Similarly, the dilution robot's pinch valves and vacuum are triggered by activating relays which are commanded through the I2C interface. Additionally, a servo motor controller (Actuonix Linear Actuation Control Board) receives commands through a PWM signal generated from the firmware, the servo controller then drives that linear servo (Actuonix, Cat. #: P16-100-64-12-P).

Real-Time Particle Detection System

In order to detect the real-time levels of particle sizes being produced by the e-cigarette aerosols, a PM sensor needed to be incorporated into the system. The PM sensor selected was the Sensirion SPS30, which allowed for the detection of particles ranging from 300 nm to 10 μm, and provided particle count and mass concentration readings. The PM sensor uses an optical detection design, where as a particle travels through the PM sensor housing, it reaches a laser that is constantly active. As a particle traverses through the laser, light is scattered and then reaches a photodiode, which then sends a signal to a processing unit which determines the size of the particle based on factors such as amount of scattered light detected.

A custom-built enclosure for this PM sensor needed to be designed in order to allow for a PM sensor to be able to receive aerosol samples. This enclosure primarily consisted of a two-piece mold-cast PDMS gasket, which provided an airtight seal around the PM sensor itself and isolated the inlet and outlet ports from one another in order to be able to achieve directional flow for the aerosol samples within the overall testing system. The PDMS gasket allowed for respective inlet and outlet tubing posts to be embedded so the PM sensor could interface with the rest of the tubing in the testing system. In order to provide compression to the two-piece gasket to further ensure an airtight seal, a support frame consisting acrylic plating, was fabricated. This PM sensor enclosure was placed in-line with the vaping robot and the breathing-emulator; hence the input port receives the aerosols from the Robot, and the sample is driven through the PM sensor and output port via the breathing-emulator.

In order to operate the PM sensor and retrieve data in real time, a circuit board was designed in order to power the PM sensor and connect it to a microcontroller. Firmware was written to receive and store the data transmitted while the PM sensor is active. When the full system is powered on, the PM sensor is activated and starts collecting data for the full duration of the aerosols collection trial. The data can be monitored via the data log or a graphical user interface that was developed in order to immediately plot the data in a graph sectioned by particle size ranges of 300 nm-1 μm, 1 μm-2.5 μm, 2.5 μm-4 μm, and 4 μm-10 μm, for real-time visual interpretation of the current aerosols analyzed. For the comparison of all trials collected, the data was processed afterwards using MATLAB and GraphPad Prism, which is further detailed in the Data Processing section.

Breathing-Emulator

The breathing-emulator was designed to emulate the dynamic nature of volume displacement within the lungs during either inhalation or exhalation. The software actuating the breathing-emulator translates a selected flow-volume loop and converts this into a cyclic series of volume displacement values and volume displacement rates. This segmented data corresponds to many small, linear in velocity, seeks which when concatenated gives a dynamic breathing curve. The syringe plunger is then actuated to displace the volume of air within the syringe at the programmed rate, where the nozzle of the syringe can be connected to other systems.

The mechanical design of the breathing-emulator achieves three major goals: maintaining reliable long-term operation, stable operation in biological incubator environments, and dynamic displacement of air through executing user specified breathing patterns. In order to dynamically displace air with a syringe, the velocity of the plunger being actuated must also be dynamic. The design has an acrylic based frame, that mounts a motor, which drives a carriage that actuates the plungers through a nut and lead screw system. This allows the motor to be programmed with a complex step rate and step profile to give dynamic, user specified, actuation.

Reliability of the system is also highly important, especially when many or long experiments are being performed. Conventional stepper motors do not have positional feedback and are an open loop system. Over time motor steps are occasionally skipped resulting in drift of the carriage and the plunger used to displace the volume of air. The breathing-emulator was designed to have one large motor instead of multiple smaller motors. Using multiple smaller motors to drive the carriage could lead to the steps becoming desynced between the motors, causing misalignment in the system, torque on the plunger against the syringe walls and damage to components. However, since the system is being driven by a single motor, the motor needs to be capable of supplying sufficient power to move the carriage and syringe plungers; if not, the inability to meet torque required could result in many skipped steps. An additional reliability design feature was adding endstops, or limit switches, to the stroke limits of the system. The endstops will be mechanically trigged and inform the program to correct for the drift and resume operation if enough steps have been skipped that a non-negligible drift has occurred.

The motor is the primary electro-mechanical component on the breathing-emulator. Since standard motors can be damaged from high humidity and requires adequate thermal dissipations and the incubators are set to high humidity levels and temperatures above ambient air, we selected a high-power, humidity proof, stepper motor for the design. With the specified stepper motor, acrylic frame, and minimal metal parts, the system can operate long term with environments that are in an incubator.

The mechanical design, as mentioned, is an acrylic frame with a stepper motor mounted that rotates a lead screw, which actuates the carriage through a nut in the center of the carriage. On the other side of the lead screw is an idler that allows for free rotation of the lead screw. On each side of the carriage is a set of linear bearings that slide along a guide rail to prevent the carriage from rotating when the nut is rotated, thus allowing the rotational movement to be translated into linear movement. Additionally, the guide rails allow for accurate axis straightness during actuation. All components other than the motor are mounted to adapters; this allows for components to be swapped out without redesigning the breathing-emulator. Both the syringes and plungers experience axial force during actuation. To prevent movement of the syringes as well as displacement changes of the plunger relative to the carriage, caps are added to the adapters. The caps are bolted to the adapters to pin the components; the syringe has a single cap on the top and the plunger has a cap on the top and bottom. On one side of the frame is two ports for inserting endstops, and the corresponding adapters. Each endstop is on opposite sides of the seek limits of the carriage. The endstop closest to the syringes are used for both homing the breathing-emulator and detecting lower bound seek errors. The other endstop, closest to the motor, is responsible for detecting upper bound seek errors.

A peripheral printed circuit board (PCB) was designed to control the breathing-emulator motor. The PCB is a shield, meaning that it plugs into another electronic controller, in this case an Arduino Uno. The Arduino Uno runs the breathing-emulator firmware which communicates with the motor driver on the PCB. The motor driver is controlled through 5 main pins: step, direction, micro-step 1, micro-step 2, and micro-step 3. Every time an electrical 5V pulse is sent to the step pin, the motor driver commands the motor to take a step. In this configuration, a whole step is $1/200^{th}$ of a rotation, but the steps can also be configured to be fractions of a step by multiples of 2, such as half step, quarter step, ⅛th step, and $1/16$th step. These fractional steps, called micro-steps, can be configured through setting the 3 micro-step pins. The direction pin controls the direction that the motor rotates and is dependent on a 5V or 0V signal. The motor driver also contains a few unused pins and power related pins, VDD the motor driver power pin, VMOT the motor power pin, and GND the ground pins. The motor driver also has 4 stepper motor driver pins, these pins connect to a 2-phase stepper motor to deliver the required power profile to the motor.

The PCB, along with the stepper motor driver contains header pins to connect afferent and efferent connections to the PCB. These headers include four 2-pin afferent connections for the 12V power that is used to power both the motor and the Arduino Uno, the inhale/exhale signal that is used to synchronize the vaping robot with the breathing-emulator, and the two endstop headers used to detect if the endstops were triggered. Additionally, there is one efferent 4-pin header for the 2-phase motor. The PCB also contains two electrical filters, which reduce the noise observed by the Arduino Uno during the voltage transition of the endstop, which is triggered by the switch being mechanically depressed. The PCB includes a green light emitting diode to indicate when running and a button that can be toggled to turn the system on and off.

The firmware is executed by the Arduino and controls operation of the breathing-emulator. The foundation of the firmware configures the Arduino hardware to generate a dynamic series of pulses to control the motors rotation by setting hardware registers that configure the internal timers which periodically invoke custom interrupt service routines. When the firmware reads a delay value for the motor pulses, it calculates the clock frequency and updates the hardware timers. When the timers invoke the service interrupt routine a step is issued the next delay and step count is indexed, this process is on a continuous loop.

Inhalation Exposure Chamber

The inhalation exposure chamber (outer dimensions: 710 mm×560 mm×650 mm) was designed under the premise of conducting the entirety of the aerosols inhalation trials in an environment that resembles the human lung, in order to provide data which is more physiologically relevant. The chamber was designed to provide a workspace to house the breathing-emulator, vaping robot, and the PM Detection System, while generating an internal environment that maintains stable temperature, humidity and carbon dioxide ($CO_2$) levels at 5% (commonly used in laboratory tissue culture incubators, enabling use of our system in future for in vitro exposure studies), and allows for the ejection of accumulated aerosols buildup. The chamber consists of an environmental control system, and a vacuum ejection system. The environmental control system consists of three subsystems: temperature regulation, humidity regulation, and $CO_2$ regulation. The chamber utilizes a microcontroller with a custom-designed PCB and custom firmware that was designed and written to provide simultaneous regulation of the environmental control subsystems and vacuum ejection system. A key point in the chamber design was for it to be self-regulating and function automatically without user intervention. To accomplish this, the subsystems of the environmental control system utilize a PID (proportional-integral-derivative) algorithm with feedback mechanisms to account for any changes to the internal environment of the chamber and to maintain a stable setpoint. This is important for aerosols collection trials, where the chamber may be repeatedly opened in order to swap e-cigarette cartridges or perform maintenance to any of the other systems within the inhalation exposure chamber.

The temperature regulation subsystem consists of an array of digital thermometer sensors positioned along the inner walls of the chamber to obtain an accurate depiction of internal temperature, as well as a set of heater units. The heater units have independently controlled fans and are fitted on angled mounts, with opposite directions of flow in order to promote proper convection. The sensors relay information back to the central microcontroller and the subsystem firmware detects if the internal temperature is at the setpoint defined (in our case 37° C.). If the temperature is below the setpoint, the heater units are active until the setpoint temperature is reached. As the internal temperature approaches the setpoint, the intensity of the heater units is automatically reduced to avoid thermal overshoot. Once the setpoint is reached, the heaters stably maintain the temperature within ±0.5° C. This algorithm allows the subsystem to respond immediately to changes in the internal environment, such as opening the chamber or if removal of internal air with the purge functionality; the heater fan intensity can increase or decrease accordingly to stabilize the internal temperature towards the setpoint.

The $CO_2$ regulation subsystem was designed in a similar manner. A sensor measures internal $CO_2$ levels and sends this information to the central microcontroller, which then calculates the amount of $CO_2$ that needs to be injected into the chamber. This subsystem consists of the $CO_2$ sensor, two pneumatic pressure regulators, an injection tank of known volume, and series of pneumatic solenoids to control the flow of $CO_2$ gas. The microcontroller determines the amount of $CO_2$ to be injected using a PID algorithm which determines the pressure levels needed to reach the defined setpoint of 5% $CO_2$, as well as the frequency that injections need to be introduced into the chamber. This allows for increasing the $CO_2$ levels within the chamber to reach and maintain the setpoint while avoiding overshooting the amount of $CO_2$ introduced. The frequency and amount of $CO_2$ injected is reduced as the internal levels reach that of the setpoint. If a dramatic overshoot is detected, a second pressure regulator is activated in order to allow for the injection of clean air into the chamber to reduce the $CO_2$ concentration.

The humidity regulation subsystem was designed similarly to the temperature regulation subsystem, utilizing a RH sensor to provide information to the central microcontroller about the internal humidity of the chamber. This subsystem was mainly designed so this chamber platform could be used to perform aerosols exposure trials on live cells. If the RH was detected below the defined setpoint of 70%, then a humidifier unit would be activated to reach and maintain the humidity setpoint. This humidifier unit was designed with a small footprint, a lid with perforated holes that allows for humidity to escape the unit while reducing larger droplets from exiting the chamber as well as transparent housing that allows for monitoring of current water levels.

This environmental control system allowed for all trials to be conducted at 37° C., 70% RH, and 5% $CO_2$ concentration. The code for all the subsystems within the inhalation exposure chamber is combined into a singular controller firmware for simultaneous regulation of each process, while also allowing for controlling the vacuum ejection system. The vacuum ejection system is a binary system and was designed to remove any particle build up that occurs during the aerosols trials or other experiments. This system consists of a series of solenoids, filters, and a high flow rate vacuum pump 102. The solenoids are normally closed in order to maintain an isolated internal environment. When activated, the solenoids impeding flow from the chamber to the vacuum pump 102 are opened and the pump is activated. A solenoid impeding flow from the chamber to open air is also opened simultaneously to allow air into the chamber. All air being removed and introduced passes through inline HEPA filters, and the system was designed in order to equilibrate pressure while it is activated, so there is no negative pressure buildup internally. The vacuum ejection system is manually triggered when the user determines that there is sufficient smoke buildup using a dedicated GUI control program designed for the inhalation exposure chamber; alternatively the system can be set to activate on a timer.

The inhalation exposure chamber consists of a metal bracket frame, providing the majority of the support structure for the chamber, and double-paned acrylic panels for the walls. This allows for a proper sealed insulation of heat, humidity, and gas within the chamber to maintain the setpoints and provide an isolated internal environment. Within the chamber is a custom humidifier unit and a set of support rails along the wall panels that allow for the placement of necessary internal electronic components, such as heaters, fans, sensors, and isolated wiring. On the back side of the chamber, separated from the main internal chamber, is an electronics component compartment which houses the majority of the electrical components of the inhalation exposure chamber, including the microcontroller that drives all functions of the chamber, as well as the mounted custom PCB. This PCB contains the circuitry for all of the systems and their connection to the microcontroller. This compartment also houses other electronic components such as relays, converters, and power supply units. All pneumatic components for the chamber, except for the externally connected vacuum pump and associated solenoid, also reside in this compartment, such as pressure regulators, tanks, tubing, solenoids, and air filters.

Programing and Coding

The various subsystems of the project required programming in order to function, including: The vaping robot, PM Detection System, inhalation exposure chamber, breathing-emulator, dilution robot and software for raw data processing. All non-software (firmware only) systems are operated by Arduino microcontrollers running firmware programmed in C/C++ using the Arduino IDE (Integrative Development Environment) and Microsoft Visual Studio IDE.

The firmware controlling the vaping robot operates its pinch valve system, ensuring aerosols only flow forward through the breathing-emulator or out into a filter and not back into the reservoir. The firmware also controls the vacuum pump 102 responsible for puffing the E-cigarette. Both of these are controlled by the firmware communicating to the connected 8-channel relay shield through an I2C protocol by bit masking the data packet to active the appropriate relay.

The dilution robot also utilizes the firmware to control for timing of pinch valves and vacuums through communicating with the same type of shield. Additionally, the dilution robot's firmware is responsible for controlling a linear servo and synchronizing the actuation with the pinch valve timing. The firmware for the linear servo utilizes the Servo.h library for Arduino. The PM Detection System sends raw data from the SPS30 PM sensor to the serial output of the Arduino utilizing the SPS30-uart library provided by the Sensirion company. The inhalation exposure chamber utilizes temperature, humidity, and $CO_2$ sensors as inputs for its PID environmental control system and the AutoPID and PWM Frequency libraries to control $CO_2$ injection and heater temperature. The firmware utilizes the PID and PWM libraries to drive buck converters and binary activated components, including solenoids and relays. The firmware for the breathing-emulator steps the Arduino through two arrays of motor commands which control the position of the syringe pump. The first array contains the appropriate number of motor steps while the second array tells the Arduino the rate at which to send the motor step commands. The firmware loops through a series of checks for non-periodic interrupts while setting up hardware in the background to invoke firmware methods when the calculated timers are reached. When the firmware method is invoked from an expired timer, the method sends a step signal to the motor driver and updates the hardware register timers for the next index as well as updates other meta data and then resumes the main firmware loop.

In addition to firmware, software was developed to create motor command arrays for the breathing-emulator and to process the raw data produced by the PM Detection System. The breathing-emulator breathing profile generator software was developed in MATLAB and takes volume and flowrate parameters from spirometry flow-volume loops or approximated data as inputs and outputs motor step and step-rate arrays which can be executed by the systems firmware. Data processing software was developed in C++ and MATLAB; a thorough explanation of the data processing workflow can be found in the following section, Data Processing.

Data Processing

As the breathing-emulator flows aerosols through the PM sensor, data from the PM sensor is displayed in the serial monitor. At the completion of each full test cycle, the text on this serial monitor is copied into a text file (.txt) and saved. The data includes quantities over time of mass concentration in μg/$m^3$ and numerical count of particles per $cm^3$. The data samples at % Hz and captures particles within four different size ranges: 300 nm-1.0 μm, 1 μm-2.5 μm, 2.5 μm-4.0 μm, and 4 μm-10.0 μm.

A C++ program then scans each text file and processes the data by separating it into concentration or count and storing each dataset in a comma-separated value (.csv) file. Each file includes a column identifying the particle size range. A text file is also automatically generated listing each data file that has been processed.

The rest of the processing is done in MATLAB. A function reads the text file created by the C++ program to know which files to analyze. For each file, it reads the data and stores it in a variable based on particle size. For each particle size, the sum of the smaller particle ranges is subtracted. This results in the sets representing non-overlapping ranges of 300 nm-1.0 μm, 1.0 μm-2.5 μm, 2.5 μm-4.0 μm, and 4.0 μm-10.0 μm. From here the data is graphed with all four particle sizes for one run on a single graph.

The data are then passed to a sub-function that locates the peak particle counts and concentrations within each trial and marks them on the graph as a vertical line. The number of peaks sought is based on the number of aerosols puffs in the trial. The sum of the particles counted per $cm^3$ from a puff is calculated by summing the values between the minimum before a peak and the minimum after the same peak in the particles counted per $cm^3$ data. Particle flow rate, if needed, is determined by multiplying the total particles counted per $cm^3$ by the total volume displaced of one breath divided by the time of one breath, giving mean particle flow rate per second.

These values are then organized based on grouped datasets, so all trials for the experiment that were completed with the same VEA, nicotine concentration, and breathing profile are placed together. They are exported to Microsoft Excel (.xlsx) files for statistical analysis within GraphPad Prism.

Real-Time Quantitative Analysis of EC Aerosols

The E-cigarette vaping robot was used with the dilution robot and the breathing-emulator to reliably aerosolize the E-cigarette liquids, dilute the aerosols, and inhale them into the Particle Detection System for quantitative analysis. The process begins with the vaping robot activating a vacuum pump 102, which acts to puff the E-cigarette and draw aerosol into the dilution robot's holding reservoir. Once the puff is complete, the aerosol is diluted with the dilution robot, the E-cigarette aerosols are inhaled from the reservoir into the Particle Detection System by the retraction of the breathing-emulator's plungers, and exhaled on the corresponding extension of the plungers. This allows for real-time analysis of particle distributions of a repeatable quantity of inhaled aerosols collected in a manner that is physiologically relevant.

In our studies, E-cigarette liquids containing 50/50 concentration of glycerol (Sigma, Cat. #: W262606) and propylene glycol (Sigma, Cat. #: W294004) was combined with VEA (a-tocopheryl acetate) and/or nicotine to yield VEA concentrations of 0, 1.25, 2.5, and 5% (v/v) (Sigma, Cat. #: T3376) and nicotine concentrations of 0, 0.6, 1.2, and 2.4% (v/v) (Sigma, Cat. #: N3876). All sets of E-liquid samples were generated through serial dilutions. The E-liquid was used to compare the particle concentrations of the aerosols produced by healthy, obstructive, and restrictive breathing patterns as well as differences between the different ratios of VEA and nicotine with a healthy breathing profile. Tests were conducted using G6 E-cigarette batteries (Halo, 280 mAh 78 mm, ~3.7 volts) and Vapor4Life Clearomizers cartridges (808D Thread, 1.3 mL e-liquid volume, 1.8 ohm) cartridges. This yielded a power usage of ~7.6 watts. Seven trials were taken for each of the data sets with nine puffs per trial, for a total of 63 puffs per data set.

We took the following items into consideration when performing our studies: (i) Tubing material. We wanted tubing with minimal adsorptive properties on flowing particles that exhibits lowest aerosols condensation. After investigating five different tubing types, we found that PTFE was the most optimal material as it allowed maximal transmission of all four particle sizes being testing through the tubing to the sensor. Transmission was comparable to having no tubing and directly measuring particles coming from EC mouth-piece. Thus, we used PTFE tubing (inner radius: 1 mm) for connections in our system, except at the pinch valves which required Platinum-Cured Silicone tubing (Clippard; inner radius: 400 μm). (ii) Total tubing length. The total tubing length in our platform was approximately 1 m from the site of aerosols generation through the Sensor; much shorter than commercialized smoking/vaping machines (a significant advantage). To minimize any effect that dead volume of the tubing can have on the results, we studied tidal volume fractions—i.e., sample volumes, in the 30-50 mL range that are beyond the total dead volume in our tubing connections (~8 mL). (iii) Syringes. The syringes in the breathing-emulator were made of glass. They had no impact (e.g., through electrostatic effects) on particle quantities or particle quality (e.g., due to local decompression as aerosols pass through narrow inlets of the syringes), because they were placed past the PM sensor meaning aerosols that reached the syringes have already been sampled and analyzed. (iv) Sample Volume. To avoid exceeding the upper detection limit of our Sensor, we used sample volumes less than 50 mL. As such, the breathing curves (FIG. 9) were not executed to reflect the full tidal volume (500-555 mL). Importantly, this did not affect our analyses, as the endpoint was number concentration—i.e., total particles in each fraction per $cm^3$. (v) Sensor choice. The choice of Sensor (Sensirion SPS30) in our platform was made after thorough comparison against other commercially available particle detection systems (see Discussion). (vi) Robotic Program. When designing our robotic platform, we ensured that EC aerosols only passed the Sensor during inhalation phase and then left the system through a filter. This was to allow us to conduct a more accurate and meaningful analysis.

The disclosed system can also be used as diagnostic platform. For instance, it can be applied to identify airborne particle characteristics (quantities and size distributions) in real-time (while mimicking breathing) in occupational and battlefield settings—i.e., beyond characterization of airborne particles in e-cigarettes or other tobacco-related products. In these cases, there is no need for vaping robot—a sub-component of the system, to generate fresh e-cigarette vapor. Rather, outside air would be sampled (and diluted, if needed) and analyzed for particle quantities and size distributions. Here, for instance, our system allows detection of dangerously high levels or toxic levels of particles in environment surrounding people (civilians and military personnel) so appropriate action can be taken. This is particularly important as it can help prevent new lung injury development or exacerbation of a pre-existing morbidity (e.g., asthma) in humans (and animals).

In addition, the input to the system to be tested can be a liquid and not just air/gas.

The disclosed system can also be used for any tobacco-related product (including cigars, conventional cigarettes, hookah tobacco, synthetic nicotine, etc.), not just e-cigarettes. In these cases, the vaping robot (that generates negative pressure behind e-cigarette to create puffs) will be replaced with appropriate machine—i.e., cigarette smoking machine, hookah smoking machine, etc.

Similarly, the disclosed system can mimic breathing profile of any health and diseased state of any age (pediatric, adult and geriatric).

The position of valves (for flow of material to be characterized) can be amended to meet the needs of the system. For instance, if the dilution of e-cigarette vapor needs to be in separate reservoirs, new layout of pinch valves can be created to direct the air/vapor flow so they can be diluted appropriately in new reservoirs and then forwarded to PM sensor for analysis.

Quantifications and Statistical Analysis

Statistical analysis of particle concentrations, count, or flow rates measured for comparisons of differences in breathing profiles and VEA and nicotine concentrations were tested for a normal distribution with the Shapiro-Wilk test (alpha level 0.05) in GraphPad Prism. None of the experiments had all data sets with a normal distribution. To compare the distributions of the particle concentrations, count, or flow rates the non-parametric Kruskal-Wallis test (alpha level 0.05) was used. Post Hoc analysis was performed with the Dunn's Multiple Comparison Test where differences between the data sets were considered statistically significant when $p<0.05$ (* $p<0.05$,  $p<0.01$, * $p<0.001$, **** $p<0.0001$). Each data point corresponds to a single aerosols puff, there were nine aerosols puffs per session with 7 sessions total per data set.

| REAGENT or RESOURCE | SOURCE | IDENTIFIER |
|---|---|---|
| Antibodies | | |
| N/A | | |
| Bacterial and virus strains | | |
| N/A | | |
| Biological samples | | |
| N/A | | |
| Chemicals, peptides, and recombinant proteins | | |
| (+/−)-A-Tocopherol Acetate | Sigma-Aldrich | T3376-100G |
| Propylene Glycol | Sigma-Aldrich | W294004-1KG-K |
| Glycerol | Sigma-Aldrich | W252506-1KG-K |
| Critical commercial assays | | |
| N/A | | |

-continued

| REAGENT or RESOURCE | SOURCE | IDENTIFIER |
|---|---|---|
| Deposited data | | |
| N/A | | |
| Experimental models: Cell lines | | |
| N/A | | |
| Experimental models: Organisms/strains | | |
| N/A | | |
| Oligonucleotides | | |
| N/A | | |
| Recombinant DNA | | |
| N/A | | |
| Software and algorithms | | |
| Custom SPS30 sensor processing software | This article | Available from lead contact upon request |
| Other | | |
| N/A | | |

REFERENCES

20768:2018, I. 2018. Vapour Products—Routine Analytical Vaping Machine Definitions and Standard Conditions [Online]. Available: https://www.iso.org/standard/69019.html [Accessed].

ADAMSON, J., THORNE, D., MCAUGHEY, J., DILLON, D. & MEREDITH, C. 2013. Quantification of cigarette smoke particle deposition in vitro using a triplicate quartz crystal microbalance exposure chamber. *Biomed Res Int,* 2013, 685074.

BENAM, K. H. & INGBER, D. E. 2016. Commendation for Exposing Key Advantage of Organ Chip Approach. *Cell Syst,* 3, 411.

BENAM, K. H., MAZUR, M., CHOE, Y., FERRANTE, T. C., NOVAK, R. & INGBER, D. E. 2017. Human Lung Small Airway-on-a-Chip Protocol. *Methods Mol Biol,* 1612, 345-365.

BENAM, K. H., NOVAK, R., FERRANTE, T. C., CHOE, Y. & INGBER, D. E. 2020. Biomimetic smoking robot for in vitro inhalation exposure compatible with microfluidic organ chips. *Nat Protoc,* 15, 183-206.

BENAM, K. H., NOVAK, R., NAWROTH, J., HIRANO-KOBAYASHI, M., FERRANTE, T. C., CHOE, Y., PRANTIL-BAUN, R., WEAVER, J. C., BAHINSKI, A., PARKER, K. K. & INGBER, D. E. 2016a. Matched-Comparative Modeling of Normal and Diseased Human Airway Responses Using a Microengineered Breathing Lung Chip. *Cell Syst,* 3, 456-466 e4.

BENAM, K. H., VILLENAVE, R., LUCCHESI, C., VARONE, A., HUBEAU, C., LEE, H. H., ALVES, S. E., SALMON, M., FERRANTE, T. C., WEAVER, J. C., BAHINSKI, A., HAMILTON, G. A. & INGBER, D. E. 2016b. Small airway-on-a-chip enables analysis of human lung inflammation and drug responses in vitro. *Nat Methods,* 13, 151-7.

BHAT, T. A., KALATHIL, S. G., BOGNER, P. N., BLOUNT, B. C., GONIEWICZ, M. L. & THANAVALA, Y. M. 2020. An Animal Model of Inhaled Vitamin E Acetate and EVALI-like Lung Injury. *N Engl J Med,* 382, 1175-1177.

BLOUNT, B. C., KARWOWSKI, M. P., SHIELDS, P. G., MOREL-ESPINOSA, M., VALENTIN-BLASINI, L.,

GARDNER, M., BRASELTON, M., BROSIUS, C. R., CARON, K. T., CHAMBERS, D., CORSTVET, J., COWAN, E., DE JESUS, V. R., ESPINOSA, P., FERNANDEZ, C., HOLDER, C., KUKLENYIK, Z., KUSOVSCHI, J. D., NEWMAN, C., REIS, G. B., REES, J., REESE, C., SILVA, L., SEYLER, T., SONG, M. A., SOSNOFF, C., SPITZER, C. R., TEVIS, D., WANG, L., WATSON, C., WEWERS, M. D., XIA, B., HEITKEMPER, D. T., GHINAI, I., LAYDEN, J., BRISS, P., KING, B. A., DELANEY, L. J., JONES, C. M., BALDWIN, G. T., PATEL, A., MEANEY-DELMAN, D., ROSE, D., KRISHNASAMY, V., BARR, J. R., THOMAS, J., PIRKLE, J. L. & LUNG INJURY RESPONSE LABORATORY WORKING, G. 2020. Vitamin E Acetate in Bronchoalveolar-Lavage Fluid Associated with EVALI. *N Engl J Med,* 382, 697-705.

BOWLER, R. P., HANSEL, N. N., JACOBSON, S., GRAHAM BARR, R., MAKE, B. J., HAN, M. K., O'NEAL, W. K., OELSNER, E. C., CASABURI, R., BARJAKTAREVIC, I., COOPER, C., FOREMAN, M., WISE, R. A., DEMEO, D. L., SILVERMAN, E. K., BAILEY, W., HARRINGTON, K. F., WOODRUFF, P. G., DRUMMOND, M. B., FOR, C. & INVESTIGATORS, S. 2017. Electronic Cigarette Use in US Adults at Risk for or with COPD: Analysis from Two Observational Cohorts. *J Gen Intern Med,* 32, 1315-1322.

CAMBUSTION. 2020. SCS Smoking/Vaping Machine [Online]. Available: https://www.cambustion.com/products/scs [Accessed].

CZEKALA, L., SIMMS, L., STEVENSON, M., TSCHIERSKE, N., MAIONE, A. G. & WALELE, T. 2019. Toxicological comparison of cigarette smoke and e-cigarette aerosol using a 3D in vitro human respiratory model. *Regul Toxicol Pharmacol,* 103, 314-324.

DARQUENNE, C. 2012. Aerosol deposition in health and disease. *J Aerosol Med Pulm Drug Deliv,* 25, 140-7.

DIPASQUALE, M., GBADAMOSI, O., NGUYEN, M. H. L., CASTILLO, S. R., RICKEARD, B. W., KELLEY, E. G., NAGAO, M. & MARQUARDT, D. 2020. A Mechanical Mechanism for Vitamin E Acetate in E-cigarette/Vaping-Associated Lung Injury. *Chem Res Toxicol,* 33, 2432-2440.

DUFFY, B., LI, L., LU, S., DUROCHER, L., DITTMAR, M., DELANEY-BALDWIN, E., PANAWENNAGE, D., LEMASTER, D., NAVARETTE, K. & SPINK, D. 2020. Analysis of Cannabinoid-Containing Fluids in Illicit Vaping Cartridges Recovered from Pulmonary Injury Patients: Identification of Vitamin E Acetate as a Major Diluent. *Toxics,* 8.

FDA. 2019. Premarket Tobacco Product Applications for Electronic Nicotine Delivery Systems—Guidance for Industry [Online]. Available: https://www.fda.gov/media/127853/download [Accessed].

FDA. 2020. FDA's Predictive Toxicology Roadmap [Online]. Available: https://www.fda.gov/science-esearch/about-science-research-fda/fdas-predictive-toxicology-roadmap [Accessed].

KAISAR, M. A., VILLALBA, H., PRASAD, S., LILES, T., SIFAT, A. E., SAJJA, R. K., ABBRUSCATO, T. J. & CUCULLO, L. 2017. Offsetting the impact of smoking and e-cigarette vaping on the cerebrovascular system and stroke injury: Is Metformin a viable countermeasure? *Redox Biol,* 13, 353-362.

KOZLOVICH, S., HARVANKO, A. M. & BENOWITZ, N. L. 2021. Vitamin E Acetate is not Soluble in Nicotine E-liquids. *Tobacco Regulatory Science,* 7, 130-134(5).

KRISHNASAMY, V. P., HALLOWELL, B. D., KO, J. Y., BOARD, A., HARTNETT, K. P., SALVATORE, P. P., DANIELSON, M., KITE-POWELL, A., TWENTYMAN, E., KIM, L., CYRUS, A., WALLACE, M., MELSTROM, P., HAAG, B., KING, B. A., BRISS, P., JONES, C. M., POLLACK, L. A., ELLINGTON, S. & LUNG INJURY RESPONSE EPIDEMIOLOGY/SURVEILLANCE TASK, F. 2020. Update: Characteristics of a Nationwide Outbreak of E-cigarette, or Vaping, Product Use-Associated Lung Injury United States, August 2019-January 2020. *MMWR Morb Mortal Wkly Rep,* 69, 90-94.

LI, L., LEE, E. S., NGUYEN, C. & ZHU, Y. 2020. Effects of propylene glycol, vegetable glycerin, and nicotine on emissions and dynamics of electronic cigarette aerosols. *Aerosol Science and Technology,* 1-12.

MERECZ-SADOWSKA, A., SITAREK, P., ZIELINSKA-BLIZNIEWSKA, H., MALINOWSKA, K., ZAJDEL, K., ZAKONNIK, L. & ZAJDEL, R. 2020. A Summary of In Vitro and In Vivo Studies Evaluating the Impact of E-Cigarette Exposure on Living Organisms and the Environment. *Int J Mol Sci,* 21.

MIKHEEV, V. B., IVANOV, A., LUCAS, E. A., SOUTH, P. L., COLIJN, H. O. & CLARK, P. I. 2018. Aerosol size distribution measurement of electronic cigarette emissions using combined differential mobility and inertial impaction methods: Smoking machine and puff topography influence. *Aerosol Sci Technol,* 52, 1233-1248.

MUTHUMALAGE, T., LUCAS, J. H., WANG, Q., LAMB, T., MCGRAW, M. D. & RAHMAN, I. 2020. Pulmonary Toxicity and Inflammatory Response of E-Cigarette Vape Cartridges Containing Medium-Chain Triglycerides Oil and Vitamin E Acetate: Implications in the Pathogenesis of EVALI. *Toxics,* 8.

OLDHAM, M. J., ZHANG, J., RUSYNIAK, M. J., KANE, D. B. & GARDNER, W. P. 2018. Particle size distribution of selected electronic nicotine delivery system products. *Food Chem Toxicol,* 113, 236-240.

OVERBEEK, D. L., KASS, A. P., CHIEL, L. E., BOYER, E. W. & CASEY, A. M. H. 2020. A review of toxic effects of electronic cigarettes/vaping in adolescents and young adults. *Crit Rev Toxicol,* 1-8.

PEPPER, J. K., RIBISL, K. M. & BREWER, N. T. 2016. Adolescents' interest in trying flavoured e-cigarettes. *Tob Control,* 25, ii62-ii66.

REAGAN-STEINER, S., GARY, J., MATKOVIC, E., RITTER, J. M., SHIEH, W. J., MARTINES, R. B., WERNER, A. K., LYNFIELD, R., HOLZBAUER, S., BULLOCK, H., DENISON, A. M., BHATNAGAR, J., BOLLWEG, B. C., PATEL, M., EVANS, M. E., KING, B. A., ROSE, D. A., BALDWIN, G. T., JONES, C. M., KRISHNASAMY, V., BRISS, P. A., WEISSMAN, D. N., MEANEY-DELMAN, D., ZAKI, S. R. & LUNG INJURY RESPONSE PATHOLOGY WORKING, G. 2020. Pathological findings in suspected cases of e-cigarette, or vaping, product use-associated lung injury (EVALI): a case series. *Lancet Respir Med.*

ROUADI, P., BAROODY, F. M., ABBOTT, D., NAURECKAS, E., SOLWAY, J. & NACLERIO, R. M. 1999. A technique to measure the ability of the human nose to warm and humidify air. *J Appl Physiol* (1985), 87, 400-6.

SOSNOWSKI, T. R., JABLCZYNSKA, K., ODZIOMEK, M., SCHLAGE, W. K. & KUCZAJ, A. K. 2018. Physicochemical studies of direct interactions between lung surfactant and components of electronic cigarettes liquid mixtures. *Inhal Toxicol,* 30, 159-168.

WU, D. & O'SHEA, D. F. 2020. Potential for release of pulmonary toxic ketene from vaping pyrolysis of vitamin E acetate. *Proc Nal Acad Sci USA,* 117, 6349-6355.

Figure Legends

FIG. 1A, FIG. 1B, FIG. 1C, FIG. 1D, and FIG. 1E are perspective views of an microparticle analyzer according to embodiments of the present disclosure.

FIG. 1A illustrates a vaping robot responsible for activating electronic cigarettes (ECs) 100 and capturing the aerosols into a reservoir from which the breathing-emulator inhales. The system consists of ECs connected to an array of pinch valves 106, through a sealed custom gasket, which are responsible for fluidically connecting and disconnecting lines to allow for the proper flow depending on the current state of the system. An onboard vacuum pump 102 is responsible for pulling the EC aerosols into the reservoir. All of the functionality of the vaping robot is controlled by a microcontroller and a series of relays 104 and is powered with an onboard power supply.

Figure 1B:
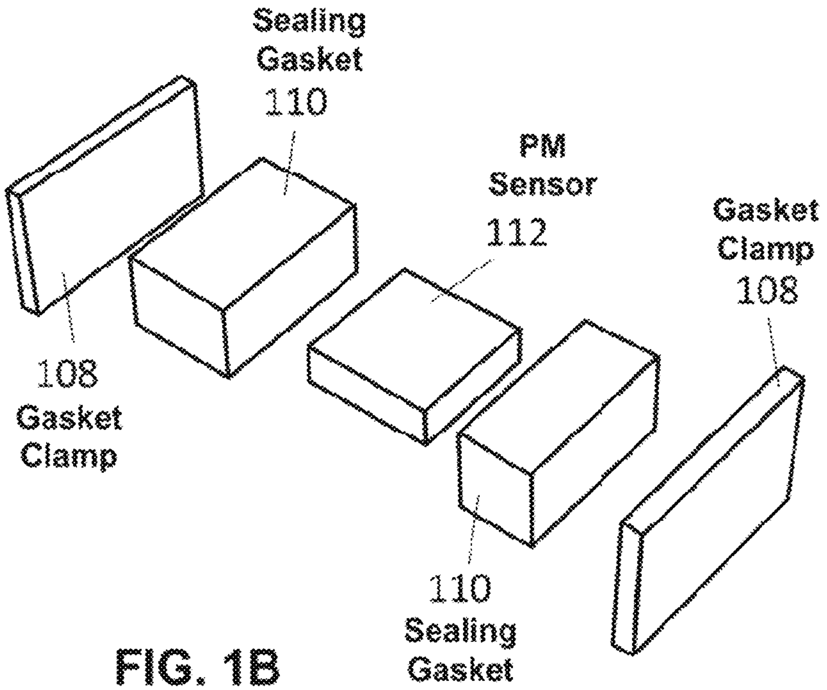
Figure 1C:
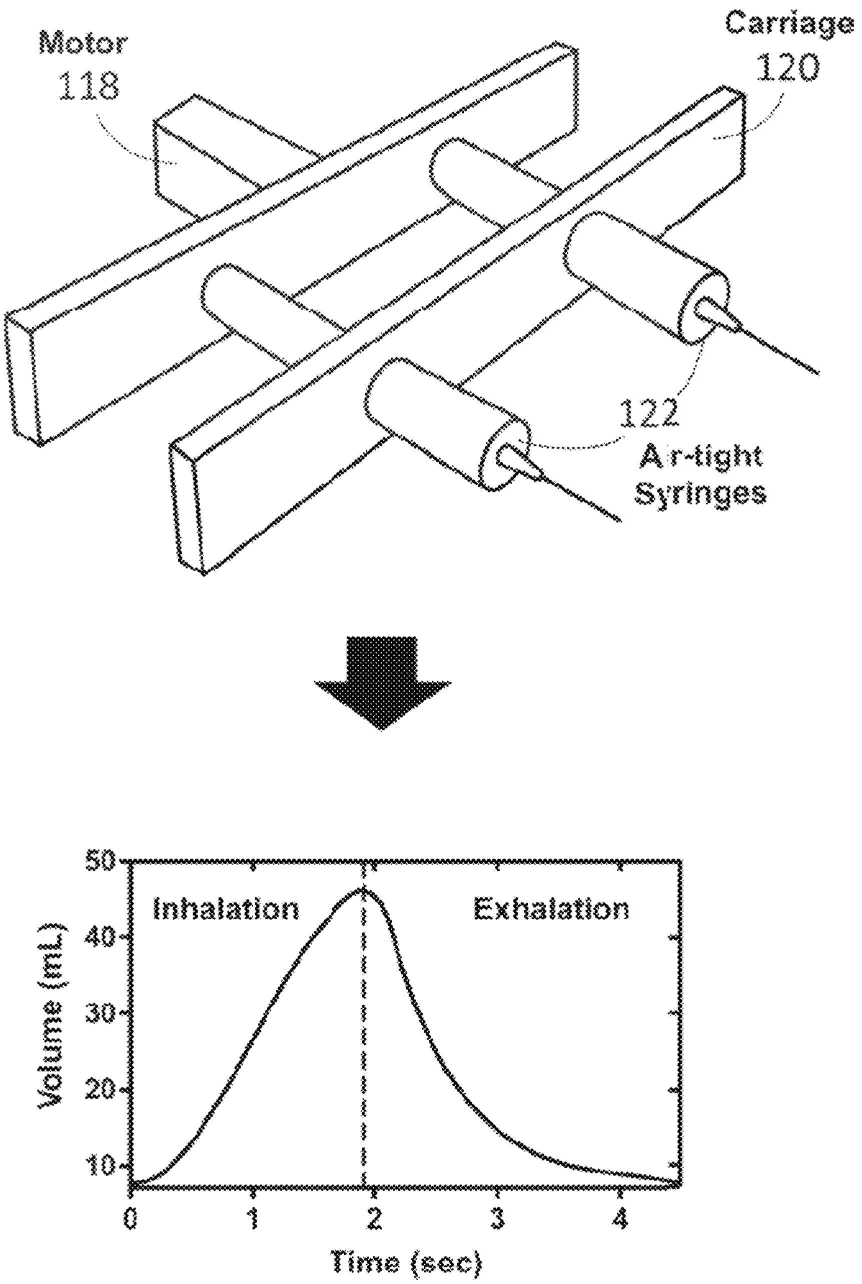
Figure 1D:
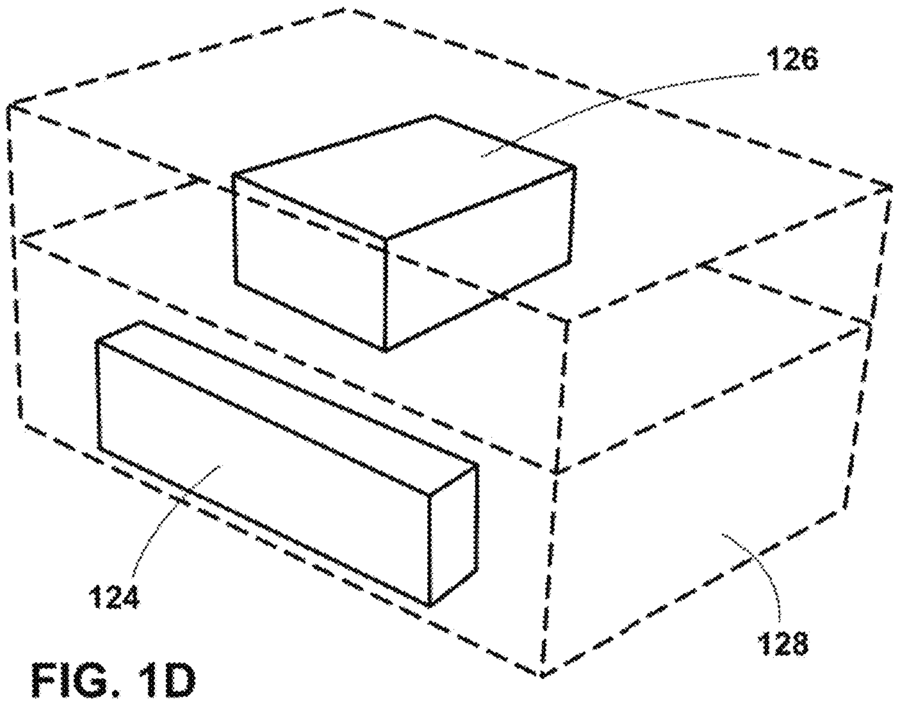

FIG. 1B illustrates an inline particulate matter sensor 112 responsible for detecting the quantities of particles passing through the system that are categorized into four different particle size ranges, the smallest particle size group is from 300 nm-1 μm, then 1 μm-2.5 μm, 2.5 μm-4 μm, and as the largest 4 μm-10 μm. The PM sensor 112 is a laser-based technology that utilizes optical diffraction produced from the passing particles. Alternatively, the PM sensor 112 can be based on a non-optical technology. The PM sensor 112 is contained within a custom airtight gasket 110 and is sealed by pressure applied to the gaskets 110 through the gasket clamps 108, where one side of the clamp 108 has two ports which link the breathing-emulator and the vaping robot.

FIG. 1C illustrates a breathing-emulator mimics physiological breathing through actuating plungers of air-tight syringes 122 that are mounted to the carriage 120 of the system. The breathing-emulator is programmed with a clinically relevant breathing profile that gives a dynamic flow rate through actuating the movement of the plungers at a dynamic velocity. When the plungers are retracted the breathing-emulator is inhaling and when compressed the breathing-emulator is exhaling.

FIG. 1D illustrates a dilution robot containing onboard electronics 128, a series of pinch valves 124 and filters, a vacuum pump, and a mechanical actuation system 126 for driving two 30 mL syringes. It sits on top of the vaping robot and connects to it via its two fluidic connections. The system can be programmed to dilute the aerosols collected by the vaping robot at any specified factor. The dilution robot's dilution profile is synchronized with the vaping robot's vaping regiment so that dilution occurs and ends within the appropriate time (after the vaping robot's puff but before the inhalation of the aerosols).

Figure 1E:
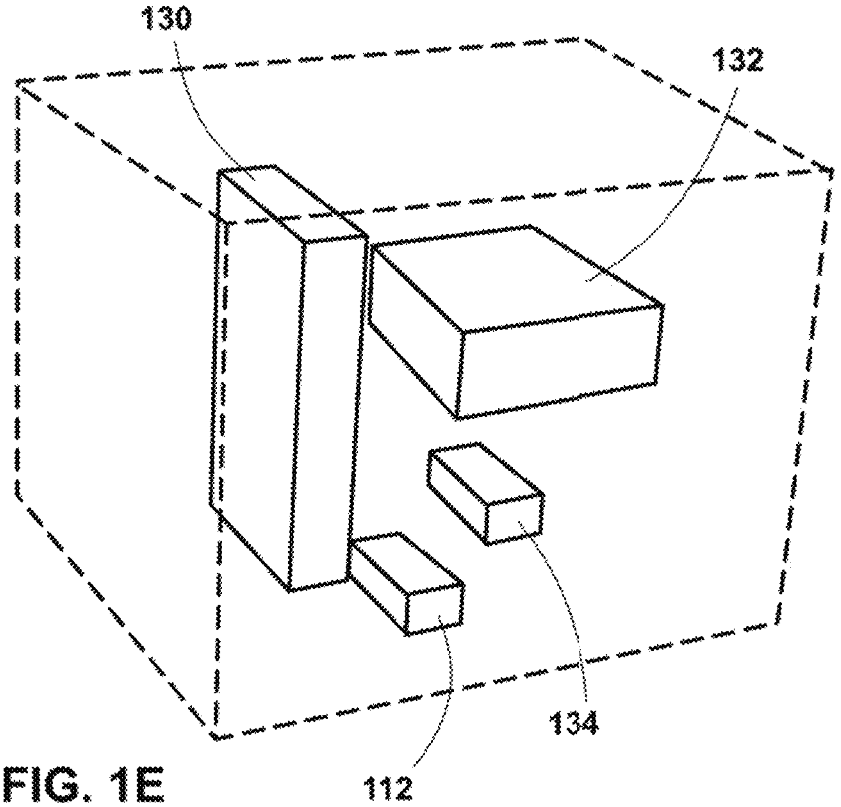

FIG. 1E illustrates a custom-engineered inhalation exposure chamber system that controls the internal atmosphere conditions by sensing and regulating humidity, carbon dioxide, and temperature. It is purposefully designed to house all the other hardware used for the experiments in FIG. 1A, FIG. 1B, FIG. 1C, FIG. 1D, including the breathing-emulator 130, the inline PM sensor 112, the vaping robot 134, and the dilution robot 132.

FIG. 2A and FIG. 2B illustrate impact of vitamin E acetate (VEA) on inhaled particle count. FIG. 2A illustrates real-time particle count (per $cm^3$) as a function of time for four particle size distributions (300 nm-1 μm, 1 μm-2.5 μm, 2.5 μm-4 μm, and 4 μm-10 μm) during 9 cycles of the vaping session is illustrated. The data was generated from representative e-liquid containing VEA at 5% (v/v) concentration in 50/50 propylene glycol/vegetable glycerin (PG/VG). FIG. 2B illustrates distribution profiles of the total particle counts per $cm^3$ over each inter-puff interval for each size fraction (300 nm-1 μm, 1 μm-2.5 μm, 2.5 μm-4 μm, and 4 μm-10 μm) in the absence or presence of increasing doses of VEA (v/v at 0%, 1.25%, 2.5%, and 5%) are plotted. Kruskal-Wallis test demonstrated statistical significance ($p<0.0001$), and post-hoc analysis (Dunn's multiple comparison test) showed statistically significant differences between all data sets except 1.25% and 2.5% for all particle size distributions. Error bars indicate mean and 95% confidence intervals for each data set.

Figure 3:
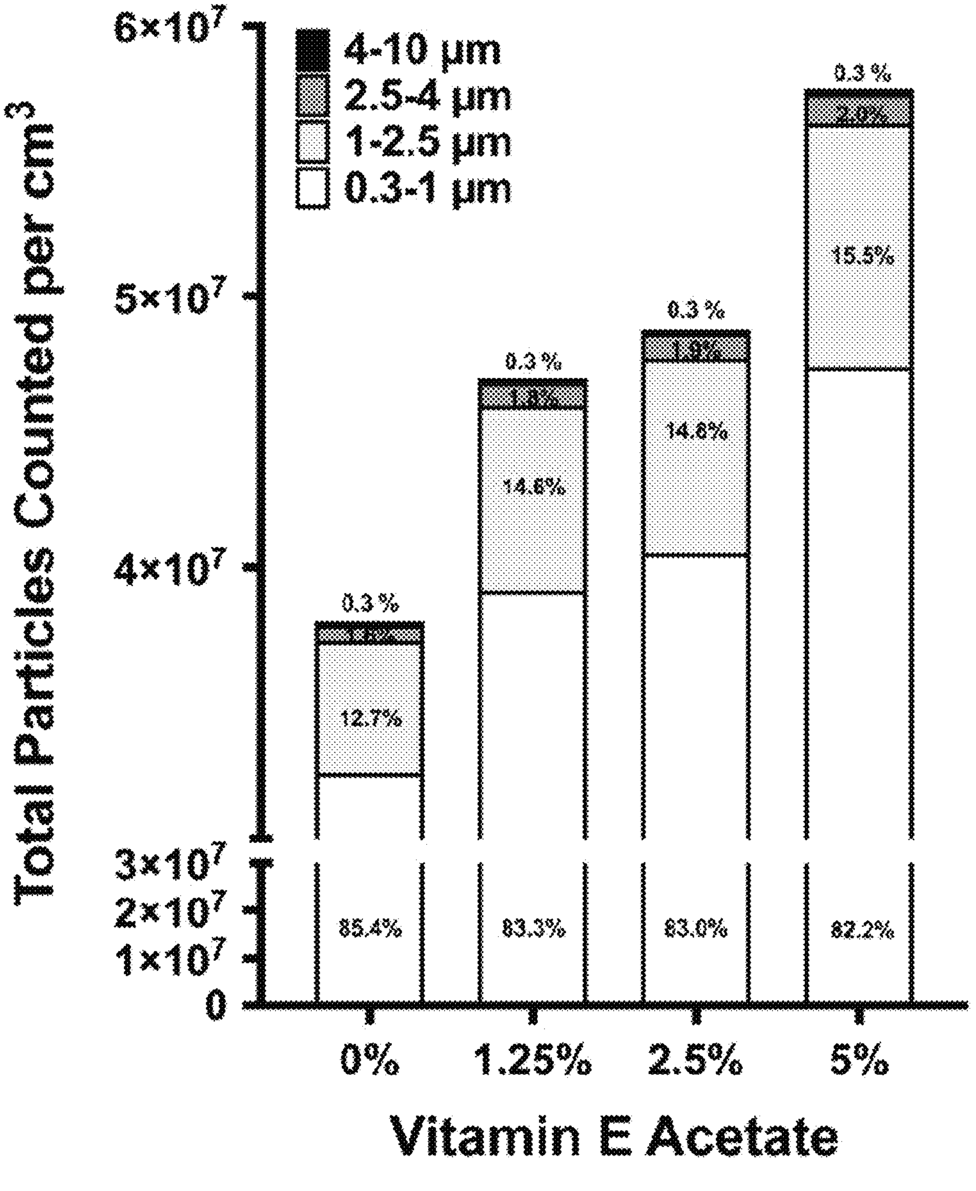
FIG. 3 illustrates impact of varying doses of electronic cigarette vitamin E acetate content on cumulative total sub-micron and microparticles inhaled over a representative vaping regiment.

FIG. 3 illustrates impact of varying doses of electronic cigarette vitamin E acetate content on cumulative total sub-micron and microparticles inhaled over a representative vaping regiment. Total combined particles per $cm^3$ were counted at a sampling rate of 1.3 seconds over the course of seven independent vaping sessions (at 9 puffs per session) in the presence of a range of VEA concentrations (0%-5% v/v in 50/50 PG/VG). For each condition, the particle distribution size profile was segmented to display relative measured abundance of each size fraction as a percentage of total particles that were counted. The 0% VEA yielded $3.25\times10^7$ particles/$cm^3$ within 300 nm-1 μm (85.4% of total), $4.84\times10^6$ particles/$cm^3$ within 1 μm-2.5 μm (12.7% of total), $6.05\times10^5$ particles/$cm^3$ within 2.5 μm-4 μm (1.6% of total), and $9.65\times10^4$ particles/$cm^3$ within 4 μm-10 μm (0.3% of total). The 1.25% VEA yielded $3.91\times10^7$ particles/$cm^3$ within 300 nm-1 μm (83.3% of total), $6.83\times10^6$ particles/$cm^3$ within 1 μm-2.5 μm (14.6% of total), $8.56\times10^5$ particles/$cm^3$ within 2.5 μm-4 μm (1.8% of total), and $1.36\times10^5$ particles/$cm^3$ within 4 μm-10 μm (0.3% of total). The 2.5% VEA yielded $4.05\times10^7$ particles/$cm^3$ within 300 nm-1 μm (83.0% of total), $7.23\times10^6$ particles/$cm^3$ within 1 μm-2.5 μm (14.8% of total), $9.07\times10^5$ particles/$cm^3$ within 2.5 μm-4 μm (1.9% of total), and $1.44\times10^5$ particles/$cm^3$ within 4 μm-10 μm (0.3% of total). The 5% VEA yielded $4.74\times10^7$ particles/$cm^3$ within 300 nm-1 μm (82.2% of total), $8.97\times10^6$ particles/$cm^3$ within 1 μm-2.5 μm (15.5% of total), $1.13\times10^6$ particles/$cm^3$ within 2.5 μm-4 μm (2.0% of total), and $1.79\times10^5$ particles/$cm^3$ within 4 μm-10 μm (0.3% of total).

FIG. 4 illustrates influence of nicotine alone or in combination with vitamin E acetate on sub-micron and microparticles generated from electronic cigarette. Distribution profiles of the total particle counts per $cm^3$ over each inter-puff interval for each size fraction (300 nm-1 μm, 1 μm-2.5 μm, 2.5 μm-4 μm, and 4 μm-10 μm) in the absence or presence of increasing concentration of nicotine (0%, 0.6%, 1.2%, and 2.4% wt/v) with (5% v/v) or without VEA are plotted (all were prepared in 50/50 PG/VG). Kruskal-Wallis test demonstrated statistical significance ($p<0.0001$). Post-hoc analysis (Dunn's multiple comparison test) showed statistically significant differences between 0% VEA and 5% VEA at both 0% and 0.6% nicotine for all particle size distributions. Error bars indicate mean and 95% confidence intervals for each data set.

Figure 5A:
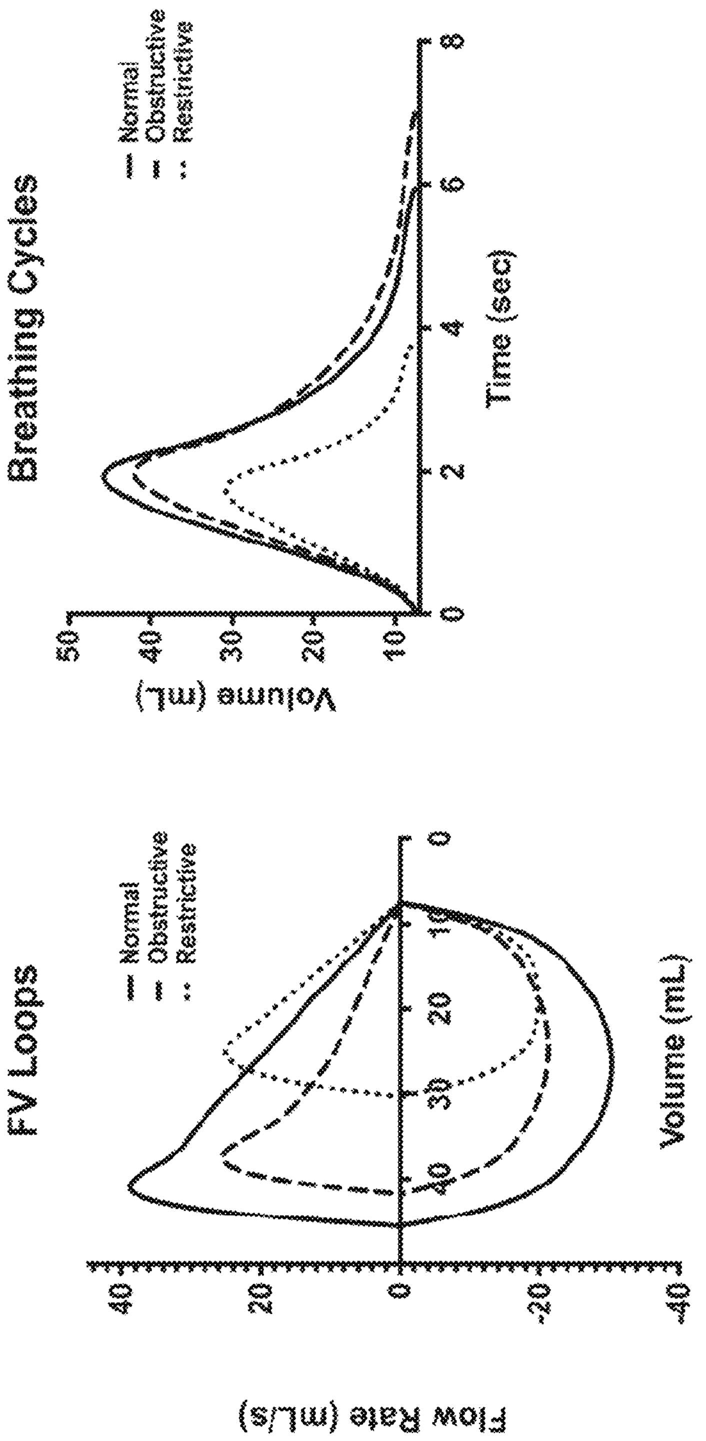
FIG. 5A and FIG. 5B illustrate impact of heathy versus diseased breathing on inhaled mean particle flow rate from electronic cigarette.
Figure 5B:
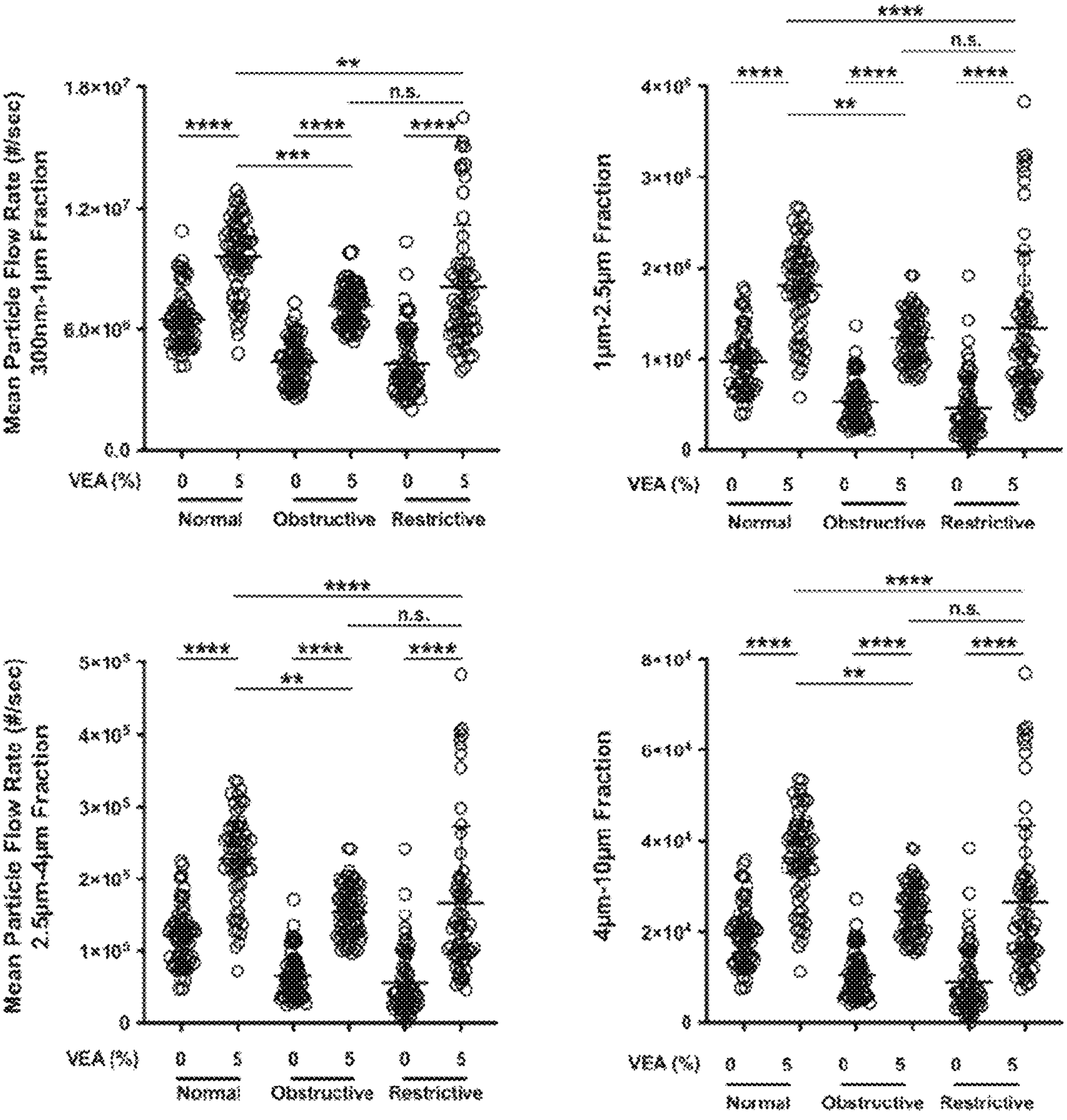

FIG. 5A and FIG. 5B illustrate impact of heathy versus diseased breathing on inhaled mean particle flow rate from electronic cigarette. FIG. 5A illustrates healthy (normal) and diseased (obstructive and restrictive) breathing flow-volume loops (left panel) plotted with normal in blue, obstructive in red, and restrictive in green. The diseased flow-volume loops were derived from clinically relevant scaling and curve changes that are observed by healthy versus obstructive or restrictive breathing profiles. A single breathing cycle for all the breathing states is also plotted (right panel) where volume is a function of time and the graphs are calculating from flow-volume loops.

FIG. 5B illustrates distribution profiles of the mean particle flow rate counted per $cm^3$ over each inter-puff interval for each size fraction (300 nm-1 μm, 1 μm-2.5 μm, 2.5 μm-4 μm, and 4 μm-10 μm) when mimicking healthy normal, obstructive and restrictive breathing in the absence and presence (5% v/v) of VEA in (50/50 PG/VG) are plotted (0% vitamin is just 50/50 PG/VG without any additive). Kruskal-Wallis test demonstrated statistical significance ($p<0.0001$). Post-hoc analysis (Dunn's multiple comparison test) showed statistically significant differences between all conditions except normal 0% VEA versus both obstructive and restrictive 5% VEA, and obstructive versus restrictive at both 0% and 5% VEA. Error bars indicate mean and 95% confidence intervals for each data set.

FIG. 6 is a series of perspective views of a vaping robot design according embodiments of the present disclosure. The system 600 used for these vapor exposure studies allowed for different vaping profiles reflecting both healthy and diseased lungs to be mimicked, enabling a smoking topography that would be present in an analogous (human) EC user. The system is divided into two chambers, the chamber that contains the ECs and the chamber that contains the pneumatics and electronics. The vape exposure device that was used, delivered proper vapor dilution, with proper vaping profiles, to the PM sensor in-line with the system. Inhaling vapor from any EC device is accomplished when negative pressure is created by the contracting of the diaphragm. Negative pressure in the vape exposure system is created by the vacuum pump 102, allowing vapor to be "inhaled" into the reservoir. The reservoir 640 that holds the vapor is a biocompatible syringe with a capacity analogous to vapor intake volume. The reservoir and pinch valves are holstered with a VeroClear™ 3D printed part for ease of access, operation, and maintenance. The reservoir can be removed, where the inlet and outlet connections can be optionally interfaced with the dilution robot, that contains its own internal reservoir. The vape exposure system is also equipped with various filters for clean air breaths and the incubator in which the system is contained, provides a filtered air supply. The inner shelving units and outer casing of the system were made from clear acrylic for visibility and for ease of use of the material. The sampling rate and flow of vapor through the exposure system 660 is controlled by a system of pinch valves and tubing. The pinch valves allow for different vaping profiles to be driven through the system via the firmware. The pneumatics system was designed in order to perform the following key functions: generate a sample of aerosolized vapor inside the reservoir, purge air from inside the reservoir, flow vapor sample into the PM sensor, take clean inter-puff interval inhales, and properly exhaust this vapor out of the system. The electronic hardware driving the system consists of an Arduino microcontroller, an 8-channel relay shield, a solid-state relay, a vacuum pump 102, four pinch valves, and a 2-channel power supply. A low current, Arduino compatible, relay shield is used to propagate the voltage needed to power all electrical components. This is needed because the Arduino only has a supply voltage of 5V, whereas most of the electronic components need upwards of 12V to operate. A solid-state relay is also used to prevent the vacuum from causing a short in the circuit. The vacuum required a higher current than the relay shield could provide, so it acts as an isolated switch that can use a low current circuit to switch on the higher current circuit powering the vacuum pump 102. The Arduino code used was developed to specifically respond to the breathing-emulator system driving the vapor into the PM sensor used for this study.

Below is a list of components and their corresponding numeral references illustrated in FIG. 6.

601: Small Filters
602: 10 mL Syringe
603: Acrylic Frame
604: Electronic Cigarette
605: Acrylic Electronic Cigarette Stand
606: Airtight Interface for the Electronic Cigarettes
607: Acrylic Plate to Separate Chamber
608: Airtight Tubing Adapters
609: Acrylic Filter Support
610: Vacuum Filter
611: Vacuum Pump
612: Small Filter
613: Solid-State Relay
614: Arduino with an 8-Channel Shield
615: Two-Channel Power Supply
616: Pinch Valves
617: Tubing Adapters FIG. 7 illustrates an electronic cigarette (EC) sealing gasket design. The vaping exposure system 660 is designed with the aim to closely mimic normal use by an EC user. The mouth is modeled using a polydimethylsiloxane (PDMS) gasket 704-707 to interface with the EC 708 and a PolyJet 3D printed part 701 to hold the gaskets 704-707 in place. As examples, an opening of the gasket 704 is 2 mm in diameter; an opening of the gasket 705 is 6.5 mm in diameter; an opening of the gasket 706 is 9 mm in diameter; and an opening of the gasket 707 is an rectangular of 5 mm by 15 mm. As well as being biocompatible, PDMS was chosen because it is inert, moldable and can provide an airtight seal. Using PDMS as the interface also allows for quick and relatively cheap fabrication, meaning that various sizes and shapes of molds can easily be made to interface different ECs or tubing. The modularity of this design also allows for minor adjustments to be made quickly to account for small variances in tubing or cartridges. Each gasket 704-707 is designed to fit into a small 3D printed chamber 702 with an airtight seal 701. Using a coupled 3D printed nut 703, we were able to fasten the outside of the chamber to the acrylic back plate to couple the generated vapor to the rest of the system. This interface has been essential in testing and interfacing different types of EC cartridges with our system.

Figure 8A:
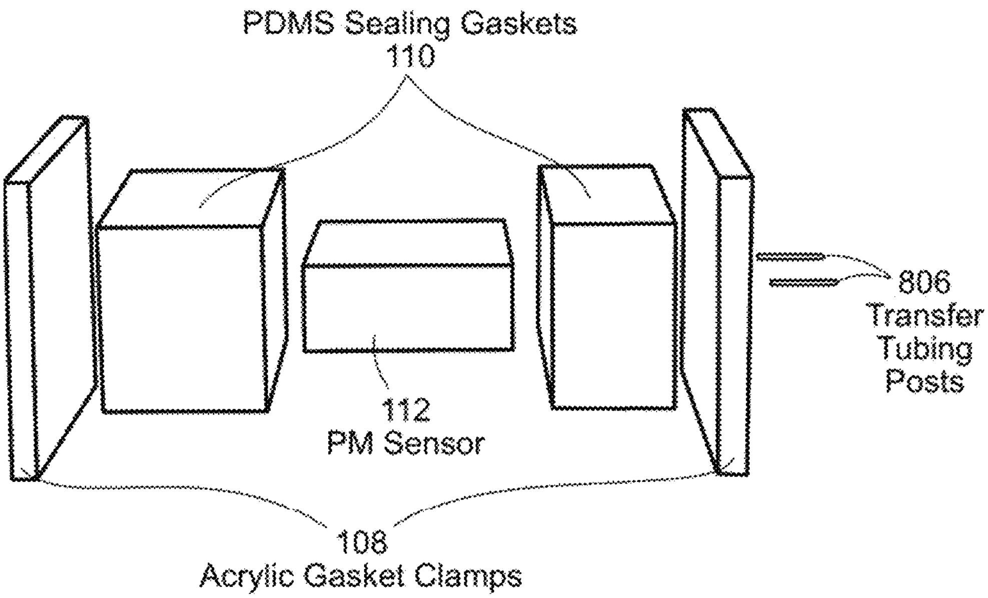
FIG. 8A and FIG. 8B illustrate the particulate matter sensor 112 and its enclosure.
Figure 8B:
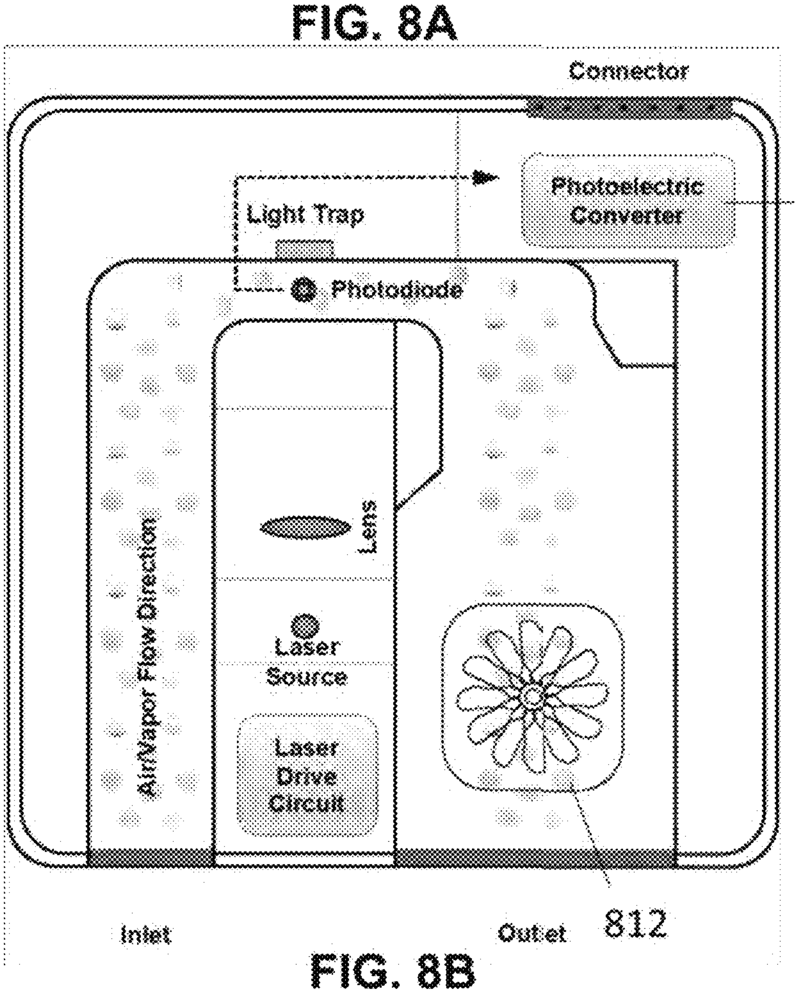

FIGS. 8A and 8B illustrate the particulate matter sensor 112 and its enclosure. The PM sensor 112 used was a Sensirion SPS30 optical sensor with internal air circulation. This PM sensor 112 was chosen for this application since it is capable of detecting a range of different particle sizes, from 300 nm to 10.0 μm. It can report mass concentration and particle count values for 300 nm-1 μm, 1 μm-2.5 μm, 2.5 μm-4 μm, and 4 μm-10 μm in real-time, allowing for direct monitoring of concentration levels during the experiment. The factory casing for the PM sensor 112 features large inlet and outlet ports for increased airflow. In order for the PM sensor 112 to be compatible with our experimental setup, an airtight housing was designed, which isolated the inlet and outlet ports from one another. This allowed for the control of airflow through the sensor, and ensured that vapor samples passed through the PM sensor 112 were not being double counted, offering particle concentration data that is more representative of the sample analyzed at any particular time-point.

Referring to FIG. 8A, the housing was made of a cast polydimethylsiloxane (PDMS) shell, acrylic plates, and tube-interfacing posts. The PDMS shell consists of two pieces, each modeled after the sensor's factory casing, allowing for a flush, airtight fit against the sensor. In order to further ensure that there was no air leaking from the casing, the PDMS shell was compressed between a set of two acrylic plates using 40 mm bolts. The plates have cutouts for the insertion of two interface (transfer tubing) posts 806, which allow for the tubing used in the experimental setup to connect to the inlet and outlet of the sensor, as well as an opening for the electronics wiring to pass through.

Referring to FIG. 8B, the PM sensor 112 uses an internal channel to direct airflow from the inlet to pass through a sensing channel, across a laser with a drive circuit 808. Once a particle passes over the laser, the particle causes the laser light to be scattered, and this scattered light is sensed by a photodiode, which then sends a signal to a photoelectric converter 810 that calculates the size of the particle sensed based on the amount of scattered light that was detected. This information is then sent to the connected computing unit. After passing through the sensing channel, the air collects in the outlet channel, where a fan 812 helps prevent air from flowing back into the sensing channel, promoting unidirectional airflow through the sensor.

Figure 9B:
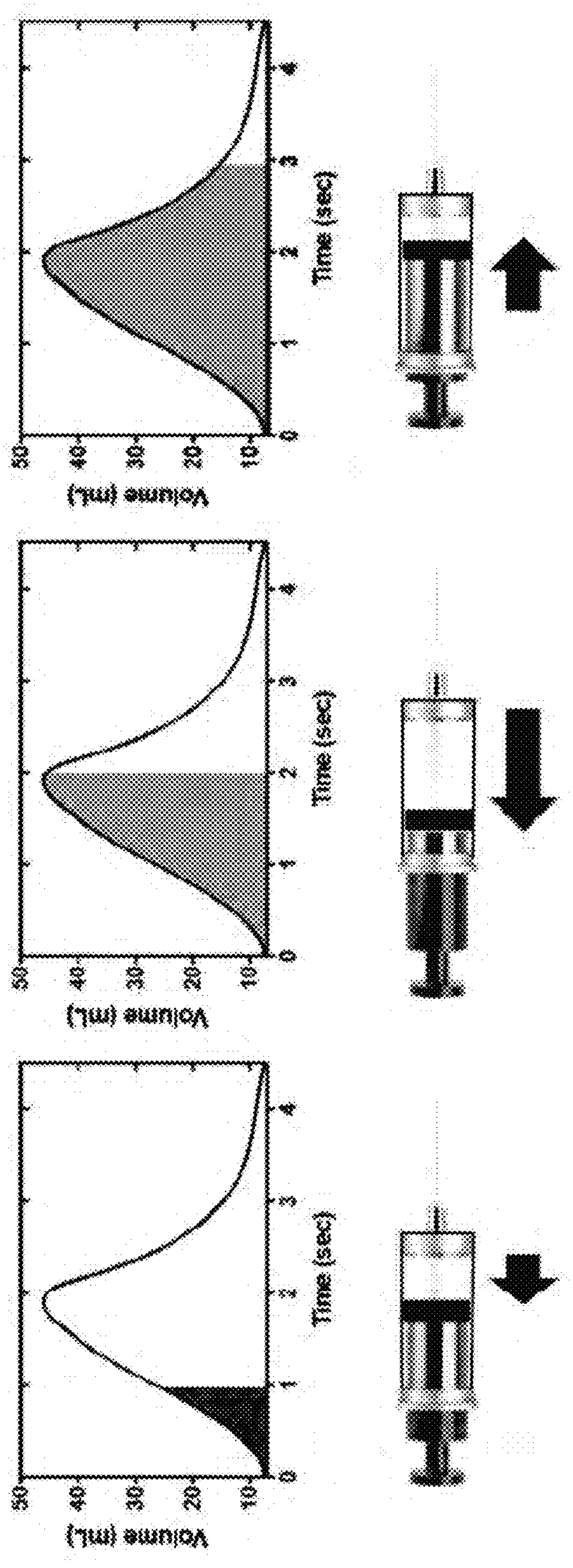

FIG. 9A and FIG. 9B are perspective view of breathing-emulator components and associated functionalities. Referring to FIG. 9A, the breathing-emulator includes a frame and mechanical actuation components that drive a plunger back and forth to pull and push air from within air-tight syringes. The actuation process is controlled by a stepper motor, which connects to a motor coupler that turns a lead screw, which is connected to a lead screw idler to allow for the lead screw to freely rotate. The lead screw actuates a nut that is attached to the carriage through the nut adapter. The carriage is stabilized through two linear bearing adapters that connect to the linear bearings which glide along the two guide rails. This allows for the rotational movement of the motor to be converted into linear motion. While the carriage is actuated by the motor, plungers for the syringes are mounted to the carriage through the plunger adapters and are actuated simultaneously. The syringes are fixed and mounted to the syringe frame through the syringe adapters. In both the case of the plunger adapter and the syringe adapters, additional caps are attached, which pin the plunger and the syringe to the carriage and syringe frame respectively, this prevents displacement of either component from its adapter. One side of the frame mounts two endstops, which are on opposite sides of the carriage stroke limits. The endstops are mechanical switches that connect two electrical lines when activated and are used to detect the seek limits of the breathing-emulator, for both avoiding damage due to over seeking and for homing the system at boot.

Below is a list of components and their corresponding numeral references illustrated in FIG. 9A.

901: Linear Bearing Adapter
902: Linear Bearing
903: Endstop
904: Endstop Adapter
905: Side Frame
906: Plunger
907: Syringe Adapter Cap
908: Syringe Adapter
909: Syringe
910: Idler Adapter
911: Lead Screw Idler
912: Syringe Frame
913: Nut
914: Nut Adapter
915: Plunger Adapter Bottom Cap
916: Carriage Frame
917: Plunger Adapter
918: Plunger Adapter Top Cap
919: Guide Rail
920: Collar Clamp
921: Collar Clamp Adapter
922: Motor Frame
923: Stepper Motor
624: Motor Coupler
925: Bolt
926: Lead Screw Referring to FIG. 9B, the breathing-emulator operates based off of a generated set of data that describes the number of steps for the motor to take, a step is a small fraction of a rotation, and the delay rate between each step. This profile is described by a series of steps and delays that are paired to give dynamic actuation. The steps and delays are calculated based off the mechanical and electrical attributes of the system and the desired breathing profile. The breathing profile is initially generated as a flow-volume loop and mathematically converted to volume as a function of time, through modeling the flow-volume loop as a first order non-linear differential equation. This allows for the syringe plunger to be actuated to displace the volume in the syringe to match the graph at the specific time points.

FIG. 10 illustrates a mechanical design of a dilution robot 1040 according embodiments of the present disclosure. The dilution robot 1040 is capable of diluting the vapor produced from the vaping robot with filtered air to a specified ratio. The system achieves this through two syringes being actuated in a top chamber and a series of pinch valves that is responsible for controlling the fluidic flow in the bottom chamber. All electronics are also located in the bottom chamber. The mechanical frame and internal components of the dilution system. The mechanical frame is mounted on top of the vaping robot and is supported by fins on the bottom side of the dilution robot 1040. The bottom chamber 1060 includes pinch valve array unit containing 7 pinch valves 1005 and three-way adapters 1007, a vacuum pump 1002, 2 large filters 1003, 3 small filters 1006, and the 55 mL reservoir 1004. The pinch valves 1005 are connected to one another following the fluidic flow diagram, with the $1^{st}$ and $5^{th}$ pinch valve connecting to the reservoir and the $3^{rd}$ and $7^{th}$ pinch valves connecting the upper chambers mixing and sampling syringes. All pinch valves, three-way adapters, filters, and the vacuum pump 1002 are mounted within a custom 3D printed support. The top chamber 1080 includes two 30 mL syringes, the mixing syringe 1013 and sampling syringe 1009, each of these syringes are connected to ports that fluidically link to the bottom chamber pinch valve array unit. Both the syringes 1013 and 1009 are mechanically coupled and driven by a single servo motor 1010. Specifically, the syringes 1013 and 1009 are oriented in opposite directions, so that when one syringe's plunger is being actuated to release air, the other syringe is taking in air, and vice versa. The plungers are actuated through linear motion of the syringe actuation adapter. The adapter is bolted into the linear servo, where the linear servo is resting on a custom 3D printed linear servo mount, that aligns the actuation arm with the bolt interface on the syringe actuation adapter. The adapter is linearly guided by two guide rails on each edge of the adapter. The syringes rest in a custom syringe mount that aligns the barrel of the syringe with the plungers being supported by the syringe actuations adapter.

Below is a list of components and their corresponding numeral references illustrated in FIG. 10.

Figure 11D:
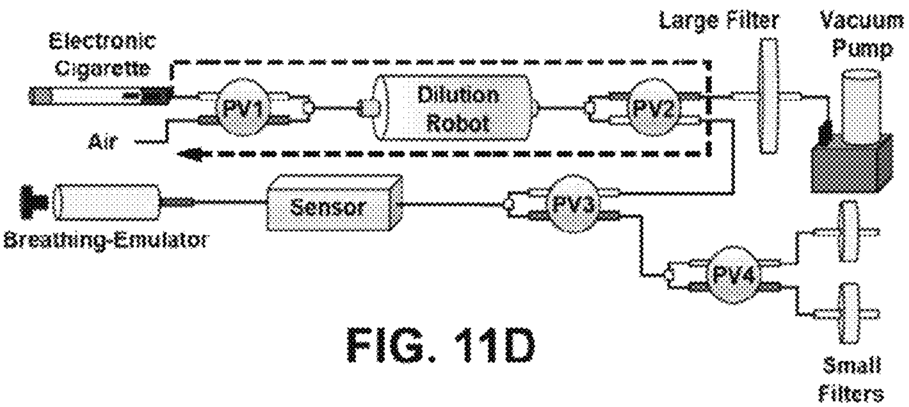

1001: Electronics
1002: Vacuum Pump
1003: Large Filters
1004: 10 mL Syringe Reservoir
1005: Pinch Valves
1006: Small Filters
1007: 3-Way Adapters
1008: Linear Servo Mount
1009: Sample Syringe
1010: Linear Servo
1011: Guide Rail
1012: Syringe Actuation Adapter
1013: Mixing Syringe
1014: Syringe Mount FIG. 11A, FIG. 11B, FIG. 11C, FIG. 11D, FIG. 11E and FIG. 11F illustrate a vaping robot control system and a fluidic flow diagram according to embodiments of the present disclosure. Referring to FIG. 11A, there are four pinch valves and a vacuum pump that are regulated by an array of relays. The pinch valves are two-way pinch valves, where one line is pinched and the other is open, when the relay signal is toggled the lines that are pinched and open are toggled. The vacuum pump is active when the relay on signal is set and deactivated when the relay off signal is set. The system state machine is categorized into five states, Purge, Vapor, Sample, Inhale, and Exhale. The Purge state is responsible for evacuating vapor within the reservoir of the dilution robot. The Vapor state is responsible for filling the reservoir with EC vapor. Both the Purge and Vapor states run independently of the breathing-emulator's position within a breathing cycle, additionally both states require the vacuum pump to be active. The Sample state is responsible for fluidically connecting the breathing-emulator to the reservoir in order to sample the vapor with the inline particle sensor. This occurs when the breathing-emulator is retracting the gas and thus requires being synced to the Inhale state. The Inhale and Exhale states can run independently or in conjunction with the above states and are synchronized with the breathing-emulator's respiratory cycle. Specifically, the Inhale state of the vaping robot is active when the breathing-emulator is retracting gas and the Exhale states is active during gas expulsion. Due to the Purge, Vapor, and exhale portion of the Sample state not requiring synchronization with the breathing-emulator the Inhale and Exhale states are running simultaneously while these states are active. The Sample state is synchronized with the breathing-emulator during the inhale portion of the breathing cycle and thus overrides the currently active Inhale state, specifically pinch valve (PV3).

Referring to FIG. 11B, the purge state pulls air from the inhalation exposure chamber into the system through PV1, the reservoir within the dilution robot, PV2, the large filter, and then to the vacuum pump. During this time PV3 and PV4 are independently controlled by the Inhale and Exhale states.

Referring to FIG. 11C, the vapor state activates the EC, through negative pressure, and pulls the vapor into the reservoir through PV1. The negative pressure is generated from the vacuum pump fluidically connecting the reservoir to the vacuum pump through PV2. Just as in the Purge state, PV3 and PV4 are controlled independently.

Referring to FIG. 11D, during the breathing-emulator's inhale, the sample state fluidically connects the breathing-emulator to the reservoir through PV2 and PV3, which allows for the vapor to be sampled into the inline particle sensor. PV1 connects the reservoir to the air within the inhalation exposure chamber to allow for pressure relief from the inhale. During the breathing-emulator's exhale the Sample state is no longer active and is overridden by the Exhale state.

Figure 11E:
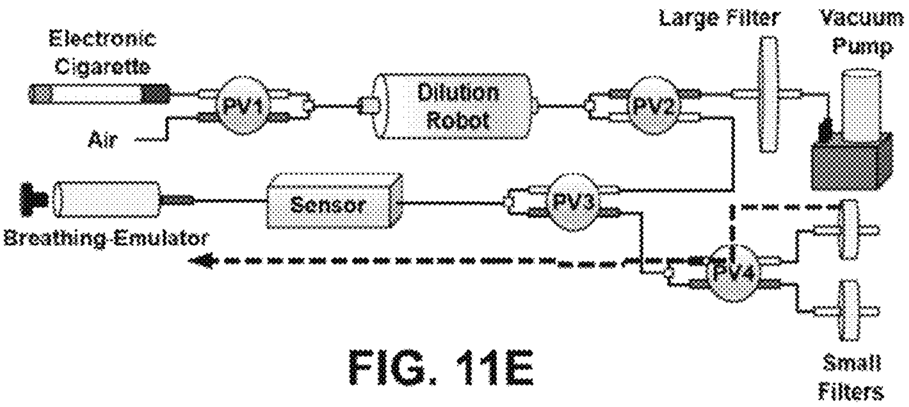

Referring to FIG. 11E, the inhale state fluidically connects the breathing-emulator to the inhale filter to allow purified air to be inhaled. The air flows from the filter through PV4, PV3, the particle sensor, to the breathing-emulator.

Figure 11F:
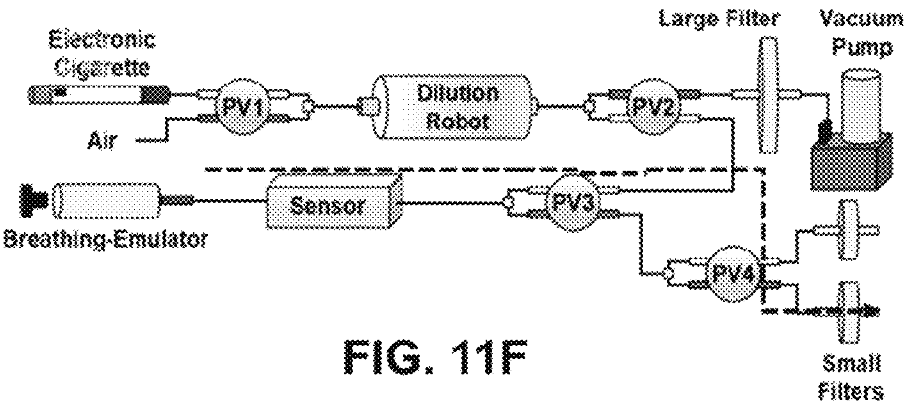

Referring to FIG. 11F, the exhale state fluidically connects the breathing-emulator to the exhale filter to expel filtered gas. The air flows from the breathing-emulator through the particle sensor, PV3, PV4, to the exhale filter.

Figures 12A, 12B:
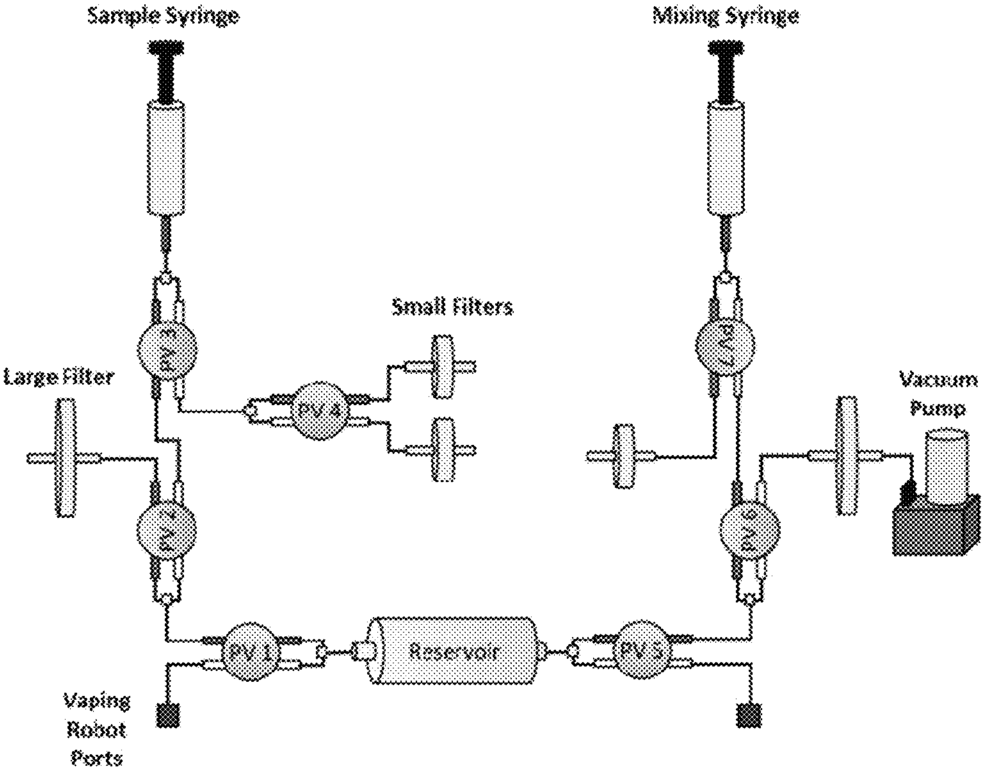
FIG. 12A, FIG. 12B, FIG. 12C, FIG. 12D, FIG. 12E, FIG. 12F and FIG. 12G illustrate a dilution robot control system and associated fluidic flow diagram according to embodiments of the present disclosure.

FIG. 12A, FIG. 12B, FIG. 12C, FIG. 12D, FIG. 12E, FIG. 12F and FIG. 12G illustrate a dilution robot control system and associated fluidic flow diagram according to embodiments of the present disclosure. Referring to FIG. 12A, the robot control system has 5 individual states that can be transitioned to, which correspond to specific states the vacuum, pinch valves, and linear servo are in. The first state vaping robot (VR) Connect is a standby state. VR Connect is responsible for fluidically connecting the dilution robot reservoir to the vaping robot. This state is active when the dilution robot is waiting for the vaping robot to fill the reservoir with vapor. The Mix state is responsible for mixing the air within the reservoir without changing concentration or volume. The Sample state is responsible for sampling a calculated volume of vapor from the reservoir. The Evacuate state is responsible for removing all air in the mixing syringe, collecting fresh filtered air into the sample syringe and to remove all vapor for the reservoir. The Empty state is an optionally enabled state that pulls in air from the reservoir into the mixing syringe and exhausts all air in the sample syringe.

Referring to FIG. 12B, similar to the vaping robot the dilution robot contains two-way pinch valves, where when one line is open the other is closed with the ability to switch between the open and closed line. The pinch valves are connected to three-way adapters in order to split and combine tubing. PV1 and PV5 are responsible for connecting the reservoir to the vaping robot or to the pinch valve array for the dilution robot. PV2 is responsible for connecting the reservoir to either the large intake filter or to the sample syringe. PV3 is responsible for connecting the sample syringe to reservoir or to the inhale and exhale filters, the selection of the exhale or inhale filter is through PV4. PV6 is responsible for connecting the reservoir to the vacuum pump or to the mixing syringe. PV7 is responsible for connecting the mixing syringe to the exhale filter or the reservoir.

Figure 12C:
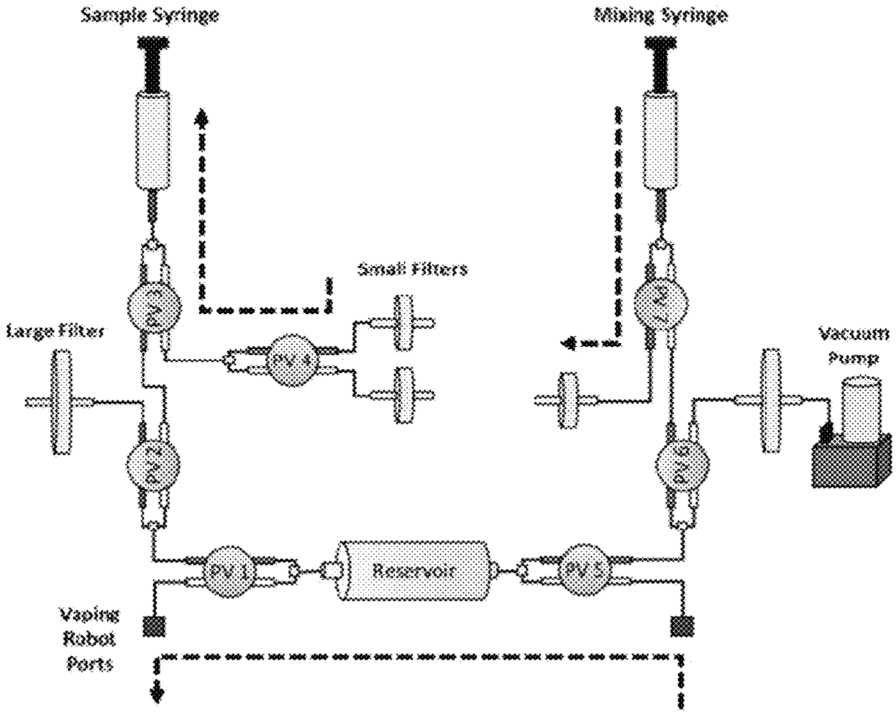

Referring to FIG. 12C, VR Connect state is set on boot or transitioned to after the Mix state or Evacuate state. During the VR Connect state PV1 and PV5 is connected to the vaping robot, PV3 and PV4 connect the sample syringe to the inhale filter, and PV7 connects the mixing syringe. After fluidically connecting the pinch valves the plunger is actuated fully to pull filtered air into the sample syringe and to evacuate air from the mixing syringe into the exhale filter. This state leaves 30 mL of filtered air into the sample syringe and the mixing syringe empty.

Figure 12D:
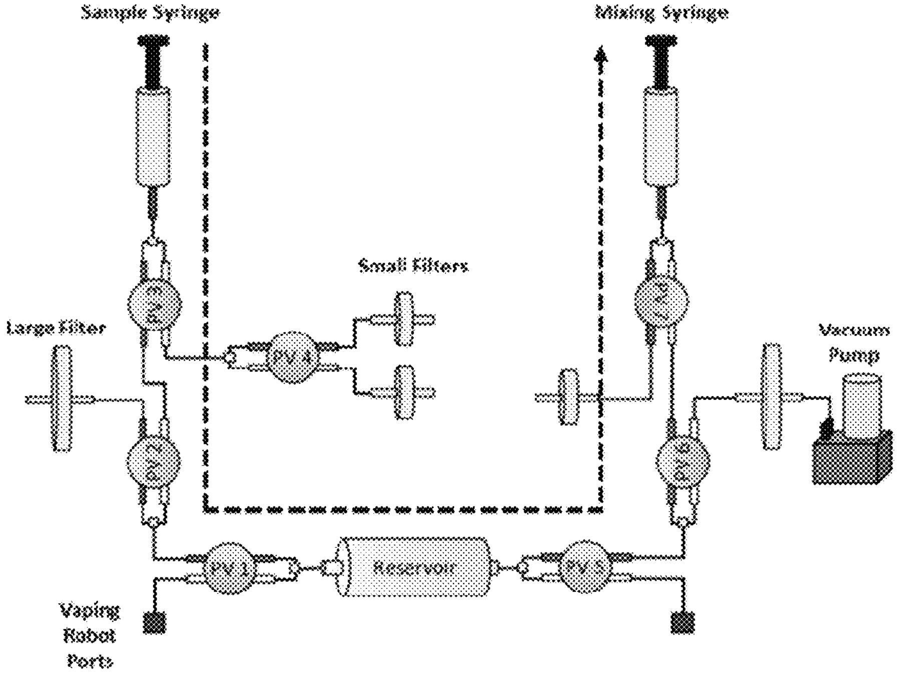

Referring to FIG. 12D, the Mix state transitions from the Evacuate state during the end of the dilution and is transitioned to from VR Connect during the start of the dilution procedure. The dilution starts and stop procedure is activated through the Start/Stop interrupt that is electrically connected to the vaping robot. The Mix state is responsible for transferring the filter air from the sample syringe through the reservoir and into the mixing syringe, through PV3, PV2, PVT, reservoir, PV5, PV6, and then PV7.

Figure 12E:
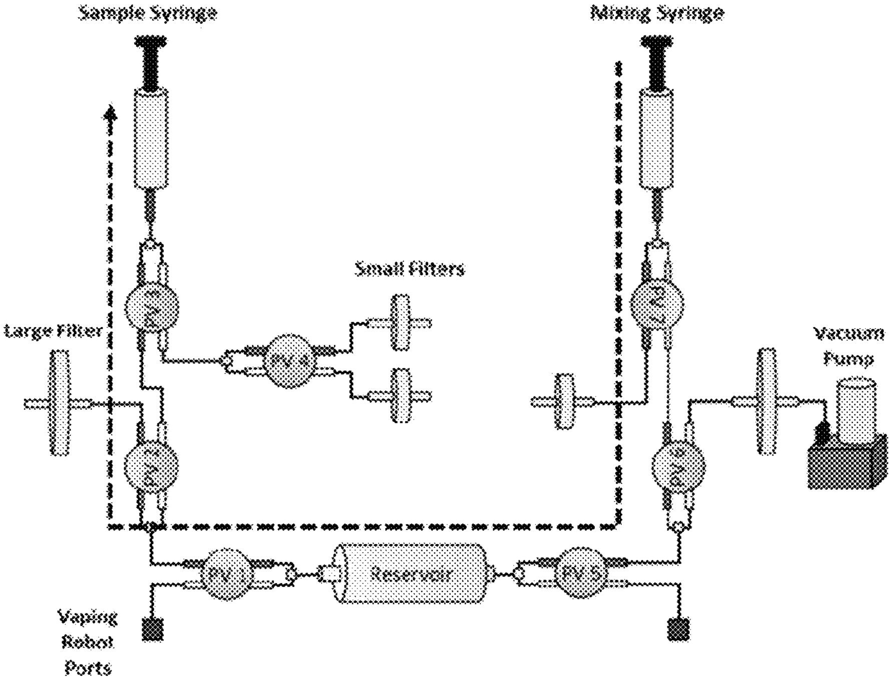

Referring to FIG. 12E, the Sample state is transitioned to from the Mix state. The Sample state pulls in a calculated, based off dilutions settings, volume of vapor from the reservoir into the sample syringe. During this time, the mixing syringe is actuated to keep the internal volume constant without introducing any further dilutions, since the mixing syringe also contains mixed vapor, due to the last state activated being the Mix state. The fluidic flow is through PV7, PV6, PV5, reservoir, PV1 PV2, and then PV3.

Figure 12F:
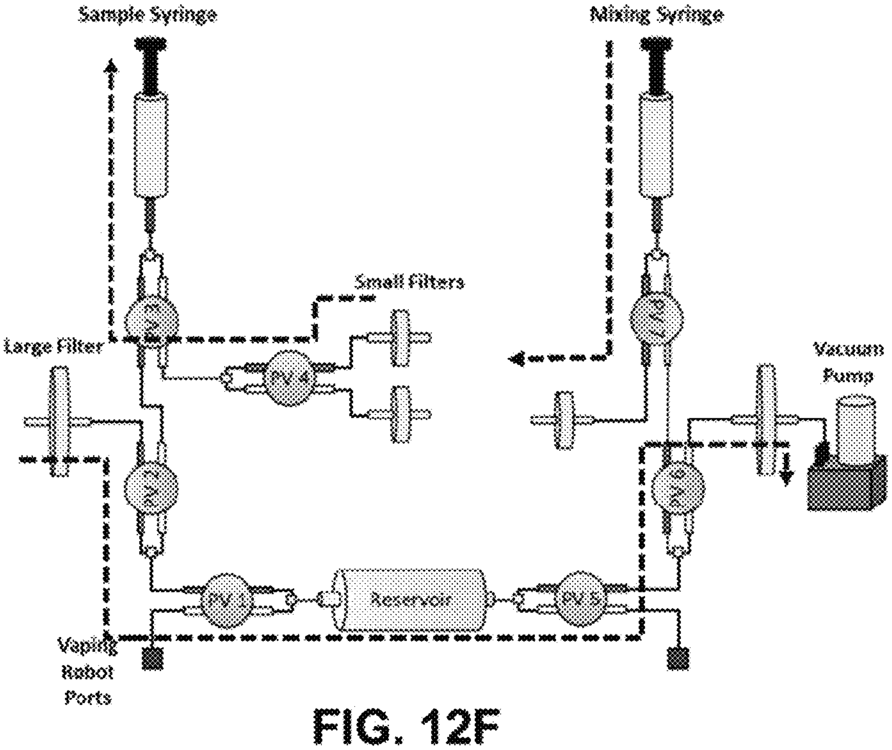

Referring to FIG. 12F, the Evacuate state is invoked after the Sample state and is responsible for further dilution of the vapor in the sample syringe while pulling in filtered air into the remaining 30 mL of volume in the sample syringe, in addition to emptying both the mixing syringe and the reservoir. The Evacuate state can also optionally be called after the Empty state, in this case the sample syringe is not filled with diluted vapor but filled only with filtered air. The fluidic connection is through the large intake filter to, PV2, PV1, reservoir, PV5, PV6, through the vacuum pump filter and into the vacuum. Concurrently the sample syringe pulls filtered air from the inhale filter, through PV4, PV3, and into the sample syringe, and the mixing syringe evacuates air from the mixing syringe through PV4 into the exhale filter.

Figure 12G:
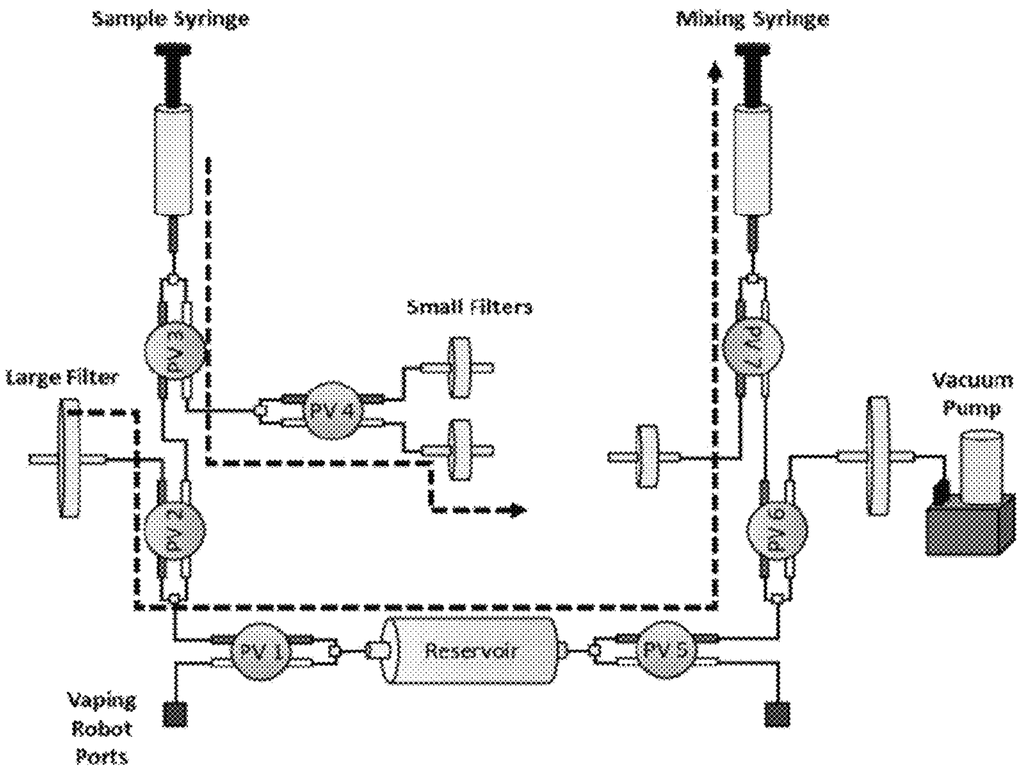

Referring to FIG. 12G, the Empty state is an optional state that can be invoked during the beginning of the standby procedure of the dilution robot. When the vaping robot has filled the reservoir with vapor and the dilution robot has diluted the vapor and the vaping robot has sampled the vapor into the particle sensor, the vaping robot activates the Stop Dilution procedure in the dilution robot. The Stop Dilution procedure can either transition directly to VR Connect, if the vaping robot is responsible for clearing the reservoir, or can transition to Empty, Evacuate, and then to VR Connect if the dilution robot is responsible for clearing the reservoir. The Empty state fluidically connects the large intake filter to PV2, PV1, reservoir, PV5, PV6, PV7, to the mixing syringe and connects the exhale filter to PV4 to PV5 to the sample syringe. The state empties the sample syringe and fills the mixing syringe. This allows the Evacuate state to be called next which will fill the sample syringe with clean air as it was fully evacuated from the Empty state.

Figure 13A:
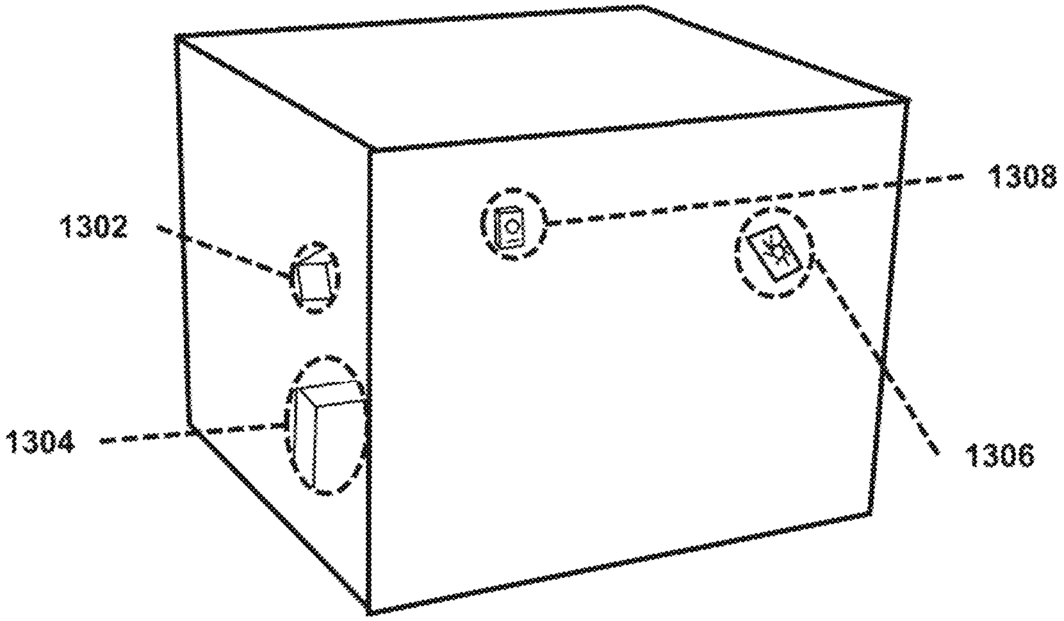
FIG. 13A, FIG. 13B, FIG. 13C and FIG. 13D illustrate an inhalation exposure chamber and associated environmental control components according to embodiments of the present disclosure.

FIG. 13A, FIG. 13B, FIG. 13C and FIG. 13D illustrate an inhalation exposure chamber and associated environmental control components according to embodiments of the present disclosure. Referring to FIG. 13A, the inhalation exposure chamber is a double paned acrylic enclosure supported by an aluminum frame and gaskets for sealing the chamber. Within the front of the inhalation exposure chamber is the main door, which when latched shut, compresses a gasket to seal the chamber. Inside is a mounting rail on the back and side panels of the inner walls, on the mounting rails rests all the inhalation exposure chamber sensors and the heating modules 1306, the rails also are used to route wires from the components to the back where the component compartment is located. Each of the side walls has a heater module 1306 mounted near the corner, specifically mounted in the back corner on the left side and front corner on the right side. The carbon dioxide sensor 1308 and humidity sensor 1304 are located towards the center of the mounting rail on the back wall. The temperature sensors 1302 are mounted on the center of each of the three mounting rails and one in the top corner of the front panel, totaling to 4 temperature sensors. The humidity module 1304 is located on the left side of the inhalation exposure chamber and is a non-mounted component that can be placed anywhere within the chamber.

Figure 13B:
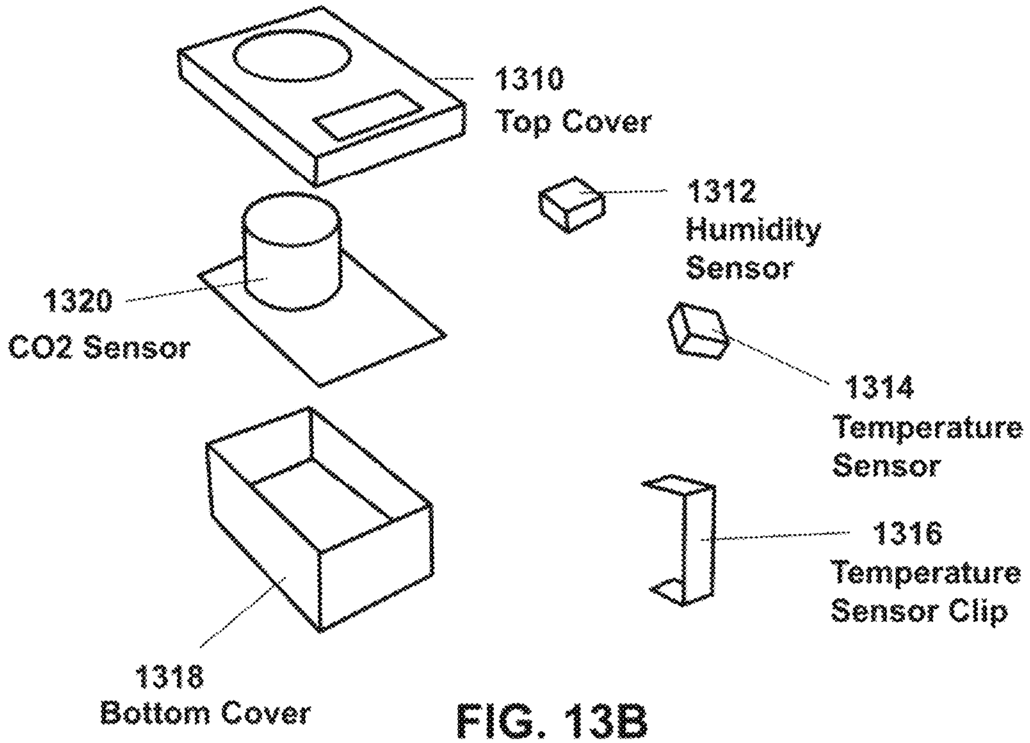

Referring to FIG. 13B, the carbon dioxide module is a carbon dioxide sensor 1320 with a circuit board that the humidity sensor 1312 can be plugged into. The circuit board then communicates to the inhalation exposure chamber controller through a serial port communication protocol. The carbon dioxide sensor 1320 is housed within a top 1310 and bottom cover 1318, where the bottom cover 1318 slots into the mounting rail on the back wall. Similarly, the temperature sensors 1314 are mounted with a custom clip 1316, which clips to the mounting rail. The temperature sensor 1314 communicates to the inhalation exposure chamber's controller through a 1-wire communication protocol.

Figure 13C:
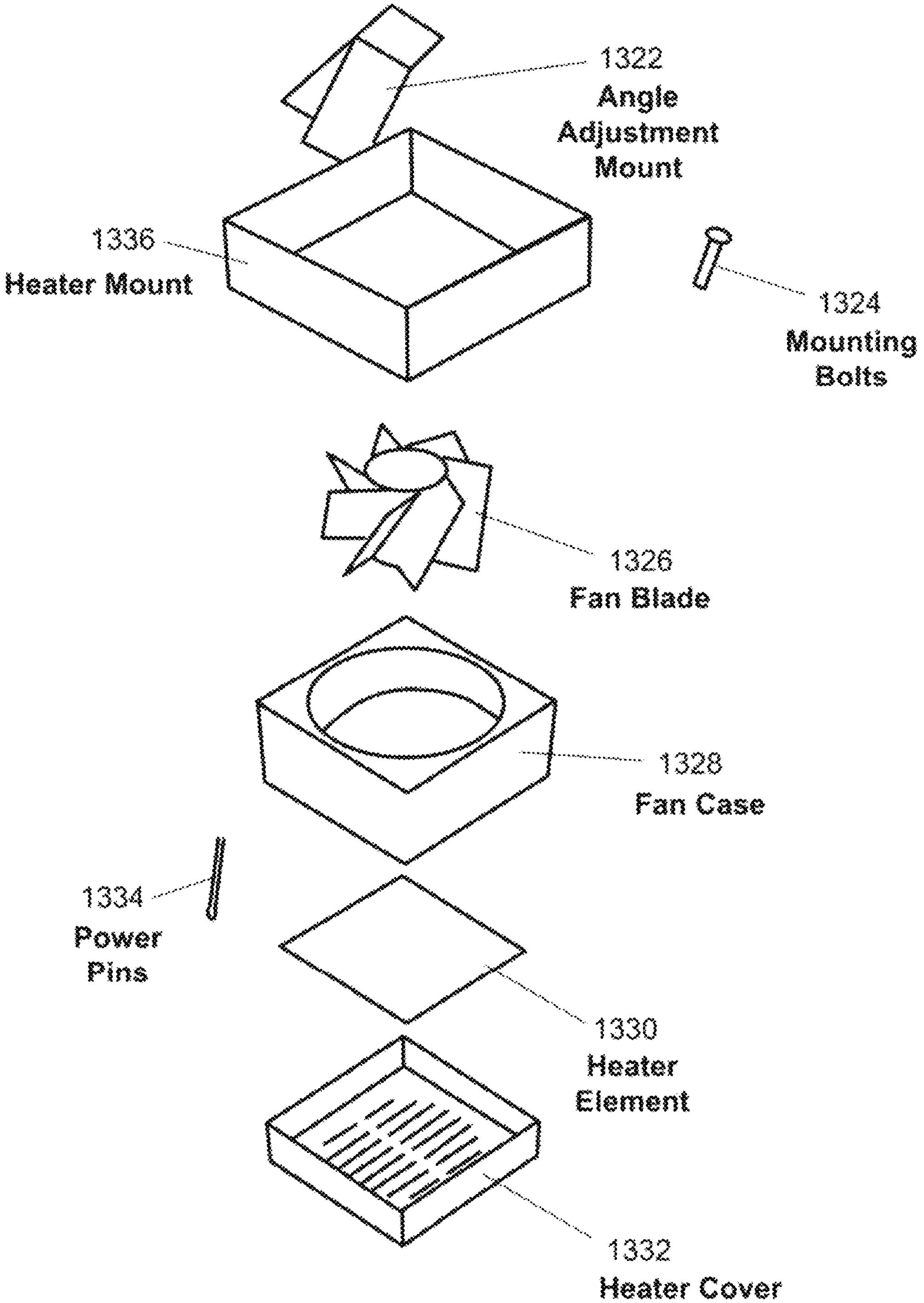

Referring to FIG. 13C, the heater module flows air past a thermal element to heat the environment. There is a cover to protect from contact with the heater element, and both the heater element 1330 and the cover 1332 are adjacent to the fan case 1328. Both the heater element and fan are powered by three power pins 1334. Within the fan frame is a blade 1326 that rotates to move the air through the heater element 1330. The fan 1328 and heater element 1330 are both mounted within a custom heater mount 1336 that is fixed with bolts 1324. The heater mount 1336 is bolted to an angle adjustment mount 1322 which allows for the angle of the heater element to be swiveled in various directions.

Figure 13D:
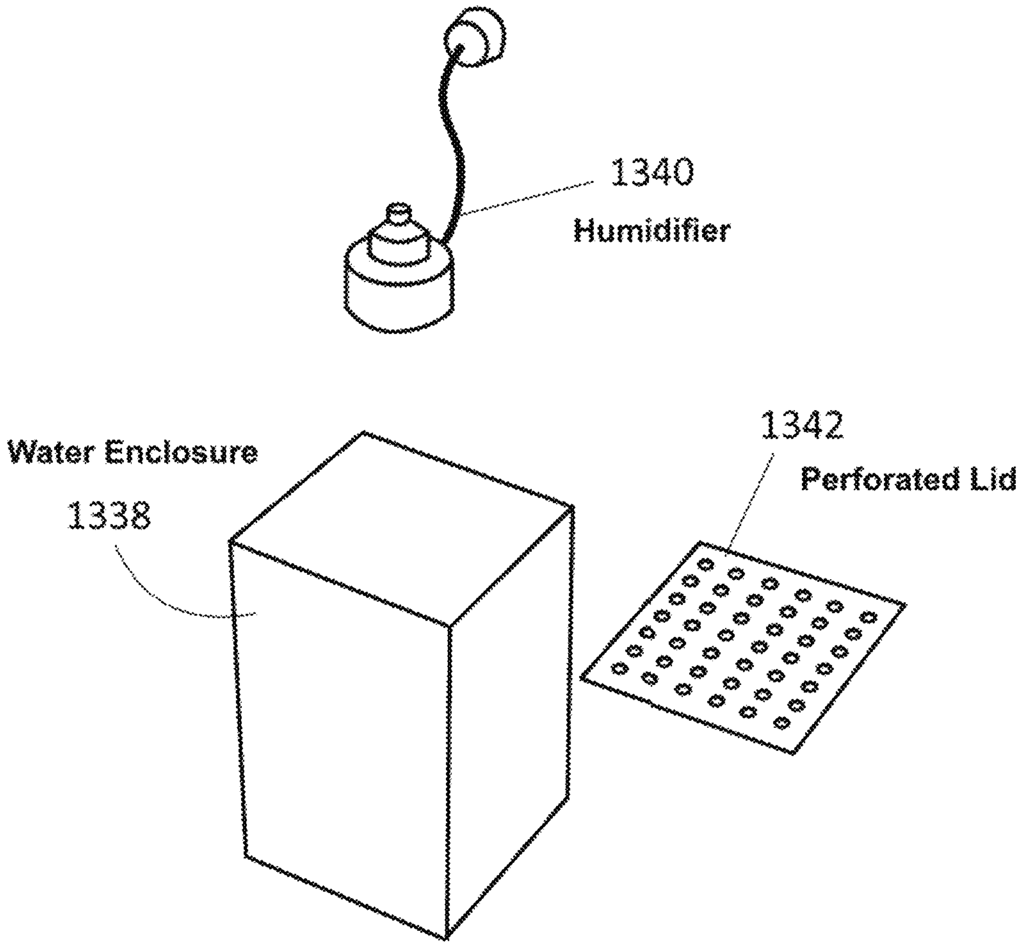

Referring to FIG. 13D, the humidifier unit includes a water enclosure container 1338 where a humidifier 1340 is submerged in water. The enclosure 1338 has a perforated lid 1342 that allows for the humidified air to exit the enclosure while preventing any larger droplets from escaping. The humidifier unit is powered through two wires which has an embedded plug to prevent leaking through the wire port of the water enclosure.

Figure 14A:
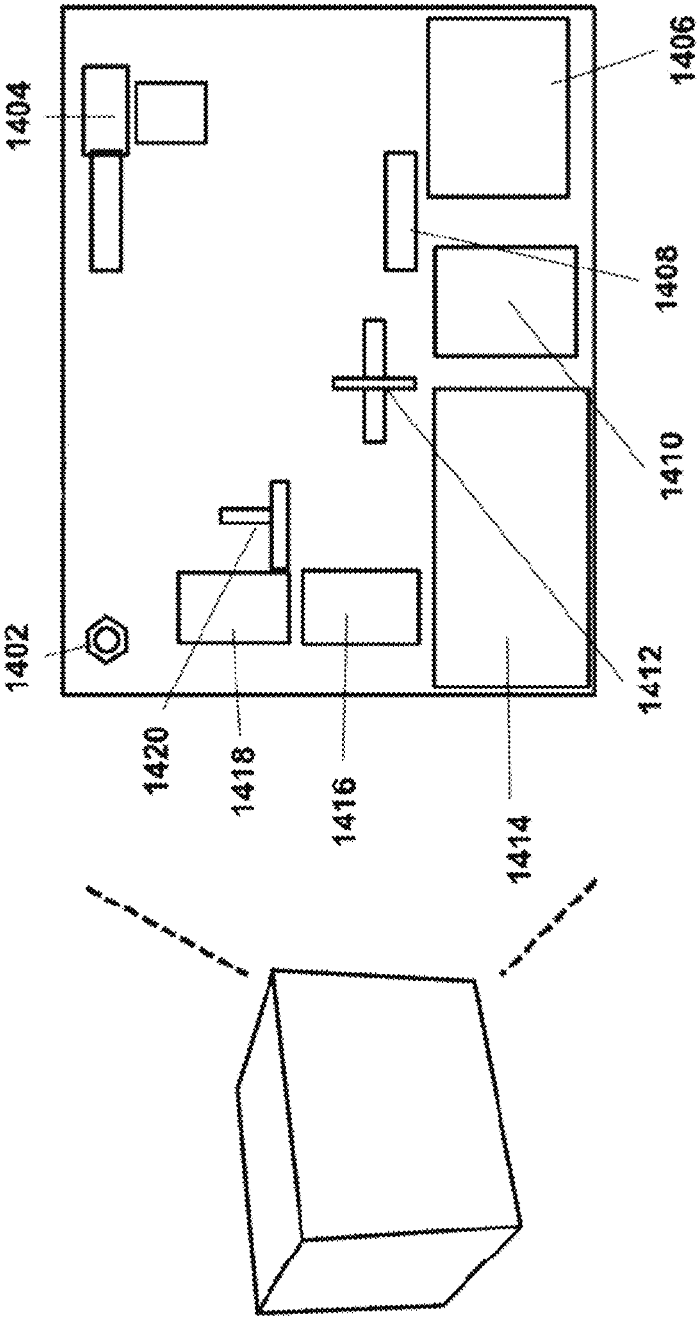
FIG. 14A and FIG. 14B illustrate a component compartment system and associated diagram for the inhalation exposure chamber according to embodiments of the present disclosure.
Figure 14B:
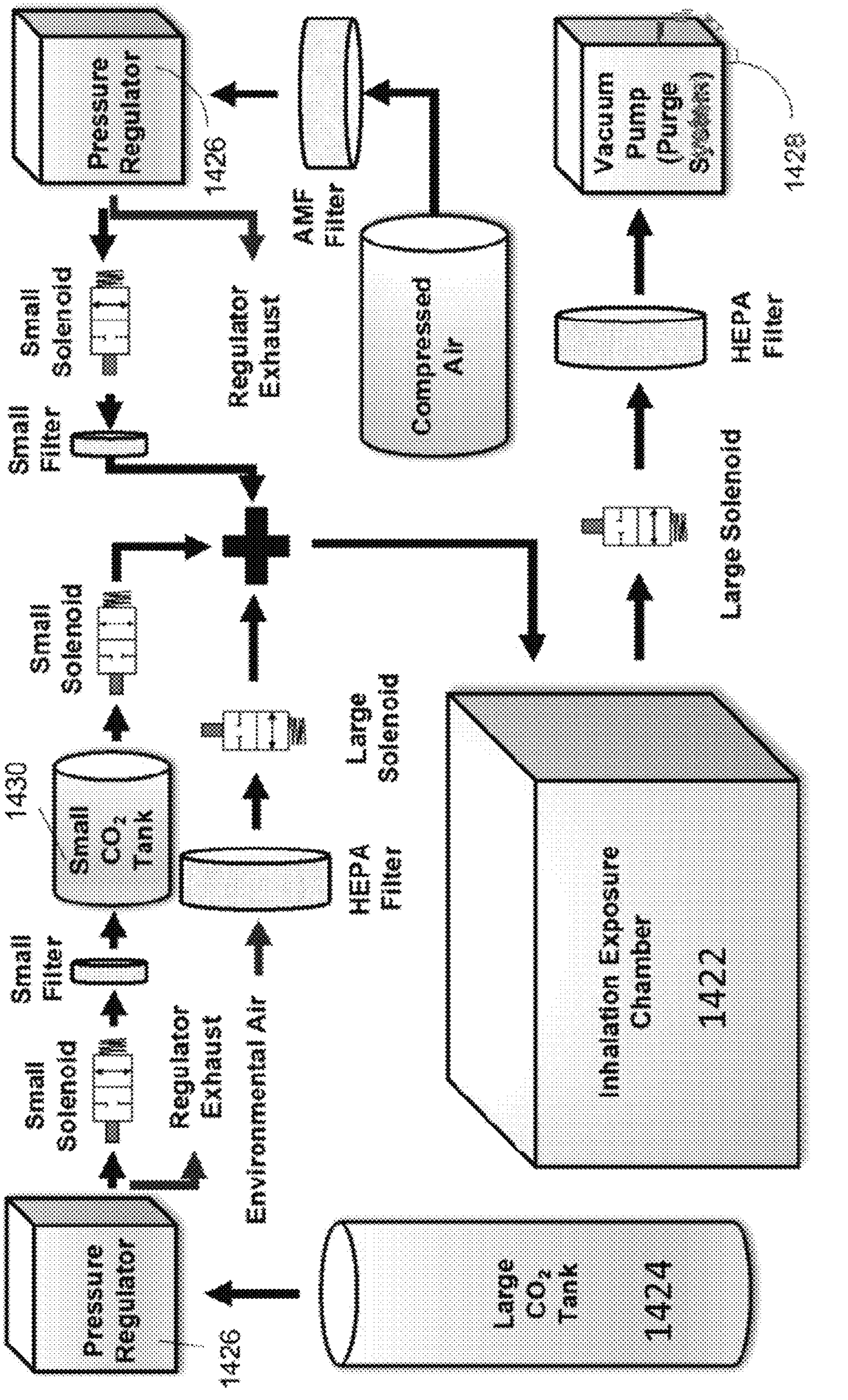

FIG. 14A and FIG. 14B illustrate a component compartment system and associated diagram for the inhalation exposure chamber according to embodiments of the present disclosure. Referring to FIG. 14A, the inhalation exposure chamber has three afferent ports and one efferent port for air to flow in and out of the chamber. One set of afferent and efferent ports are for large air flow that is used during the purge activation of the inhalation exposure chamber. The other two smaller afferent ports are for air and carbon dioxide injection, respectively. One of the large solenoids used is on-board the inhalation exposure chamber and is activated as a pressure relief to take in filtered air during the purge activation. Both the pressurized air and the carbon dioxide gas is each connected to a pressure regulator that can dynamically change the pressure being applied to further downstream components. The output of each of the pressure regulators is connected to small solenoids that apply or disable the pressure in a binary fashion. The solenoid for the air pressure is used to inject filtered air into the chamber to allow for adjustments in air conditions within the inhalation exposure chamber when either the temperature, humidity, or carbon dioxide levels are too high. The small solenoid for the carbon dioxide is used to pressurize a downstream tank, the tank is then connected to another small solenoid that controls the injection of carbon dioxide. All of these components mentioned as well as the sensors and devices in the main chamber are controlled through an on-board electronic controller, which is a custom printed circuit board plugged into an Arduino. The electronic controller is powered by both a 12-volt power supply, which is used to power the controller and most components, and a 24-volt power supply, which is used to power the humidifier module.

Below is a list of components and their associated numeral references illustrated in FIG. 14A.

Efferent and Afferent Ports: 1402

Large Solenoid: 1404

24-Volt Power Supply: 1406

CO2 Tank: 1408

Electronic Controller: 1410

Small Filter: 1412

12-Volt Power Supply: 1414

Pressurized CO2 Regulator: 1416

Pressurized Air Regulator: 1418

Small Solenoid: 1420

Referring to FIG. 14B, there are three main inputs into the inhalation exposure chamber 1422, filtered pressurized air, carbon dioxide, and filtered air drawn in by negative pressure induced from the vacuum pump purge system 1428. The carbon dioxide is provided by an external pressurized tank 1424 which flows through a pressure regulator 1426, a small solenoid, a filter, and into a small tank 1430. When the inhalation exposure chamber 1422 has determined that more carbon dioxide is required the pressure regulator 1426 will adjust the pressure to the optimal calculated value, open the first solenoid to allow carbon dioxide to pressurize the small tank 1430, once pressurized the first solenoid closes and the second solenoid opens allowing for a controlled amount of carbon dioxide to be injected into the inhalation exposure chamber 1422. The air injection system is similar, except that there is no tank or second solenoid, and the pressure is supplied by a pump that passes the air through a dehumidifying filter. The air injection capabilities are only being used as a fail-safe for if conditions become too elevated from the setpoints, as temperature, humidity, and carbon dioxide levels can only be reduced by adding in dehumidified ambient atmospheric filtered air. As a result, air injection is controlled by the regulator and first solenoid only, as the higher rate of injection required cannot be supplied by the small tank 1430 injection design used in the carbon dioxide injection system. In the event that the carbon dioxide or the air pressure regulators' output pressure exceeds the setpoint pressure, small amounts of gas will be injected into the environment (red arrows) to correct for the internal overshoot in pressure. The third afferent connection to the inhalation exposure chamber is the pressure relief for the purge activation. Environmental air (red arrow) is pulled through a HEPA filter, through the large on-board solenoid, and into the chamber. The large solenoid is off except during purge activations or gas injections to prevent carbon dioxide from escaping the chamber. The inhalation exposure chamber has a single efferent port that is connected to an external large solenoid, a HEPA filter and a high flow rate vacuum pump, all of which make up the external purge system. Both large solenoids are activated in tandem with each other during the purge activation to prevent an internal pressure change from within the inhalation exposure chamber.

Figure 15:
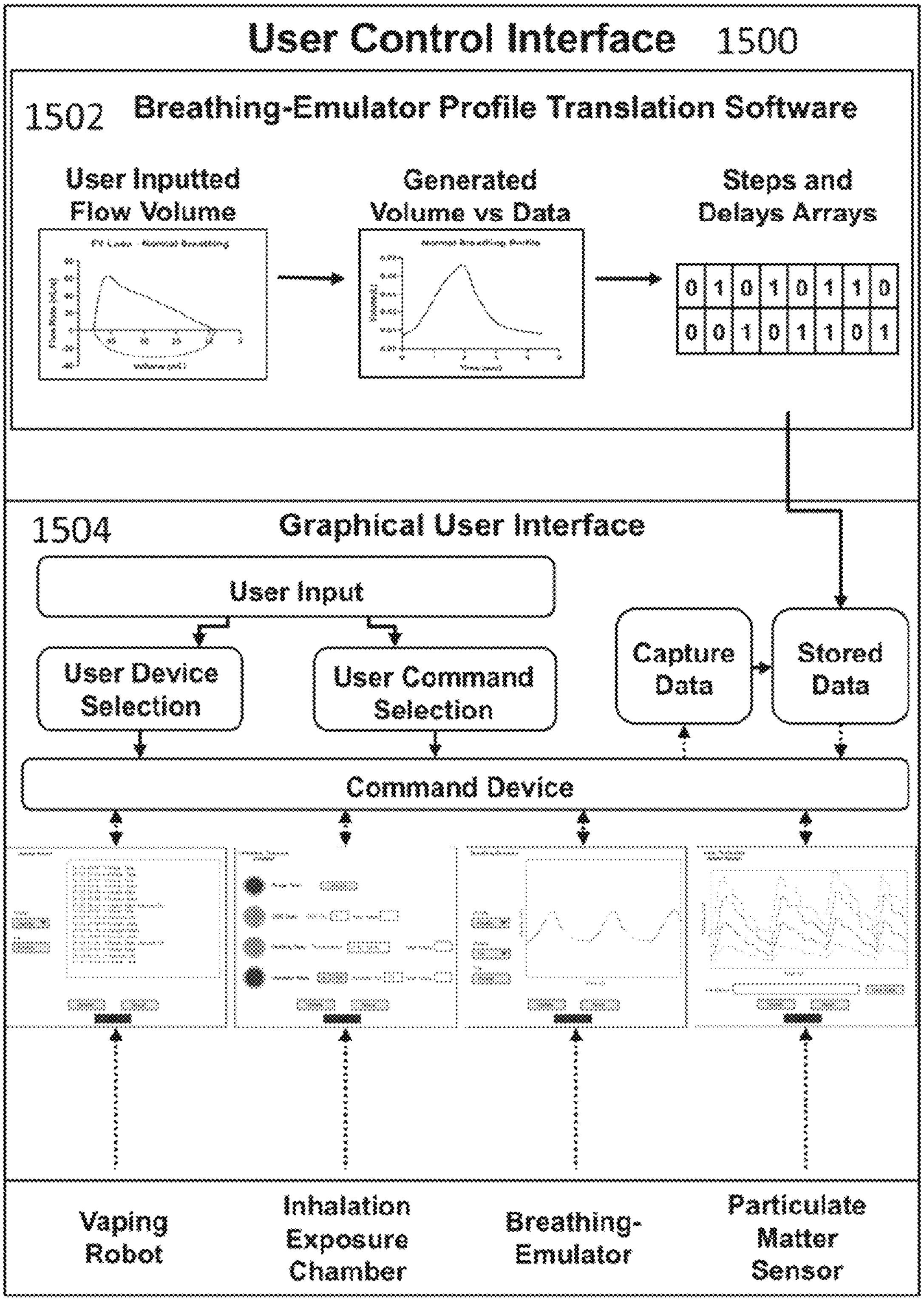
FIG. 15 is a user control interface data flow diagram according to embodiments of the present disclosure.

FIG. 15 is a user control interface data flow diagram. The user control interface 1500 is responsible for calculating the data that commands the breathing-emulator and is derived from the breathing state flow volume loop. The user saves generated flow volume loop profiles to a directory. When the translation software begins it loads the profiles and calculates the volume as a function of time by modeling the flow volume loop as a first order non-linear differential equation. This data is then processed into a series of delay rate and step counts, these parameters are derived from both the volume versus time profile and physical dimensions and properties of the breathing-emulator. The profiles are then saved to another directory to be accessed by users and other programs. In addition to running the breathing-emulator profile translation software 1502, the user control interface 1500 hosts the graphical user interface (GUI) 1504 which allows the user to interact with a custom software program to command the breathing-emulator, inhalation exposure chamber, inline PM sensor, and the vaping robot. The GUI 1504 has four separate windows that each have a custom panel for all the custom devices connected. Each of the GUI modules, that correspond to a device, in tandem both bidirectionally communicate to the intended peripheral device through serial port communication while also bidirectionally communicating with the GUI device command interface layer. The GUI interprets the user's inputs to process the intended device, which is based off the window selected, and the commands for that device, which is controlled through the custom buttons and textboxes. Each of these outputs communicates with the device command interface layer, to then update the GUI windows and the peripheral devices if needed. The GUI is also capable of both loading and saving data. The GUI is capable of loading the data generated from the Breathing-Emulator Profile Translation Software and communicating the data to the breathing-emulator in real-time. Data that is also output from the peripheral devices is communicated to the device command interface layer which then saves the data to be analyzed later. The vaping robot GUI window allows the user to select the vaping profile that will be sent to the vaping robot. Additionally, the GUI will capture and display the state transition data being transmitted from the vaping robot. The inhalation exposure chamber allows the user to input settings to regulate both the temperature and the carbon dioxide and humidity levels, in addition to activating a purge of the chamber. The GUI also displays the current environmental variables within the chamber, which is processed by the output of the inhalation exposure chamber. The breathing-emulator GUI allows the user to select the saved profile generated from the Breathing-Emulator Profile Translation Software and transmits it as a new profile to the breathing-emulator, the system also displays the volumetric displacement data of the breathing-emulator. The inline PM sensor GUI records the transmitted particle data and graphically displays the data as well as allows the user to save the data for post processing. All arrows in Supplementary Figure related to the firmware flow diagrams follow the same format, solid lines indicate when the module depicted as a block is called, it will call the pointed to module once per call, the thick dashed arrows indicate that the first module interacts with the pointed to module through hardware based method, and the thin dashes arrow indicates that the module call is conditional.

Figure 16:
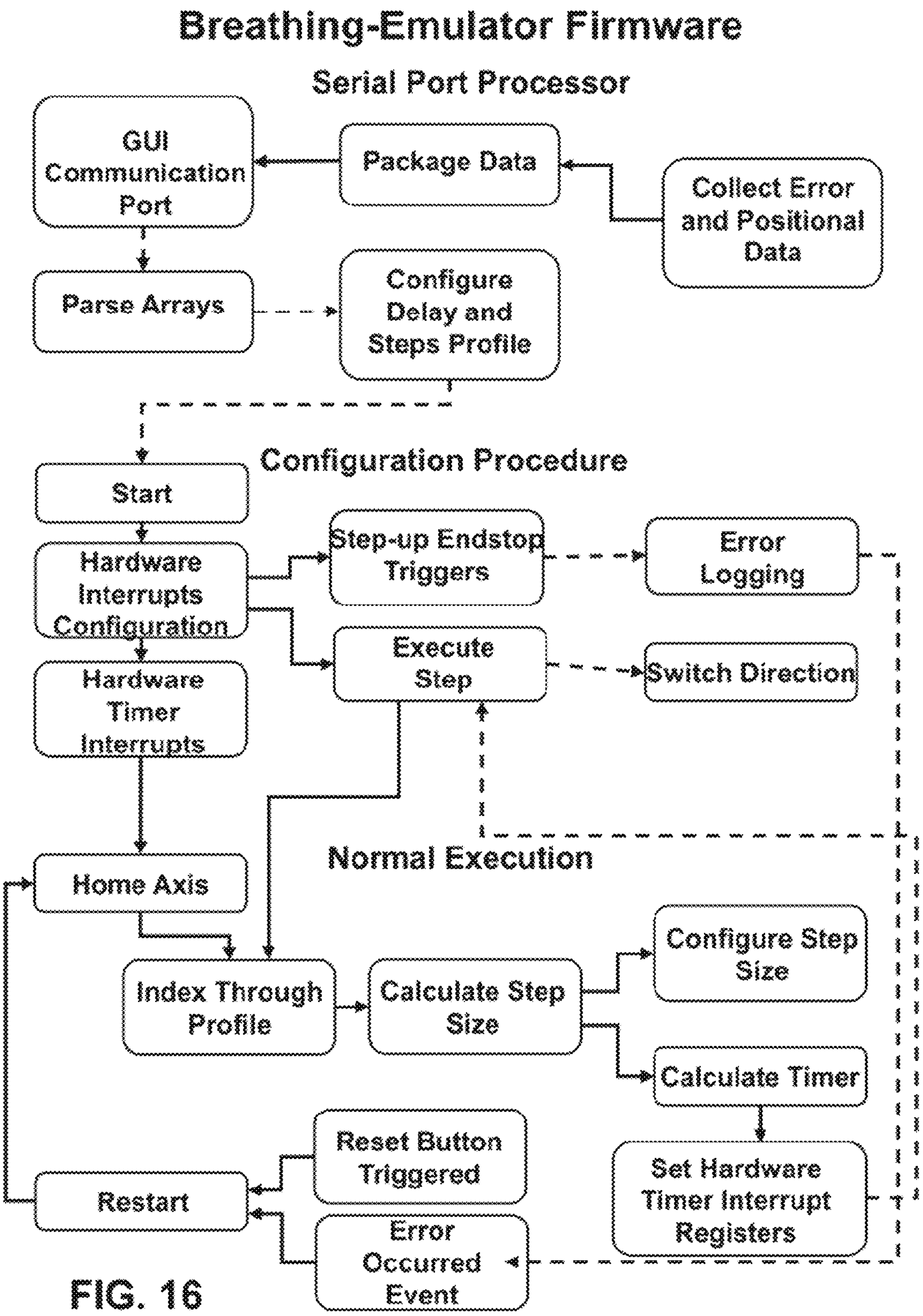
FIG. 16 is a breathing-emulator firmware flow diagram according to embodiments of the present disclosure.

FIG. 16 is a breathing-emulator firmware flow diagram according to embodiments of the present disclosure. All custom devices' firmware, including the breathing-emulator, can be categorized into three sections: the serial port processor, the configuration procedure, and the normal execution. When the system is first powered on, the firmware begins at the start module, which enables the GUI communication and initializes the hardware interrupts. The GUI communication line is now running in tandem with other sections of the firmware, where the port is constantly being monitored for data from the GUI, which is parsed and used to reconfigure the breathing-emulator profile. The communication port is also transmitting data to the GUI, where the data is generated by the breathing-emulator. The data includes both positional data and potential error messages. While the GUI communication port thread is running, the execution thread has configured the hardware interrupts, which consists of both the timer to execute a step and the interrupt to detect when the endstop has been triggered. After the timer interrupts are configured the home axis procedure is executed. The procedure configures the motor driver hardware and then takes controlled steps until the endstop has sent a signal indicating that it has been reached. After the home axis procedure has finished, the main loop of the normal execution cycle starts, where the breathing profile is indexed through one at a time, each time, executing a step. First the step size is calculated, alternating through different step sizes allows for an increased dynamic range of both velocity and precision. The step size data and the data in the current index of the breathing profile is then used to calculate the hardware timer values which control the rate of steps. Base off the timers values a step will occur at a programmed periodic rate. The steps are executed at the programmed rate, until the number of steps in the current index was reached, at this point the profile index is incremented and the new step size is calculated. While this normal execution thread is running, the number of steps are also being counted and when the number of steps corresponding to a full stroke length are reached the motor control is configured to change directions, transitioning from inhale to exhale or vice versa. In the event that the endstop is triggered while not in the home axis procedure then the event is treated as an error. When errors are logged the information is passed up to the serial port processor layer as well as to the error event occurred module, which will then trigger a restart where the axis is homed before beginning the main loop. The restart event can also be triggered through the reset button being pressed on the board.

Figure 17:
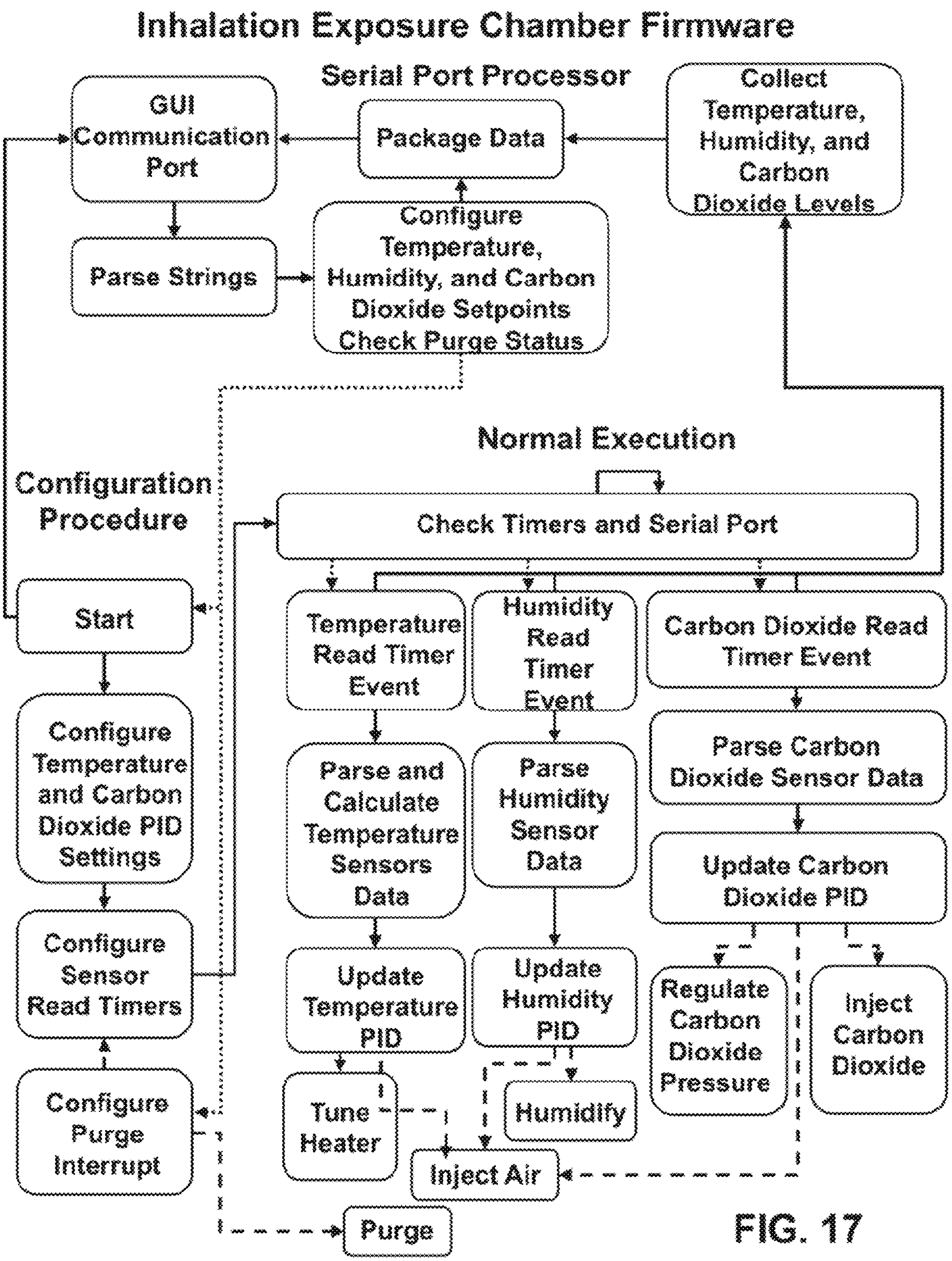
FIG. 17 is an inhalation exposure chamber firmware flow diagram according to embodiments of the present disclosure.

FIG. 17 is an inhalation exposure chamber firmware flow diagram according to embodiments of the present disclosure. Similar to the breathing-emulator firmware, the inhalation exposure chamber firmware begins at the start module. The GUI communication port is then initialized which enables data being transferred from the GUI to be parsed and used to configure the inhalation exposure chamber's settings, including temperature, humidity, and carbon dioxide setpoints, as well as wither the system should purge the chamber. When a setpoint is changed through the GUI the module will re-configure the setpoints. The module that configures the setpoints is also called after start. Once all setpoints have been configured, the sensor read timers are configured which are responsible for periodically triggering an event to read the data from the various sensors, this includes the temperature sensors, the humidity sensor, and the carbon dioxide sensor. When a read timer event has occurred, and the data is read and parsed from the sensors it is passed to the serial port processor which packages the data and sends the data to the GUI. Specifically, when the temperature read timer event occurs, four temperature sensors are parsed and averaged, the average temperature data is used to update the PID control system that regulates the power delivered to the heater module, which regulates both fan speed and heater power. When the humidity read timer has expired, the humidity sensor's output data is parsed and used to input into the humidity PID control system, which controls the humidity module. Similar to the other two modules, when the carbon dioxide read timer expires the carbon dioxide sensor data is parsed and used as an input into the PID control system. The carbon dioxide PID control system has the ability to both regulate the carbon dioxide pressure in the small tank 1430 and the periodic release rate of the pressurized carbon dioxide from the tank into the chamber. Both the pressure setpoint and the injection rate will control the amount of carbon dioxide injected into the system. In the event that either the temperature, humidity, or carbon dioxide levels are too high, the designed non-passive method of lowering these values is by injecting filtered dehumidified ambient air, which will have both lower temperature, humidity, and carbon dioxide levels than the current and setpoint values. In the event that the purge state is activated through the GUI, the configure purge interrupt is called. This both activates the purge module to evacuate all the air within the chamber and suspends the data acquisition and processing of all the sensors, which prevents the system from interpreting the rapid change in the environment as part of normal operation. Once the purge is complete the system is restored to normal operation.

Figure 18:
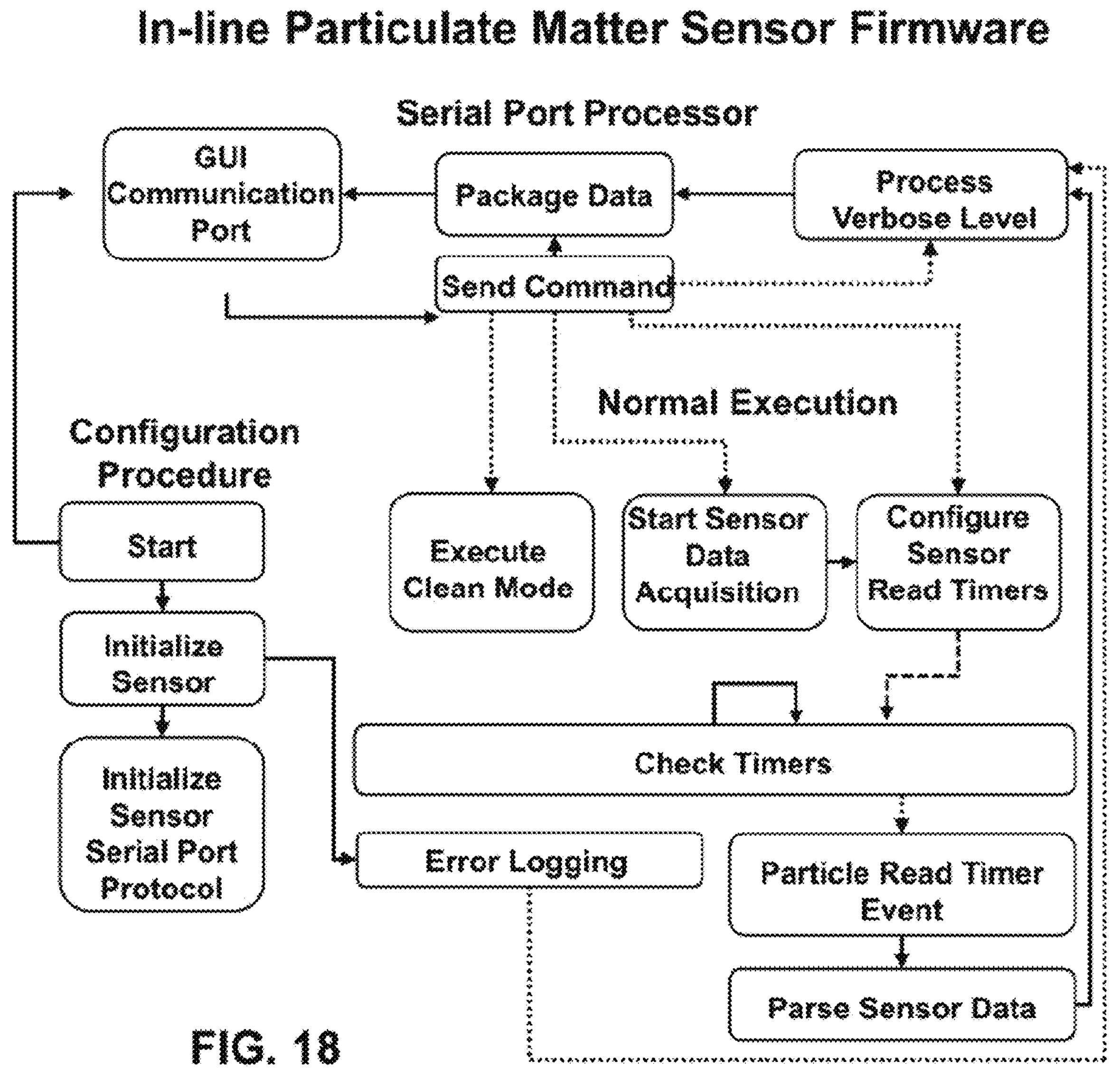
FIG. 18 is an inline particulate matter sensor firmware flow diagram according embodiments of the present disclosure.

FIG. 18 is an inline particulate matter sensor firmware flow diagram according embodiments of the present disclosure. As with the other modules, while the system is initializing the GUI communication port in a newly created thread, the PM sensor is initialized. During this process there are multiple error checks that if triggered will report to the verbose level processor which will select and package the data to send to the GUI. If there are no errors, the system will initialize the sensor serial port protocol. At this point the system is ready for normal execution. When a command comes in from the GUI to begin collecting data, the command does not need to be parsed as the GUI automatically sends the command in the format that the sensor is expecting. There are four main commands: execute clean mode, start sensor data acquisition, configure read sensor timers, and set verbose level. The execute clean mode command is used to clean the sensor after heavy use. The start sensor data acquisition command is used to begin collecting data. The configure sensor read timers is used to program the sample rate of data, if start sensor data acquisition is called it will set a default value for the configure sensor read timers. The set verbose level command is used to configure the process verbose level module, which filters out messages and data based off the level of information set to be reported. Once the sensor data acquisition has started and the sensor read timers have been configured, the system will periodically sample the data from the PM sensor and parse it into both the particle counts and concentrations for all the particle distribution sizes. This data is then passed to the process verbose level module, which will package the data and send it to the GUI.

Figure 19:
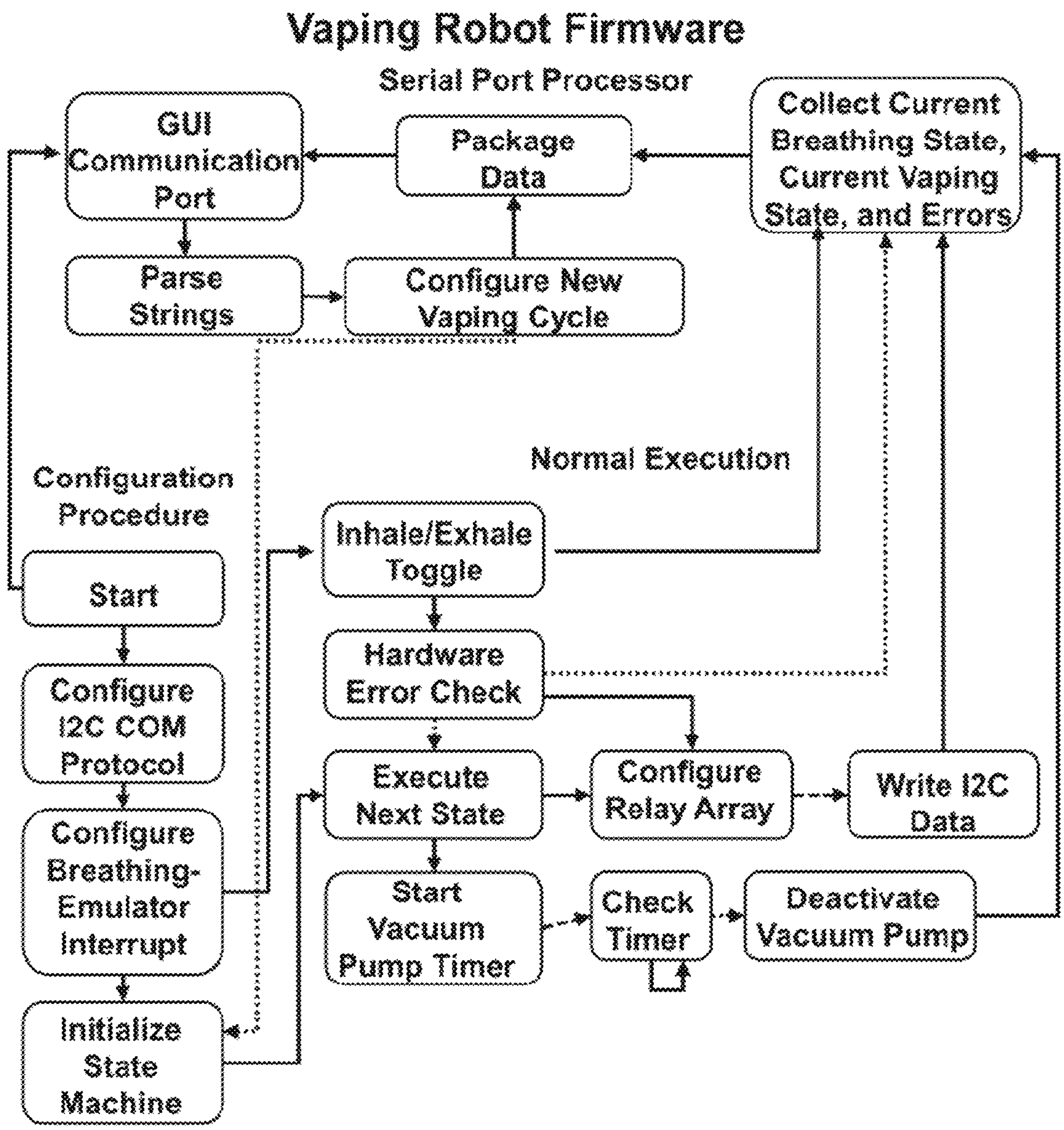
FIG. 19 is a vaping robot firmware flow diagram according to embodiments of the present disclosure.

FIG. 19 is a vaping robot firmware flow diagram according to embodiments of the present disclosure. Once the start module has configured the GUI communication port, the system will configure the $I^2C$ COM protocol, followed by configuring the breathing-emulator interrupt, which is responsible for configuring the hardware to detect the transition from inhale to exhale and exhale to inhale. After, the initialize state machine module will be called which is responsible for configuring the firmware to traverse to the appropriate state when a breathing cycle has finished. Initialize state machine is called once after start and is also called and updated with a new profile when a new profile is parsed from the GUI. After initialize state machine is called, the system is in normal operation. The state machine transitions with the execute next state module, which is dictated by the breathing cycle, specifically when the system changes from exhale of the last cycle to inhale of the new cycle. Due to the physical nature of the electronics there are checks on the hardware to validate that there was not an issue with detecting the transition from inhale to exhale or exhale to inhale. If errors are detected this information is corrected and the corrected error information is passed to the serial port processor which will package the data and send it to the GUI. Similarly, just as the state machine is being controlled by the transition of one breathing cycle to the next, controlling the fluidic connection of the inhale and exhale filters are also dictated by the breathing cycle. Specifically, when the inhale/exhale toggle module is triggered and any errors that occurred were corrected, this calls the configure relay array module, which sets the data to toggle the pinch valve responsible for controlling the inhale and exhale filter connection. While the configure relay array module is called every time due to the inhale/exhale toggle module, the execute next state module is only called half the time. When the execute next state module calls the configure relay array module the same iteration as the inhale/exhale toggle module, the execute next state will override any conflicting pinch valve configurations, which only occur during the breathing-emulator's inhale while the Sample state is active. This relay configuration is packaged and written to both the I2C port to activate the relays, as well as the serial port processor to inform the user of the event, through the GUI. Depending on the current active state, the vacuum pump may also be required to be activated, specifically during the Vapor and Purge states. When this is required, the vacuum pump is activated at the start of the state transition, however the timer for the vacuum pump is independent of the breathing cycle and is on for a programmed amount of time, 3 seconds in our experiment. Thus, when the start vacuum pump timer module is called, the vacuum pump is activated, and the timer, which is on a separate thread, waits until it has expired before deactivating the vacuum pump. When the system toggles the inhale/exhale state, detects hardware errors, writes data to the relays through the I2C port, or activates and deactivates the vacuum pump this information is reported to the serial port processor which is passed to the GUI.

Figure 20:
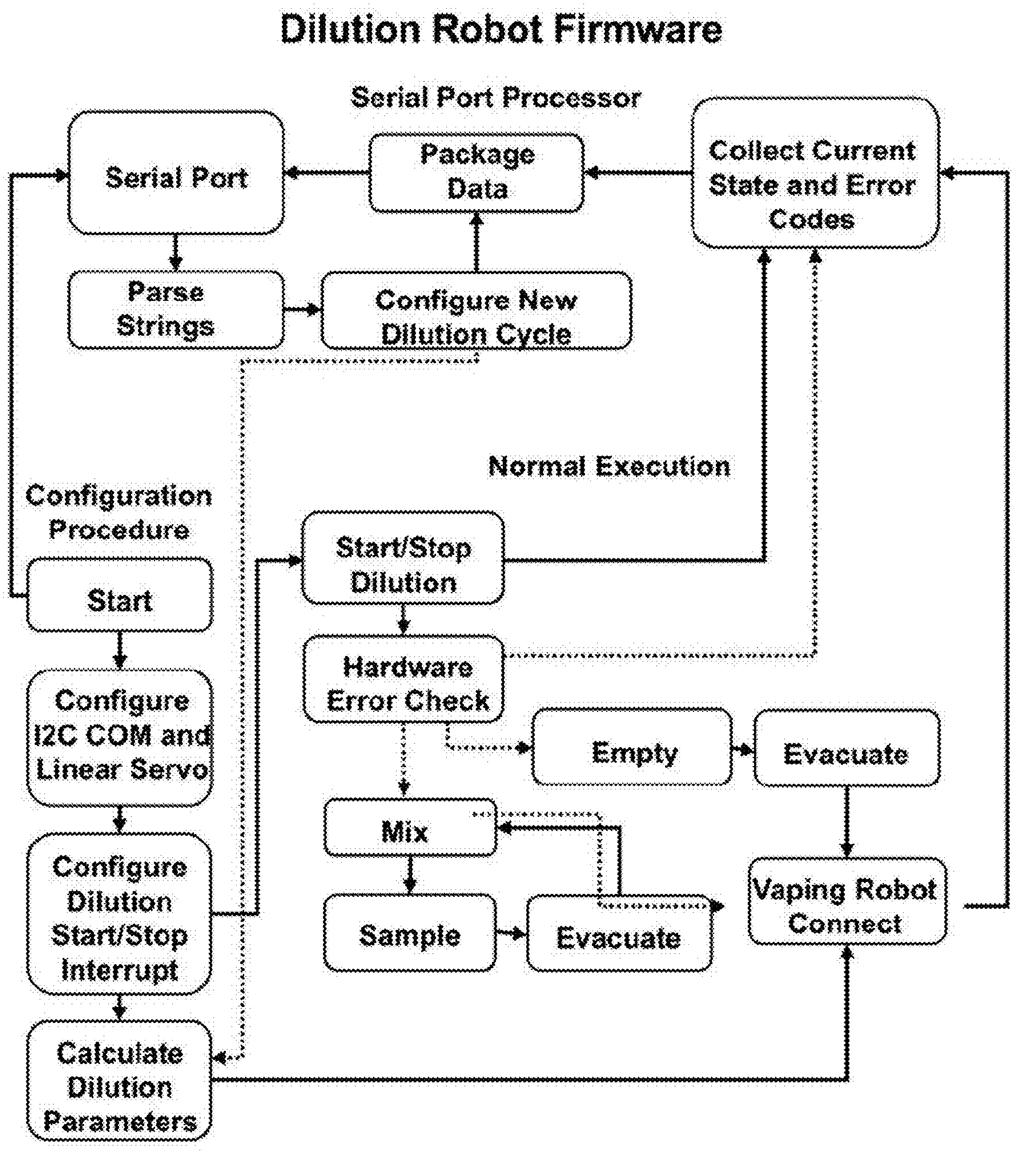
FIG. 20 is a dilution robot firmware flow diagram according to embodiments of the present disclosure.

FIG. 20 is a dilution robot firmware flow diagram according to embodiments of the present disclosure. The boot sequence of the Dilution system starts with configuring the main serial port and the I2C serial port communications in addition to configuring the linear servo. Next the firmware configures the Start/Stop interrupts. This interrupt is electrically connected to the vaping robot. The begin dilution procedure, Start Dilution, is invoked by the vaping robot after the vaping robot has filled the dilution robot's reservoir with vapor. The standby dilution procedure, Stop Dilution, is invoked by the vaping robot after the vaping robot has finished the Sample state, where the vapor was delivered to the PM sensor. The standby dilution procedure can be configured to directly transition to the VR Connect state if the vaping robot is responsible for removing the vapor from the reservoir. Or the standby dilution procedure can invoke Empty, Evacuate, and then VR Connect, which will empty the reservoir with the dilution robot. After the Start/Stop interrupt is configured the system calculates the dilution parameters based off the programmed dilution ratio, some of the parameters include sample of vapor drawn into the sample syringe during the Sample state and number of serial dilutions to achieve setpoint. Once the dilution parameters have been calculated the system transitions to the VR Connect state and begins normal execution. Once the Start interrupt has been activated, hardware checks are performed, and the Mix state is invoked. Then the Sample state is called followed by the Evacuate and the Mix state again. Depending on the number of serial dilutions calculated the Sample, Evacuate, then Mix states can be repeated again until the targeted dilution is reached, at that point the system invokes the VR Connect state. State transition information is sent to the serial port processor along with any hardware errors that were detected. When the Stop Dilution interrupt is activated, hardware checks are performed and the system can either invoke VR Connect directly or call the Empty, Evacuate, and then VR Connect states. The serial port processor is constantly monitoring the main serial port. The user can enter command(s) to invoke the Start/Stop Dilution interrupt in addition to changing the dilution ratio setpoint. Data that is sent from the hardware checks and state transitions is also sent out of the main serial port for diagnostics.

FIG. 21 shows an impact of vitamin E acetate on inhaled particle peak concentrations. Plotted Distributions of the peak concentration over each inter-puff interval for particles within 300 nm-1 μm, 1 μm-2.5 μm, 2.5 μm-4 μm, and 4 μm-10 μm in size for the different VEA concentrations (v/v at 0%, 1.25%, 2.5%, and 5% all prepared in 50/50 PG/VG). Kruskal-Wallis test demonstrated statistical significance ($p<0.0001$). Post-hoc analysis (Dunn's multiple comparison test) demonstrated statistically significant differences between all data sets except 1.25% and 2.5% for all particle size distributions and between 2.5% and 5% for the particle distribution of 4 μm-10 μm. Bars show mean and 95% confidence intervals for each data set.

FIG. 22 shows a particle distribution of varying dilution ratios. In order to characterize the accuracy of the PM sensor coupled with the dilution robot over a wide range of dilutions, data was collected at the following dilutions: 0.1, 0.0316, 0.01, 0.00316, 0.001, and 0.000316. Due to the wide range of dilutions, the data is plotted in a Logarithmic axis (both X and Y axis). The data is for the four particle distribution sizes, 300 nm-1.0 μm, 1.0 μm-2.5 μm, 2.5 μm-4.0 μm, and 4.0 μm-10.0 μm. A general linear trend is observed for all particle distributions validating the dilution procedure. Both the total particles counted per $cm^3$ over each inter-puff interval and peak concentration over each inter-puff interval versus dilution are plotted.

FIG. 23 shows an impact of nicotine alone or in combination with vitamin E acetate on particle peak concentrations generated from an electronic cigarette. Plotted Distributions peak concentration over each inter-puff interval for particles within 300 nm-1 μm, 1 μm-2.5 μm, 2.5 μm-4 μm, and 4 μm-10 μm in size for the different VEA and nicotine concentrations (0% or 5% (v/v) VEA with 0%, 0.6%, 1.2%, or 2.4% (wt/v) nicotine all prepared in 50/50 PG/VG). Kruskal-Wallis test demonstrated statistical significance ($p<0.0001$). Post-hoc analysis (Dunn's multiple comparison test) demonstrated statistically significant differences between 0% VEA and 5% VEA at both 0% and 0.6% nicotine for all particle size distributions. Bars show mean and 95% confidence intervals for each data set.

FIG. 24 shows an impact of nicotine alone or in combination with vitamin E acetate content on cumulative total sub-micron and microparticles generated from an electronic cigarette over a representative vaping regiment. Total combined particles per $cm^3$ were counted at a sampling rate of 1.3 seconds over the course of seven independent vaping sessions (at 9 puffs per session) in the presence of a range of nicotine doses (0%-2.4% wt/v in 50/50 PG/VG) with (5% v/v) or without VEA. In addition, for each condition, the particle distribution size profile was segmented to display relative measured abundance of each size fraction as a percentage of total particles that were counted. The 0% VEA and 0% nicotine combination yielded $3.26\times10^7$ particles/$cm^3$ within 300 nm-1 μm (85.7% of total), $4.77\times10^6$ particles/$cm^3$ within 1 μm-2.5 μm (12.5% of total), $5.96\times10^5$ particles/$cm^3$ within 2.5 μm-4 μm (1.6% of total), and $9.51\times10^4$ particles/$cm^3$ within 4 μm-10 μm (0.2% of total). The 0% VEA and 0.6% nicotine combination yielded $2.95\times10^7$ particles/$cm^3$ within 300 nm-1 μm (85.9% of total), $4.23 \times 10^6$ particles/cm$^3$ within 1 μm-2.5 μm (12.3% of total), $5.28 \times 10^5$ particles/cm$^3$ within 2.5 μm-4 μm (1.5% of total), and $8.42 \times 10^4$ particles/cm$^3$ within 4 μm-10 μm (0.2% of total). The 0% VEA and 1.2% nicotine combination yielded $2.73 \times 10^7$ particles/cm$^3$ within 300 nm-1 μm (86.8% of total), $3.64 \times 10^6$ particles/cm$^3$ within 1 μm-2.5 μm (11.6% of total), $4.54 \times 10^5$ particles/cm$^3$ within 2.5 μm-4 μm (1.4% of total), and $7.25 \times 10^4$ particles/cm$^3$ within 4 μm-10 μm (0.2% of total). The 0% VEA and 2.4% nicotine combination yielded $2.70 \times 10^7$ particles/cm$^3$ within 300 nm-1 μm (86.9% of total), $3.56 \times 10^6$ particles/cm$^3$ within 1 μm-2.5 μm (11.5% of total), $4.44 \times 10^5$ particles/cm$^3$ within 2.5 μm-4 μm (1.4% of total), and $7.10 \times 10^4$ particles/cm$^3$ within 4 μm-10 μm (0.2% of total). The 5% VEA and 0% nicotine combination yielded $4.59 \times 10^7$ particles/cm$^3$ within 300 nm-1 μm (83.3% of total), $8.03 \times 10^6$ particles/cm$^3$ within 1 μm-2.5 μm (14.6% of total), $1.01 \times 10^6$ particles/cm$^3$ within 2.5 μm-4 μm (1.8% of total), and $1.60 \times 10^5$ particles/cm$^3$ within 4 μm-10 μm (0.3% of total). The 5% VEA and 0.3% nicotine combination yielded $3.924 \times 10^7$ particles/cm$^3$ within 300 nm-1 μm (84.6% of total), $6.22 \times 10^6$ particles/cm$^3$ within 1 μm-2.5 μm (13.4% of total), $7.78 \times 10^5$ particles/cm$^3$ within 2.5 μm-4 μm (1.7% of total), and $1.24 \times 10^5$ particles/cm$^3$ within 4 μm-10 μm (0.3% of total). The 5% VEA and 1.2% nicotine combination yielded $3.27 \times 10^7$ particles/cm$^3$ within 300 nm-1 μm (85.3% of total), $4.94 \times 10^6$ particles/cm$^3$ within 1 μm-2.5 μm (12.9% of total), $6.18 \times 10^5$ particles/cm$^3$ within 2.5 μm-4 μm (1.6% of total), and $9.84 \times 10^4$ particles/cm$^3$ within 4 μm-10 μm (0.2% of total). The 5% (v/v) VEA and 2.4% nicotine combination yielded $2.85 \times 10^7$ particles/cm$^3$ within 300 nm-1 μm (86.5% of total), $3.89 \times 10^6$ particles/cm$^3$ within 1 μm-2.5 μm (11.8% of total), $4.85 \times 10^5$ particles/cm$^3$ within 2.5 μm-4 μm (1.5% of total), and $7.75 \times 10^4$ particles/cm$^3$ within 4 μm-10 μm (0.2% of total).

Figure 25:
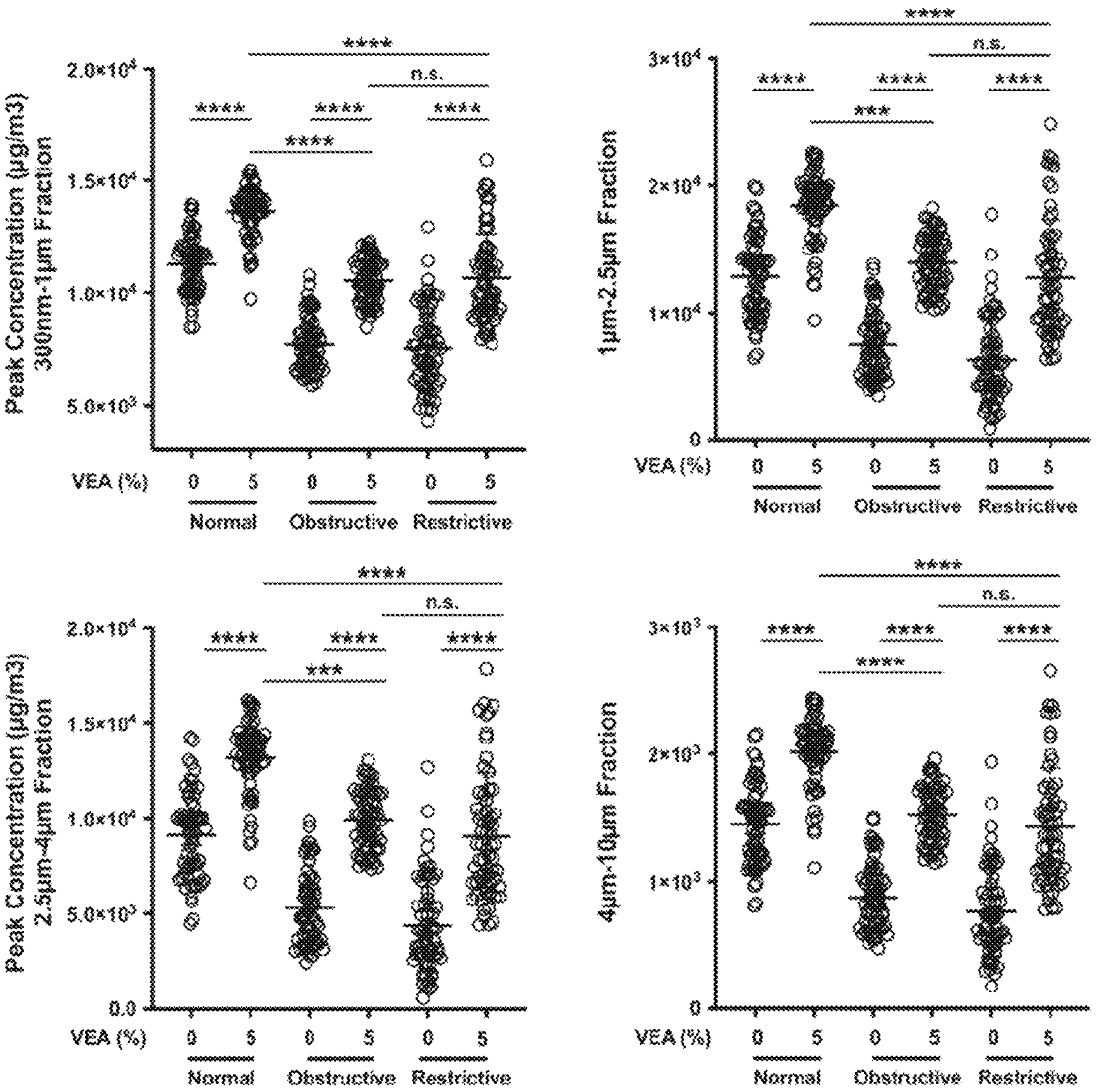
FIG. 25 shows an impact of healthy versus diseased breathing on cumulative total sub-micron and microparticles generated from an electronic cigarette over a representative vaping regiment.
Figure 26:
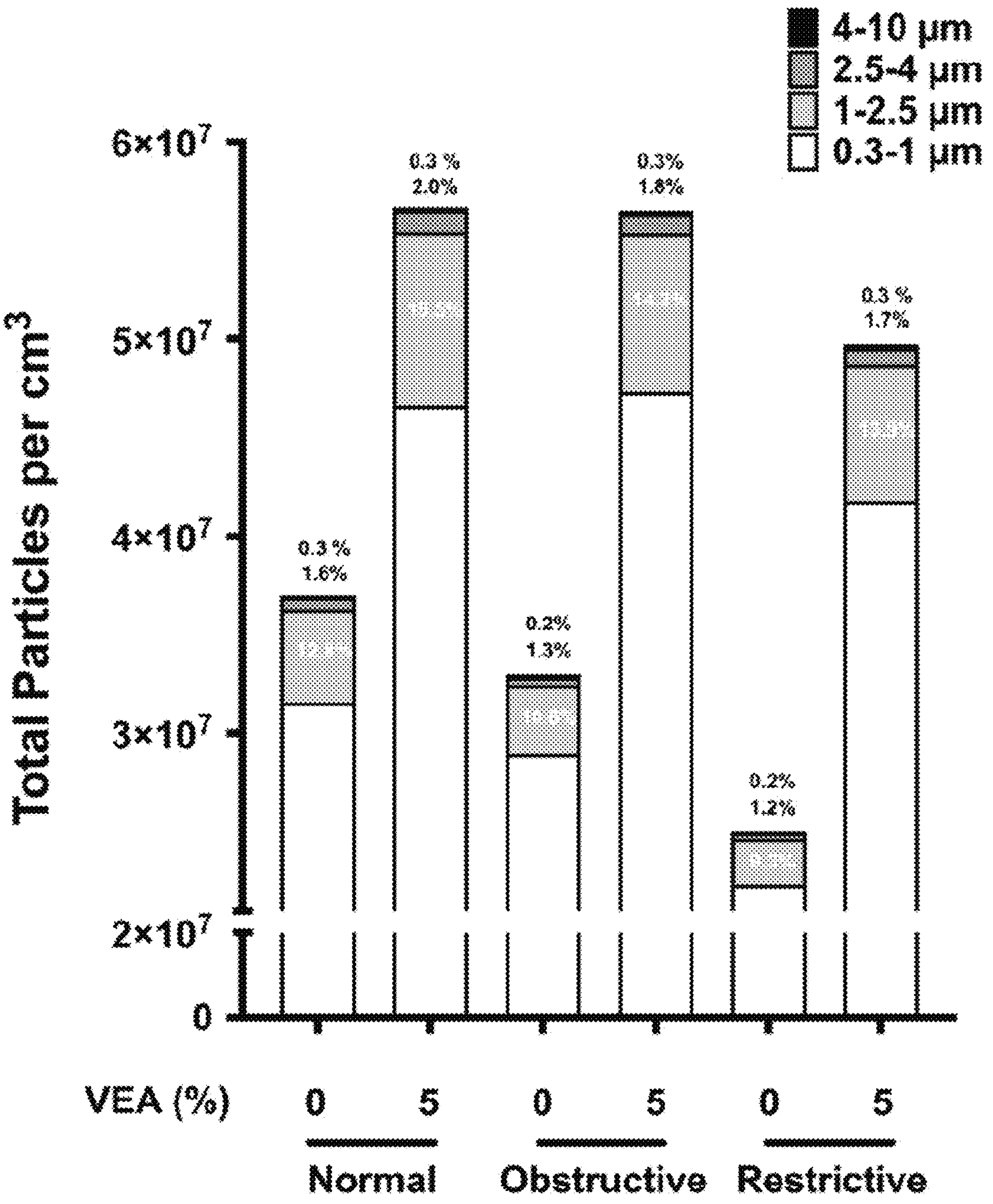
FIG. 26 shows an influence of healthy versus diseased breathing in the absence or presence of vitamin E acetate on inhaled particle peak concentrations.

FIG. 25 shows an impact of healthy versus diseased breathing on cumulative total sub-micron and microparticles generated from an electronic cigarette over a representative vaping regiment. Total combined particles per cm$^3$ were counted at a sampling rate of 1.3 seconds over the course of seven independent vaping sessions (at 9 puffs per session) in the absence or presence of VEA (5% v/v in 50/50 PG/VG) for healthy, restrictive and obstructive pulmonary breathing profiles. For each condition, the particle distribution size profile was segmented to display relative measured abundance of each size fraction as a percentage of total particles that were counted. The 0% VEA at normal breathing yielded $3.16 \times 10^7$ particles/cm$^3$ within 300 nm-1 μm (85.3% of total), $4.73 \times 10^6$ particles/cm$^3$ within 1 μm-2.5 μm (12.8% of total), $5.91 \times 10^5$ particles/cm$^3$ within 2.5 μm-4 μm (1.6% of total), and $9.43 \times 10^4$ particles/cm$^3$ within 4 μm-10 μm (0.3% of total). The 5% VEA at normal breathing yielded $4.66 \times 10^7$ particles/cm$^3$ within 300 nm-1 μm (82.2% of total), $8.81 \times 10^6$ particles/cm$^3$ within 1 μm-2.5 μm (15.5% of total), $1.11 \times 10^6$ particles/cm$^3$ within 2.5 μm-4 μm (2.0% of total), and $1.76 \times 10^5$ particles/cm$^3$ within 4 μm-10 μm (0.3% of total). The 0% VEA at obstructive breathing yielded $2.90 \times 10^7$ particles/cm$^3$ within 300 nm-1 μm (87.9% of total), $3.48 \times 10^6$ particles/cm$^3$ within 1 μm-2.5 μm (10.6% of total), $4.33 \times 10^5$ particles/cm$^3$ within 2.5 μm-4 μm (1.3% of total), and $6.93 \times 10^4$ particles/cm$^3$ within 4 μm-10 μm (0.2% of total). The 5% VEA at obstructive breathing yielded $4.73 \times 10^7$ particles/cm$^3$ within 300 nm-1 μm (83.6% of total), $8.09 \times 10^6$ particles/cm$^3$ within 1 μm-2.5 μm (14.3% of total), $1.01 \times 10^6$ particles/cm$^3$ within 2.5 μm-4 μm (1.8% of total), and $1.61 \times 10^5$ particles/cm$^3$ within 4 μm-10 μm (0.3% of total). The 0% VEA at restrictive breathing yielded $2.23 \times 10^7$ particles/cm$^3$ within 300 nm-1 μm (89.3% of total), $2.33 \times 10^6$ particles/cm$^3$ within 1 μm-2.5 μm (9.3% of total), $2.89 \times 10^5$ particles/cm$^3$ within 2.5 μm-4 μm (1.2% of total), and $4.63 \times 10^4$ particles/cm$^3$ within 4 μm-10 μm (0.2% of total). The 5% VEA at restrictive breathing yielded $4.18 \times 10^7$ particles/cm$^3$ within 300 nm-1 μm (84.1% of total), $6.91 \times 10^6$ particles/cm$^3$ within 1 μm-2.5 μm (13.9% of total), $8.65 \times 10^5$ particles/cm$^3$ within 2.5 μm-4 μm (1.7% of total), and $1.38 \times 10^5$ particles/cm$^3$ within 4 μm-10 μm (0.3% of total). Kruskal-Wallis test demonstrated statistical significance ($p < 0.0001$). Post-hoc analysis (Dunn's multiple comparison test) showed statistically significant differences between all conditions except normal 0% VEA versus both obstructive and restrictive 5% VEA, and obstructive versus restrictive at both 0% and 5% VEA. Error bars indicate mean and 95% confidence intervals for each data set.

FIG. 26 shows an influence of healthy versus diseased breathing in the absence or presence of vitamin E acetate on inhaled particle peak concentrations. Plotted distributions of the peak concentration over each inter-puff interval for particles within 300 nm-1 μm, 1 μm-2.5 μm, 2.5 μm-4 μm, and 4 μm-10 μm in size for the different VEA concentrations (0% or 5% (v/v) VEA (prepared in 50/50 PG/VG) with normal, obstructive, and restrictive breathing profiles).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system for analyzing fluid-borne matters, the system comprising:

a first reservoir for storing a fluid with fluid-borne matters, wherein the fluid is air or gas;

inhalation exposure chamber fluidically coupled to the first reservoir, wherein the inhalation exposure chamber includes temperature, humidity, and gas level controls to emulate physiologically or clinically relevant exposure;

a pressure-regulated pump fluidically coupled to the first reservoir for creating a negative pressure in the first reservoir;

a fluid intake syringe coupled to the first reservoir by a fluidical conduit, the fluid intake syringe having a container with a changeable volume, wherein the fluid intake syringe is configured to emulate breathing, when the volume increases, the fluid intake syringe receive fluid when a volume of the fluid intake syringe increases, and when the volume decreases, the fluid intake syringe expel fluid when the volume of the fluid intake syringe decreases;

an airborne particle generator fluidically coupled to the first reservoir; and a sensor disposed in the fluidical conduit between the first reservoir and the fluid intake syringe for detecting fluid-borne matters in the fluidical conduit.

2. The system of claim 1, wherein the inhalation exposure chamber receives ambient air or gas.

3. The system of claim 1, wherein the inhalation exposure chamber includes a filter for filtering the ambient air or gas for analysis.

4. The system of claim 1, wherein the airborne particle generator is an electronic cigarette or a tobacco-related product.

5. The system of claim 1 further comprising a dilution robot for diluting a concentration of the fluid-borne matters in the first reservoir to a level detectable by the sensor.

6. The system of claim 5, wherein the dilution robot includes a first and a second reciprocating pump both fluidically coupled to the first reservoir, when an internal volume of the first reciprocating pump increases by a predetermined amount, an internal volume of the second reciprocating pump decreases by approximately a same predetermined amount, and vice versa, wherein the predetermined amount of volume change determines a diluting factor.

7. The system of claim 6, wherein the dilution robot includes a second reservoir fluidically coupled between the first reservoir and the first and second reciprocating pump.

8. The system of claim 7 further comprising a valve disposed between the first and second reservoir.

9. The system of claim 1, wherein the container of the fluid intake syringe includes a reciprocating pump for controllably changing the volume of the container.

10. The system of claim 1 further comprising a first valve and a second valve, the first valve disposed in the fluidical conduit for controlling fluid flow in the fluidical conduit, and the second valve configured to control fluidical connection between the sensor and an ambience, wherein when the first valve is closed the second valve is open, and vice versa.

11. The system of claim 10, wherein the first and the second valve are regulation valves selected from the group consisting of ball, butterfly, diaphragm, globe, needle, pinch plug, electrically controlled and optically controlled valves.

12. The system of claim 1, wherein the sensor is a particulate matter (PM) analyzer.

13. The system of claim 1, wherein the sensor is configured to quantify oxygen levels or detect virus or allergens.

14. A system for analyzing airborne particles in real-time, the system comprising:

an inhalation exposure chamber receiving ambient air or gas;

an airborne particle generator configured to generate airborne particles;

a reservoir fluidically connected to the inhalation exposure chamber during a first time period and fluidically connected to the airborne particle generator during a second time period not overlapping the first time period, the reservoir configured for storing the air mixed with the airborne particles;

a pressure-regulated pump fluidically coupled to the reservoir for creating a negative air pressure in the reservoir during the first and second time period;

a breath-emulating fluid intake syringe coupled to the reservoir by a fluidical conduit, the breath-emulating fluid intake syringe having a container with a changeable volume, wherein when the volume increases, the breath-emulating fluid intake syringe emulates an inhale, and when the volume decreases, the breath-emulating fluid intake syringe emulates an exhale;

a dilution robot fluidically connected to the reservoir for controllably diluting a concentration of the airborne particles in the reservoir; and a particulate matter (PM) sensor disposed in the fluidical conduit between the reservoir and the breath-emulating fluid intake syringe for detecting airborne particles in the fluidical conduit.

15. A method for analyzing fluid-borne particles, the method comprising:

filling a reservoir with clean fluid;

sucking fluid-borne particles into the reservoir to mix with the clean fluid;

increasing volume of a container when the container is fluidically connected to the reservoir by a fluidical conduit;

detecting fluid-borne particles by a particulate matter (PM) sensor disposed in the fluidical conduit during the volume increase;

decreasing volume of the container when the container is fluidically connected to an ambience by the fluidical conduit; and detecting fluid-borne particles by the PM sensor during the volume decrease.

16. The method of claim 15 further comprising supplying the clean fluid to the reservoir from an environmentally controlled chamber.

17. The method of claim 16, wherein the fluid is air, and the environmentally controlled chamber includes an air or gas filter, a temperature controller, a humidity controller and a pathophysiological gas level controller.

18. The method of claim 15 further comprising diluting a concentration of the fluid- borne particles in the reservoir before increasing volume of the container.

19. The method of claim 15 further comprising:

increasing volume of the container when the container is fluidically connected to the ambience; and detecting fluid-borne particles by the PM sensor during the volume increase.

20. The method of claim 15 further comprising fluidically connecting an airborne particle generator to the reservoir when the reservoir is under a negative air pressure.

21. The method of claim 20, wherein the airborne particle generator is an electronic cigarette or a tobacco-related product.

* * * * *